US007716090B1

(12) United States Patent  
Rabenold et al.

(10) Patent No.: US 7,716,090 B1  
(45) Date of Patent: *May 11, 2010

(54) INTEGRATED ON-LINE AND ON-SITE AUCTIONING SYSTEM INCLUDING AUDIO AND/OR VIDEO CAPABILITIES

(75) Inventors: Nancy J. Rabenold, Riverview, FL (US); James A. Simmons, Riverview, FL (US); Paul D. Sper, Camarillo, CA (US)

(73) Assignee: Auction Management Solutions, Inc., Tampa, FL (US)

( * ) Notice: Subject to any disclaimer, the term of this patent is extended or adjusted under 35 U.S.C. 154(b) by 1030 days.

This patent is subject to a terminal disclaimer.

(21) Appl. No.: 10/913,886

(22) Filed: Aug. 6, 2004

Related U.S. Application Data

(63) Continuation of application No. 09/866,191, filed on May 25, 2001, now Pat. No. 6,813,612.

(60) Provisional application No. 60/207,030, filed on May 25, 2000.

(51) Int. Cl.  
*G06F 17/30* (2006.01)

(52) U.S. Cl. .............................. 705/27; 705/26; 705/37

(58) Field of Classification Search .................. 705/27, 705/26, 37  
See application file for complete search history.

(56) References Cited

U.S. PATENT DOCUMENTS 3,581,072 A  5/1971  Nymeyer (Continued)

FOREIGN PATENT DOCUMENTS

WO  WO92/15174  9/1992

(Continued)

OTHER PUBLICATIONS

Bid.com: "Bid.com and American Interactive Media make internet history with successful launch of firt live streaming video auction," PR Newswire, Apr. 29, 1999, Dialog file 621, #01860387, 2pgs.*

(Continued)

*Primary Examiner*—Robert M. Pond  
(74) *Attorney, Agent, or Firm*—Smith Frohwein Tempel Greenlee Blaha, LLC; Gregory Scott Smith

(57) ABSTRACT

A remote bidding supplement for traditional-style live auctions, comprising an audio/video system for streaming instantaneous and buffer-free live audio and video data from a live auction site to one or more remote auction bidders having a bidding device for receiving the data and for transmitting instantaneously remote auction bids for each item being auctioned at the live auction site; a clerk system for controlling and accepting auction bids received at the live auction site from onsite auction bidder and from remote auction bidders for each item being auctioned at the live auction site; a marquee system for displaying instantaneously at the live auction site auction bid information, including accepted auction bids, for each item being auctioned at the live auction site; and a bid system for broadcasting instantaneously to all remote auction bidders and to the marquee system the auction bid information for each item being auctioned at the live auction site, for receiving instantaneously auction bids from each remote auction bidder for each item being auctioned at the live auction site and for transmitting instantaneously to the clerk system each remote auction bid received for each item being auctioned at the live auction, and for broadcasting instantaneously to all remote auction bidders and to the marquee system the onsite and remote auction bids that have been accepted by the clerk system.

8 Claims, 44 Drawing Sheets

U.S. PATENT DOCUMENTS

| | | |
|---|---|---|
| 4,412,287 A | 10/1983 | Braddock, III |
| 4,789,928 A | 12/1988 | Fujisaki |
| 5,189,630 A | 2/1993 | Barstow et al. |
| 5,664,111 A | 9/1997 | Nahan et al. |
| 5,710,895 A | 1/1998 | Gerber et al. |
| 5,774,873 A | 6/1998 | Berent et al. |
| 5,794,219 A | 8/1998 | Brown |
| 5,818,914 A | 10/1998 | Fujisaki |
| 5,835,896 A | 11/1998 | Fisher et al. |
| 5,845,265 A | 12/1998 | Woolston |
| 5,890,138 A | 3/1999 | Godin et al. |
| 5,905,974 A | 5/1999 | Fraser et al. |
| 5,905,975 A | 5/1999 | Ausubel |
| 6,006,201 A | 12/1999 | Berent et al. |
| 6,012,045 A | 1/2000 | Barzilai et al. |
| 6,021,398 A | 2/2000 | Ausubel |
| 6,023,685 A | 2/2000 | Brett et al. |
| 6,026,383 A | 2/2000 | Ausubel |
| 6,035,289 A | 3/2000 | Chou et al. |
| 6,044,363 A | 3/2000 | Mori et al. |
| 6,047,274 A | 4/2000 | Johnson et al. |
| 6,055,518 A | 4/2000 | Franklin et al. |
| 6,058,379 A | 5/2000 | Odom et al. |
| 6,078,906 A | 6/2000 | Huberman |
| 6,108,639 A | 8/2000 | Walker et al. |
| 6,151,589 A | 11/2000 | Aggarwal et al. |
| 6,161,099 A | 12/2000 | Harrington et al. |
| 6,167,386 A | 12/2000 | Brown |
| 6,202,051 B1 | 3/2001 | Woolston |
| 6,243,691 B1 | 6/2001 | Fisher et al. |
| 6,266,651 B1 | 7/2001 | Woolston |
| 6,266,652 B1 | 7/2001 | Godin et al. |
| 6,269,343 B1 | 7/2001 | Pallakoff |
| 6,272,473 B1 | 8/2001 | Sandholm |
| 6,272,474 B1 | 8/2001 | Garcia |
| 6,285,989 B1 | 9/2001 | Shoham |
| 6,324,519 B1 | 11/2001 | Eldering |
| 6,343,273 B1 | 1/2002 | Nahan et al. |
| 6,343,277 B1 | 1/2002 | Gaus et al. |
| 6,366,891 B1 | 4/2002 | Feinberg |
| 6,415,269 B1 | 7/2002 | Dinwoodie |
| 6,415,320 B1 | 7/2002 | Hess et al. |
| 6,449,601 B1 | 9/2002 | Friedland et al. |
| 6,606,607 B1 | 8/2003 | Martin et al. |
| 2002/0007338 A1 | 1/2002 | Do |
| 2002/0032631 A1 | 3/2002 | Rose |
| 2002/0138847 A1 | 9/2002 | Abrams et al. |
| 2002/0165817 A1 | 11/2002 | Rackson et al. |
| 2003/0046186 A1 | 3/2003 | Wren |

FOREIGN PATENT DOCUMENTS

| | | |
|---|---|---|
| WO | WO97/38530 | 10/1997 |
| WO | WO98/26363 | 6/1998 |
| WO | WO99/27476 | 6/1999 |
| WO | WO99/63461 | 12/1999 |
| WO | WO00/34899 | 6/2000 |
| WO | WO00/36533 | 6/2000 |

OTHER PUBLICATIONS

RealAudio: "MediaOne licenses RealNetworks' RealSystem 5.0 to deliver streaming medio to MediaOne Express customer," PR Newswire, Dec. 11, 1997, Proquest #25686644, 3pgs.*

Rockoff, T., Design of an Internet-based system for remote Dutch auctions, Internet Research; Electronic Networking Applications and Policy, vol. 5 No. 4 1995 10-16.

Charlier, M., Video Auctions Could Spell End for Stockyards, The Wall Street Journal, Nov. 2, 1998 (labeled LBG 020569-020570).

Simmons, J., letter to Mr. Tippet regarding Online Ringman system and brochure describing Online Ringman system, Mar. 1, 1998 (labeled RBA 0030-0306).

Amazon.com Agrees to Purchase LiveBid.com, http://www.mainantiquedigest.com/articles/amaz0599.htm, May 1999 (labeled LBG 020650).

Clampet, E., Amazon.com Buys Auction Site, http://news.earthweb.com/ec-news/print.php/96921, Apr. 12, 1999 (labelled LBG 020651-020652).

Yahoo! Auctions Unveils Premier Auction Area, http://docs.yahoo.com/docs/pr/release267.html, Feb. 1, 1999 (labeled LBG 020653-020654).

Baker, M., Looking for Auction, Pugent Sound Business Journal(Seattle), Apr. 19, 1999, (labeled LBG 020619-020621).

LiveBid.com, International Auctioneers Present First, Four-Country, Live Online Auction of Fine Art, Business Wire, Apr. 19, 1999 (labeled LBG 020617-020618).

The Auction Channel provides Live interactive bidding for all Antiquorum sales worldwide, http://www.antiquorum.com/html/press/auction.htm (labeled LBG 020659).

"Live" Auction Broadcast Schedule on Brillant Digital's The Auction Channel, Business Wire, Jul. 9, 1999 (labeled LBG 020681-020683).

The Auction Channel Marks North American Television Debut With Golf Memorabillia, Business Wire, Feb. 1, 2000 (labeled LBG 020641-020642).

Gordon, P., Video cattle sales find niche in traditional auction market, The Boston Globe, Nov. 22, 1998, p. A14 (labeled LBG 020607-020608).

First Wine Auctioned Live in Cyberspace; Simultaneous Live and Cyber Wine Auction Benefits Charity, Business Wire, May 22, 1999 (labeled LBG 020651-020652).

Utopia hosts first live auction on the Internet; Lavish 7,000 sq. ft. mansion to be subject of historical event, Business Wire, Apr. 23, 1996 (labeled LBG 020695-020696).

Lavish Rehoboth Beach Mansion to be Auctioned on the Internet, press release, Apr. 23, 1996, PR News Wire (labeled LBG 020697).

Smith, L., Going . . . gone; auctions on the Web, Aug. 26, 1996, PC Week (labeled LBG 020655-020658).

Virtual Auctions, Automotive News, Jul. 13, 1998, p. 18 (labeled LBG 020548).

White Pine Software: White Pine Releases Enhanced CU-SeeMe for Windows V2.1, Oct. 8, 1996 (labeled LBG 020717-020718).

White Pine Software: Network & Conference Mangement Software Announced for audio/video conferencing, May 22, 1996 (labeled LBG 020715-020716).

On-line Bidding Target of New Software Company, Auto Remarketing, May 1997, pp. 18-19. (labeled LBG 020622-020623).

Videoconferencing: White Pine Announces the industry's first multicast-enabled real-time Internet and Intranet conferencing server software, Dec. 16, 1996 (LBG 020719-020720).

. . . Going Once . . . Going Twice . . . Sold! Over The Internet, Auto Auction Shopper/Used Car News, Oct. 1998 (labeled LBG 020554).

ServNet Elects New Officers, Plans New Internet Services, Auto Remarketing, Jan. 1999, pp. 20 and 21. (labeled LBG 020549-020550).

ServNet Introduces Online Sale, Auto Auction Shopper, Sep. 21, 1998 (labeled LBG 020545).

Online Ringman Users' Manual, pp. 1-36.

Declaration of Nancy J. Rabenold, Mar. 8, 2005, pp. 1-18.

AMS, Inc.'s Objections and Responses to Live Global Bid, Inc. and Live Global Communications USA Inc.'s Request for Admission to AMS, May 13, 2005, p. 1-19.

AMS, Inc.'s Objections and Responses to Live Global Bid, Inc. and Live Global Communications USA Inc.'s Second Set of Interrogatories, May 13, 2005, 17 sheets.

Proposal to Provde Wine Auction Capability Via the Internet for the Mid-Atlantic Wine Auction Company, May 19, 1999 (labeled AMS-013-2379-AMS-013-2388).

Facsimilie to Mark Kapij from Nancy Rabenold, Dec. 20, 1996 (labeled AMS-013-2651-AMS-013-2676).

Online Ringman, Presented by Auction Management Solutions, Inc., Aug. 19, 1997 (labeled AMS-036-1766-AMS-036-1785).

Online Ringman System Requirements Document (SRD), Jul. 30, 1997 (labeled AMS-036-1750-AMS-036-1765).

Letter to Mr. Beyer, from Nancy Rabenold, Mar. 19, 1999 (AMS-036-1889-AMS-036-1890).

Online Ringman Users' Manual (labeled AMS-036-1896-AMS-036-1915).

Letter to Dale Flora, from Mark Kane, Jan. 10, 1999 (labeled AMS-017-1812).

Facsimille to Jake Wilf, from Mark Kane, Feb. 4, 1999 (labeled AMS-017-0708-AMS-017-1710).

Sample Marquis Display, (labeled AMS-036-1851-AMS-036-1856).

ServNews, ServNet Introduces Internet Auction, Aug./Sep. 1998, (labeled AMS-036-1810-AMS-036-1813).

Agreement between ServNet, Inc., and Auction Management Solutions, Inc., Jan. 15, 1999, (labeled AMS-033-0475-AMS-033-0498).

CD having executables and Online Ringman Users' Manual (labeled AMS-38-0001).

Gene W. Lee, Comparison Chart of U.S. Pat. 6,813,612 Claim 1 and The Livebid.com System, Ropes & Gray, 2005, sheets 1-7.

Gene W. Lee, Comparison Chart of U.S. Pat. 6,813,612 Claim 1 and The Auction Channel, Ropes & Gray, 2005, sheets 8-13.

Gene W. Lee, Comparison Chart of U.S. Pat. 6,813,612 Claim 1 and Superior Livestock Satellite Auction System, Ropes & Gray, 2005, sheets 14-18.

Gene W. Lee, Comparison Chart of U.S. Pat. 6,813,612 Claim 1 and SmartWired Auction System, Ropes & Gray, 2005, sheets 19-22.

Gene W. Lee, Comparison Chart of U.S. Pat. 6,813,612 Claim 1 and The Utopia Real Estate Auction System, Ropes & Gray, 2005, sheets 23-27.

Gene W. Lee, Comparison Chart of U.S. Pat. 6,813,612 Claim 1 and The Dutch Auction, Ropes & Gray, 2005, sheets 28-30.

Gene W. Lee, Comparison Chart of U.S. Pat. 6,813,612 Claim 1 and The Online Ringman System Release 2.0, Ropes & Gray, 2005, sheets 31-36.

Gene W. Lee, Comparison Chart of U.S. Pat. 6,813,612 Claim 1 and The Online Ringman Before Release 2.0, Ropes & Gray, 2005, sheets 37-44.

Gene W. Lee, Comparison Chart of U.S. Pat. 6,813,612 Claim 1 and U.S. Pat. 6,449,601, Ropes & Gray, 2005, sheets 45-48.

Gene W. Lee, Comparison Chart of U.S. Pat. 6,813,612 Claim 1 and U.S. Pat. 6,415,269, Ropes & Gray, 2005, sheets 49-54.

Gene W. Lee, Comparison Chart of U.S. Pat. 6,813,612 Claims 1-3 and Utopia Real Estate Auction, Ropes & Gray, 2006, sheets 1-20.

Gene W. Lee, Comparison Chart of U.S. Pat. 6,813,612 Claims 1-3 and Livebid.com, Ropes & Gray, 2006, sheets 21-49.

Gene W. Lee, Comparison Chart of U.S. Pat. 6,813,612 Claims 1-3 and Auction Channel, Ropes & Gray, 2006, sheets 50-73.

Gene W. Lee, Comparison Chart of U.S. Pat. 6,813,612 Claims 1-3 and The SmartWired Auction System, Ropes & Gray, 2006, sheets 74-93.

Gene W. Lee, Comparison Chart of U.S. Pat. 6,813,612 Claims 1-3 and Satellite Auction System, Ropes & Gray, 2006, sheets 94-113.

Gene W. Lee, Comparison Chart of U.S. Pat. 6,813,612 Claims 1-3 and Dutch Auctions, Ropes & Gray, 2006, sheets 114-129.

Gene W. Lee, Comparison Chart of U.S. Pat. 6,813,612 Claims 1-3 and Online Ringman System Release 2.0, Ropes & Gray, 2006, sheets 130-156.

Gene W. Lee, Comparison Chart of U.S. Pat. 6,813,612 Claims 1-3 and Online Ringman Before Release 2.0, Ropes & Gray, 2006, sheets 157-217.

Gene W. Lee, Comparison Chart of U.S. Pat. 6,813,612 Claims 1-3 and Online Ringman Users' Manual, Ropes & Gray, 2006, sheets 218-249.

Gene W. Lee, Comparison Chart of U.S. Pat. 6,813,612 Claims 1-3 and AMS' Mar. 1, 1998 Letter to Ritchie Bros. Auctioneers, Ropes & Gray, 2006, sheets 250-273.

Gene W. Lee, Comparison Chart of U.S. Pat. 6,813,612 Claims 1-3 and U.S. Pat. 5,774,873 & CU-SeeMe video conferencing & Utopia Real Estate, Ropes & Gray, 2006, sheets 274-288.

Gene W. Lee, Comparison Chart of U.S. Pat. 6,813,612 Claims 1-3 and U.S. Pat. 6,49,601, Ropes & Gray, 2006, sheets 289-329.

Cutts, D.J. "DVB Conditional Access" Electronics and Communication engineering Journal, Feb. 1, 1997, pp. 21-27, vol. 9, No. 1.

Wright, D.T. "Conditional Access Broadcasting. Datacare 2 An Over-Air Enabled System for General Purpose Data Channels" BBC Research and Development Report, Aug. 1, 1988, pp. 1-18, No. 10.

Buer, M. et al. "Integrated Security for Digital Video Broadcast" IEEE Transaction on Consumer Electronics, Aug. 1, 1996, pp. 500-503, vol. 42, No. 3.

Anonymous, "DoveBid Announces Live Webcast Capabilities for On-Site B2B Asset Auctions", Business Wire, Dialog File 621: Gale Group New Product Announcements, Feb. 22, 2000.

Beauprez, Jennifer, "Wolf's Moves Auctions Into Cyberspace", Crain's Cleveland Business Journal, Aug. 16, 1999.

Albright, Peggy, "The Gavel Taps for Bid-ness", Wireless Week, vol. 6, No. 10, p. 30, Mar. 6, 2000.

Zuhl, Jaonne, "Online Auctions Provide New Markets for Wisconsin Firms, Entrepreneurs", DRTBN Knight-Ridder Tribune Business News, Apr. 18, 2000.

See attached Exhibit listing of items 1-53 which are also attached.

* cited by examiner

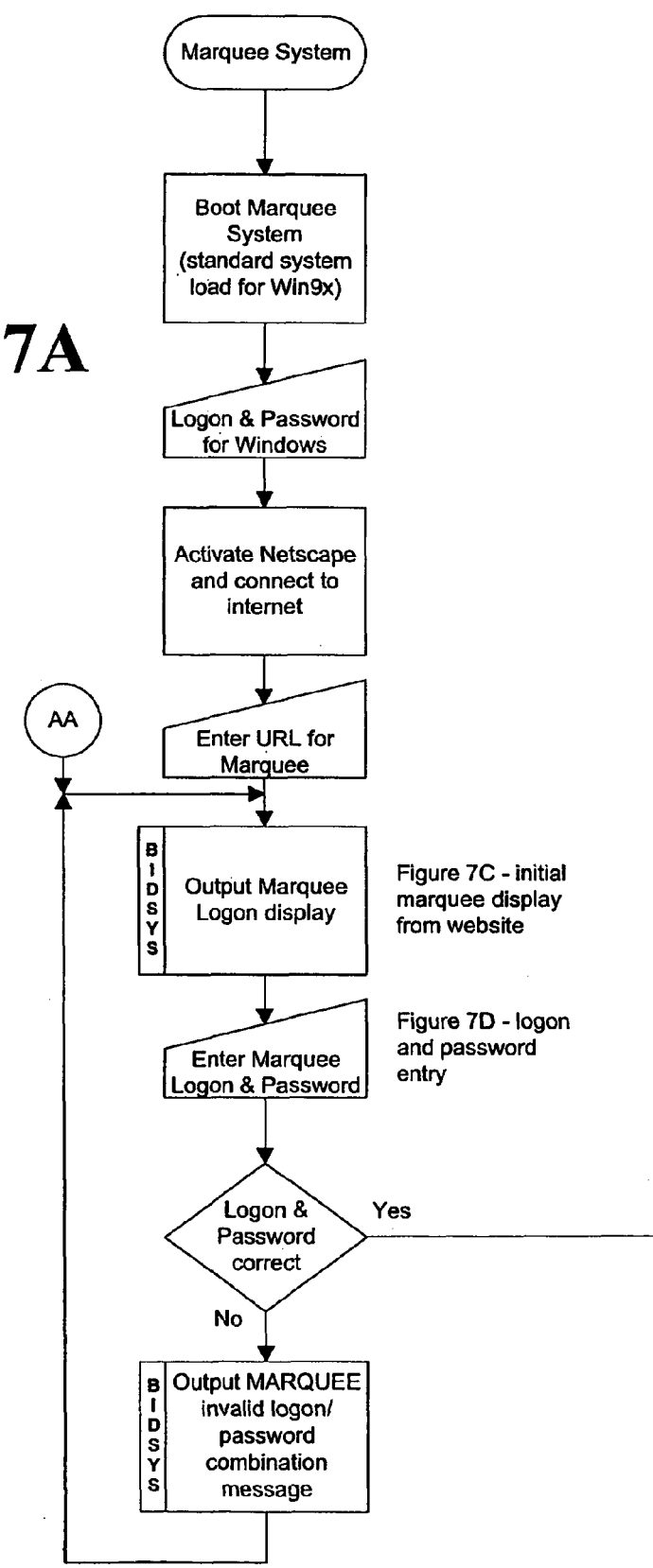
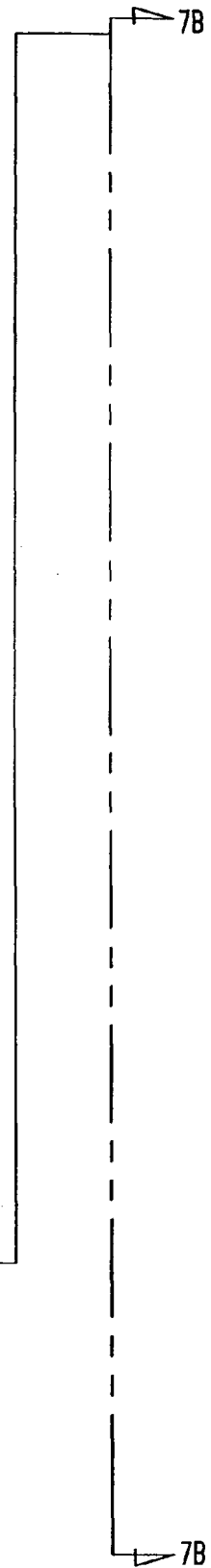
Fig. 7A

Purchase Info

| Vehicle | 1 |
| Bidder | 656 |
| Current Money | $4300 |

$4400

> lane bidder holds 1 for $4100
> lane bidder holds 1 for $4200
> 656 holds 1 for $4300
SOLD: 656 takes 1 for $4300

Reload

| Gen. Cond | Rating | | |
| --- | --- | --- | --- |
| | 3 | | |
| Year | Make | Model | Trim |
| 1992 | FORD | AEROSTAR | |
| Milage | Ext. Color | Run # | Doors |
| 174841 | WHITE | 1 | 0 |
| Cyl. | Trans | 4 x 4 | Turbo |
| 6 | AUTOMATIC | | |
| Int. Color | Int. Type | Est. Vehicle Damage Total | |
| N/A | | 835 | |
| Radio | AC | Pwr Steer | Pwr Locks |
| FM Radio | AC | PS | |
| Pwr Windows | Pwr Seats | Pwr Brakes | ABS Brakes |
| | | PB | |

Reload

Fig. 13J

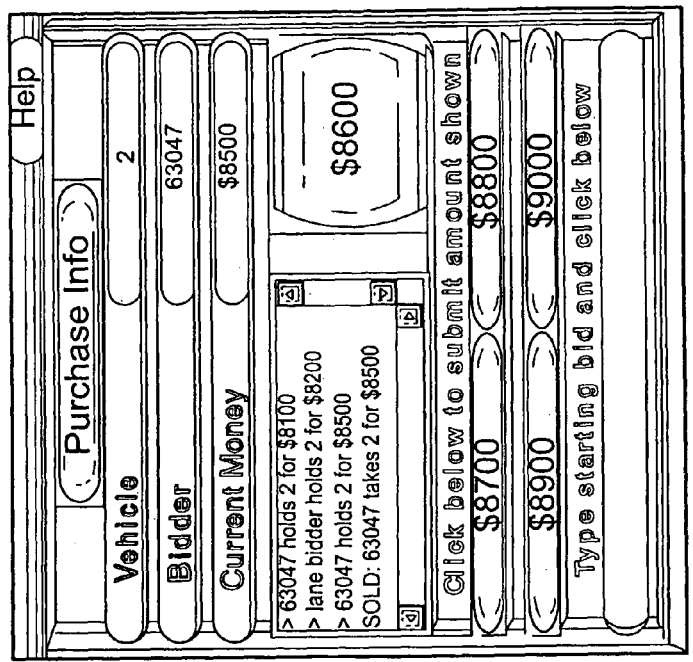
Fig. 23A

Reload

INTEGRATED ON-LINE AND ON-SITE AUCTIONING SYSTEM INCLUDING AUDIO AND/OR VIDEO CAPABILITIES

CROSS-REFERENCE TO RELATED APPLICATIONS

This application is a continuation of U.S. patent application Ser. No. 09/866,191 filed on May 25, 2001 now U.S. Pat. No. 6,813,612, which claims benefit of the filing date of U.S. provisional application for patent having been assigned Ser. No. 60/207,030, and filed on May 25, 2000. This application also incorporates by reference the computer program listing appendix ("System Software") Copy 1 and Copy 2 containing the files having the dates of creation and size in bytes set forth in Exhibit A.

TECHNICAL FIELD

The present invention relates to the field of converging real-life events and remote access through network communications, and more particularly, to a remote bidding supplement for traditional live auctions that provides the capability for a user to instantaneously interact with and enjoy the emotion and enthusiasm of a traditional, live auction (i.e., view items for sale, view live bidding, hear the auctioneer calling bids, view the activities of the onsite participants, make bids, buy items) from a position that is physically remote from the live auction.

BACKGROUND OF THE INVENTION

Traditional-style auctions are ignoring a significant market—the physically remote purchasers who will purchase an item without being physically present to kick the tires, feel the smoothness of a vase, hear the roar of a diesel engine or authenticate an ancient item.

Currently, there are two types of remote auction systems. The first type of remote auction system has no "live" auctioneer and the entire bidding audience must be connected to the network or system. In this case, the network computer or server acts as the auctioneer, accepting bid values from the connected audience with associated time stamps based upon bid receipt by the server. Each bid is either accepted or rejected by the server; the bidder (sometimes the entire audience) is notified of its acceptance or rejection. All of the items for sale in this type of auction are generally available for the entire duration of the auction and each item has a specified end time after which no bids will be accepted.

The second type of remote auction system is much like the first; however, it may or may not have a "live" auctioneer. The main difference from the first type of remote auction system is that each item for sale is not available at the same time; rather, the auction moves from item to item and depending upon the bidding activity and upon either the server's or "live" auctioneer's choice, the item is sold and the event moves on to the next item on the list.

A disadvantage of remote auctioning systems is that the participating bidders are not engrained into the excitement and energy of the live auction. From the perspective of an auction company, this can have a significant impact on the success, or the earnings, of the auction company. Many books have been written about the psychology of the auction floor and the best auctioneers are talented in the science of reading a crowd and individuals, playing them off of each other, and drawing larger bids for the items being auctioned. Thus, there is a need in the art for a technique to integrate remote auctioning systems into the real life environment of the auction floor. There is also a need in the art to allow the auctioneer to extend his or her talents beyond the auction floor and "work" the crowd of remote bidders as well as the local bidders. There is also a need in the art to integrate remote bidders into a live auction setting in a manner that does not alienate or result in giving an advantage to either the local bidders or remote bidders.

SUMMARY OF THE INVENTION

The present invention allows for prospective auction bidders to participate both in person as well as in a remote capacity. The present invention enables an existing traditional-style auction company to utilize technology that allows an auction to be conducted in the traditional style, generating the emotion and enthusiasm in the local audience, leaving the auctioneer in control of the sale, while providing the opportunity for other bidders to "attend" the auction event remotely (e.g., via the Internet), sharing the same emotion and enthusiasm as the local audience and participating in the bidding process without disadvantage, just as if those physically remote bidders were sitting in the local auction audience.

The present invention provides the catalyst for changing the live auction process by ensuring an environment in which all parties—whether in person or in a remote location—can participate as one audience without impact to the natural flow, speed and excitement of the live auction. Advantageously, the present invention allows remote bidders to compete—without disadvantage or a minimized disadvantage—against live floor bidders in an instantaneous bid environment while realizing the true emotion and enthusiasm of the traditional auction setting. The remote bidding system of the present invention operates to enhance the live auction process rather than to alter it. The control of the auction can easily remain with the live auctioneer and the auction company. The auctioneer can effectively and efficiently take bids from either the local audience or from the remote audience (e.g., via the Internet or some other local or global network). As in all traditional live auctions, the auctioneer can accept or reject any given bid from the local or remote audience. The system in effect greatly enlarges the potential pool of bidders by eliminating time, geographic or travel constraints on behalf of the bidder and quickly increases the potential reach of the auction company from a regional business to potentially a nationwide or worldwide business.

Goals of a successful seamless integration of a remote auction audience with the local or onsite audience include: (a) allowing the remote bidder to rapidly make a purchase decision, (b) not alienating the bidders who took the time to actually come to the auction event, and (c) instilling the confidence of all parties (onsite, remote and the auction company) in the integrity of the process. The remote bidding system of the present invention accomplishes this through the following systems of the present invention.

1) Audio/Video System—The actual emotion and enthusiasm of a traditional-style auction event is transferred to the remote bidder or participant through streaming audio technology and further enhanced through real-time video technology. The audio is transmitted from the auction site to the remote participants with minimum delay through the network and the video is transmitted in real-time at a frame rate that supports a 56K modem connection to the network. Competing streaming live audio and video technologies of today utilize a buffering method at the encoding and/or the receiving end to achieve an acceptable level of quality for audio and video. In a traditional-style auction environment (i.e., dealeronly automobile auctions), an item may be sold every 7 to 30 seconds with approximately 10 to 30 bids. Buffering at the encoding and/or the receiving end typically adds 7 or more seconds in delay to the audio and video that would place the remote participant at an extreme disadvantage. The present invention removes the buffering without sacrificing quality and with a resulting delay that can be as little as one (1) second or less.

2) Bid/Clerk Systems—A Bid System controls the instantaneous interactions between the remote bidders, a Clerk System, and a Marquee System. The Clerk System controls the sequencing of items to be sold through the auction and controls the auction bidding process, both live and remote, for each item to be sold. The Marquee System displays instantaneously auction bid information for each item being sold at auction. The Bid System can include one or more bidding engines, including but not limited to the following bidding engines:

a. Cherokee Bid Engine—The Cherokee bid processing algorithm within the Bid System allows the auction to proceed at a very fast pace (in excess of 120 items per hour with sometimes as many as 30 bids per item). This algorithm uses a fixed increment predictive algorithm to present bid choices to both the Clerk System as well as the remote bidders. The Cherokee model also assigns the default high-priority to the remote bidders, but allows the auctioneer and Clerk System to change for any specific bid.

b. Iroquois Bid Engine—The alternative Iroquois bid processing algorithm within the Bid System allows the auction to proceed at a fast pace while adding flexibility in its fixed increment predictive algorithm to accommodate a range of fixed increments depending on the actual last high bid. The Iroquois model assigns the default high-priority to the onsite/local bidders, while allowing the auctioneer and Clerk System to change any specific bid.

c. Apache Bid Engine—The alternative Apache bid processing algorithm within the Bid System addresses many of the auction segments that do not operate with a fixed increment policy. In this model, the auctioneer's "asking price" chant is followed by selecting the newest asking price on the Clerk System and allows remote bidders to submit a bid for that price.

3) Marquee System—Another aspect of the present invention is the design of the Marquee that can be physically placed at the auction site. For implementations of the remote bidding system where the auction selects to include the Marquee System, the Marquee is used to:

a. identify incoming remote bids to the auctioneer;

b. identify incoming remote bids to the onsite/local audience to create confidence that there is a remote bidder and the identity of the remote bidder; and c. identify to the onsite/local audience the item being sold as well as the current high bid amount accepted (the onsite/local audience starts to bid off the Marquee).

4) Data Mining—The data mining bid log processing capability of the present invention is a unique function that provides auction companies with the ability to quickly analyze the auction event's activity to assess national and international market value of the sale items, the participation of any or all remote bidders or the incremental value-add brought by the remote auction capability. When the data mining bid log is evaluated in conjunction with the pre-sale catalog and the condition report of the item, an expeditious assessment can be made of how the features and the characteristics (e.g. damage to an automobile) of the sale item may impact the re-marketability of the item.

BRIEF DESCRIPTION OF THE DRAWINGS

FIGS. 7A and 7B are flow diagrams illustrating details of the process flow for the Marquee System 140 in interfacing with the Bid System 120.

FIG. 8A illustrates an example of a display for a Bidder Device 110 where the Cherokee bid engine has been implemented.

FIGS. 23A/23B illustrates examples of Bidder Device 110 display and FIG. 23C is a Clerk System 130 display from the Mohawk Bid Engine of the present invention.

DETAILED DESCRIPTION

Turning now to the figures, various embodiments and features of the present invention will be described. One of the uniquenesses of the remote bidding supplement of the present invention is its ability to perform the remote bidder interactions in an instantaneous or near real-time environment independent of the distance between the remote bidder and the live auction. It should be understood that the terms instantaneous and near real-time are viewed from the user's perspective. Depending on the actual technology employed to implement the present invention, the speed and quality of the system can vary but, in any of the embodiments of the present invention, the goal is to provide interaction in a manner that appears to be instant from the user's perspective.

Figure 1:
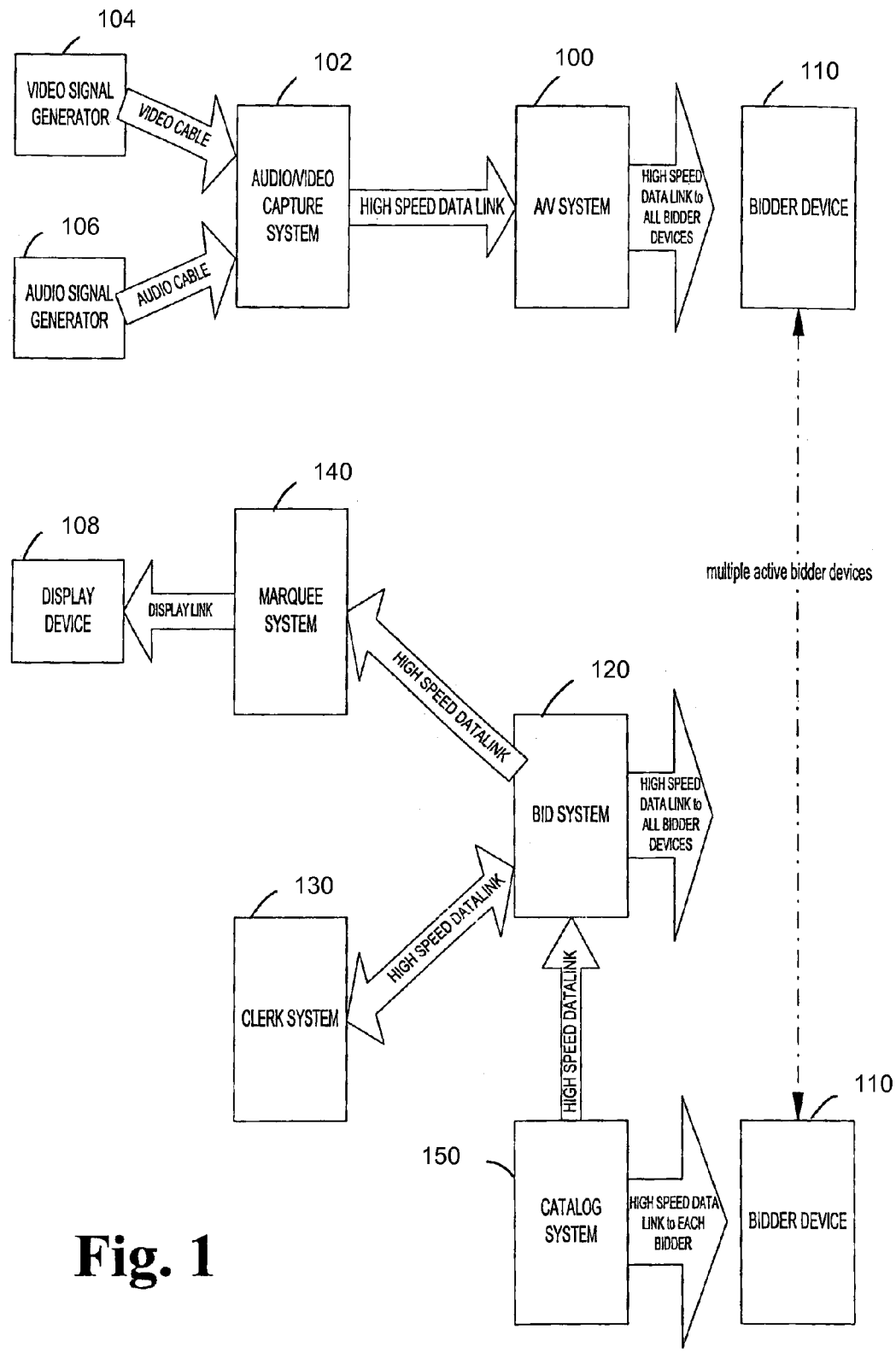
FIG. 1 is a schematic of an exemplary environment suitable for an embodiment of the present invention.

FIG. 1 is a schematic of an exemplary environment suitable for an embodiment of the present invention. In the illustrated embodiment of the remote bidding supplement of the present invention, the system includes:

Three systems, each of which is preferably co-located, to perform the control functions of the auction:

An A/V System 100 to receive the audio/video stream from the A/V Capture System 102 at the auction and retransmit this stream instantaneously to each of the Bidder Devices 110 of the remote bidders participating in the auction.

A Bid System 120 to control the interaction among the Bidding Devices 110 of the remote bidders, a Clerk System 130, and a Marquee System 140.

A Catalog System 150 to maintain the pre-sales data on items to be sold (this function may alternatively be performed by either the A/V System 100 or the Bid System 120 referenced above). In the normal auction configuration, the pre-sales catalog information is kept on the Catalog System 150.

A Marquee System 140 to display current bid information onto a Marquee System Display Device 108, from either floor or remote bidders, to the gallery/auctioneer/ringmen at the live auction.

A Clerk System 130 that controls the sequencing of items through the auction and controls the auction bidding process for each item to be sold.

An A/V Capture System 102 to provide the audio/video stream from the Video Source 104 and Audio Source 106 at the auction to the A/V System 100 controlling the transmission of the stream to the Bidder Devices 110 of the remote bidders. The remote bidding supplement of the present invention can perform the audio/video streaming and the remote bidder/clerk interaction as two independent functions.

The A/V Capture System 102, which may consist of specific hardware cards installed in a computer system, encapsulates the audio/video stream. The A/V Capture System 102 interfaces to a Video Source 104 and an Audio Source 106. This data is transmitted to the A/V System 100 where it is re-encapsulated and broadcast to each of the Bidder Devices 110. This function can be performed independent of the Marquee System 140, Clerk System 130 and Bid System 120. In one embodiment, the auction bidding process can be controlled by the Bid System 120 and the Clerk System 130. Data for each item to be sold is extracted from the system maintaining the pre-sales information prior to the auction start, transferred to the Bid System 120, and broadcast to all Bidder Devices 110 and the Marquee System 140 as the items are auctioned. A starting bid is established on the Clerk System 130 and then bids are accepted from floor or remote bidders. Status is transmitted to the Marquee System 140 and the Bidder Devices 110, and logs are maintained identifying activity including status of each bid made by a remote bidder.

A "bid engine" algorithm is involved in controling the remote bidding process. There are four main bid engines that can be utilized. The primary functions of these engines are similar; however, differences exist in the areas of automatic versus controlled acceptance of a remote bid; bid increments used by the Clerk System 130 and Bidder Device 110; ability to enter starting bids by a Bidder Device 110 from a remote bidder; and display formats. These engines are identified as:

CHEROKEE

IROQUOIS

MOHAWK

APACHE

Although specific details for each of these bidding engines are provided, these details are for illustrative purposes only and the present invention is not limited to the use of any one or multiple of these engines. Rather, other bidding engines can also be employed in various embodiments of the present invention.

In a practical embodiment of the present invention, the A/V System 100, the Clerk System 130, and the Marquee System 140 are assigned to an "area" within the Bid System 120 called an environment. Bidders entering into an auction through a Bidder Device 110 are assigned to that same environment.

Figure 2:
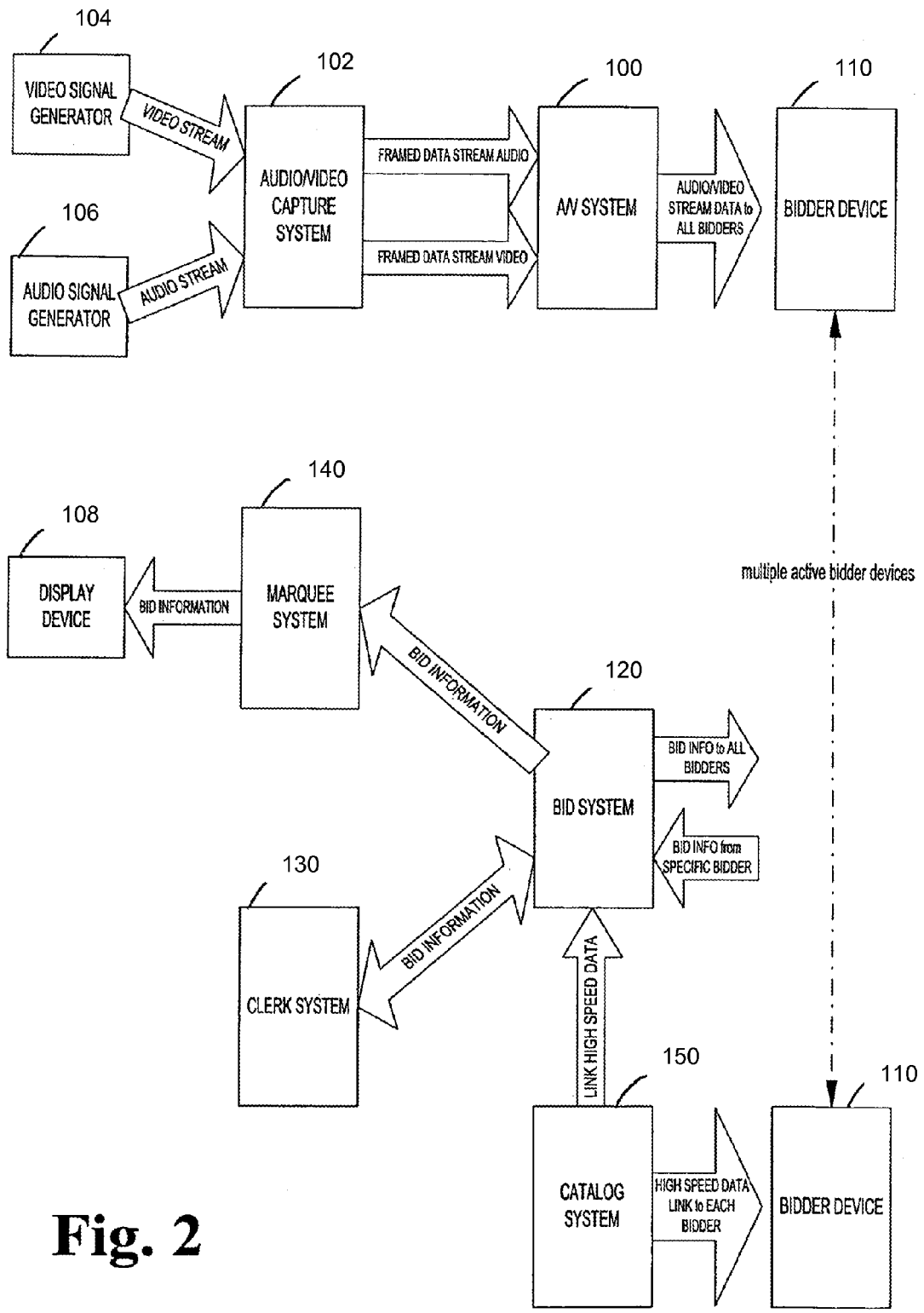
FIG. 2 is a schematic of the dataflow within the exemplary environment illustrated in FIG. 1.
Figure 3:
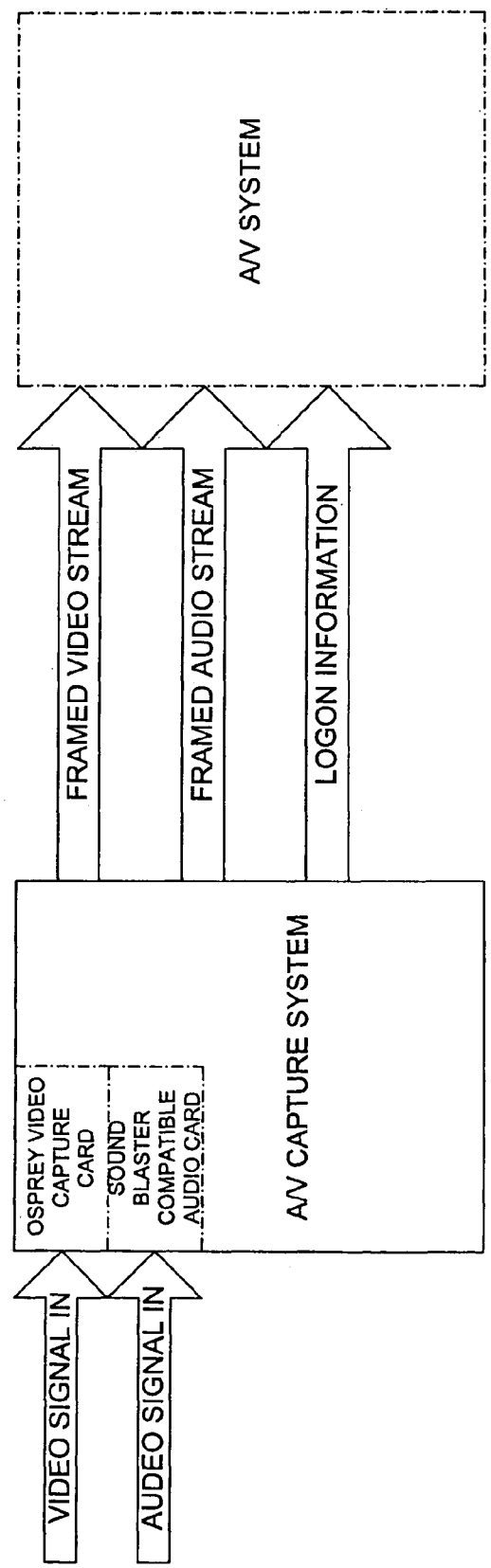
FIG. 3 is a schematic of the dataflow within the exemplary environment between the Audio/Video Capture System 102 and the Bid System 120 of the present invention.
Figure 4:
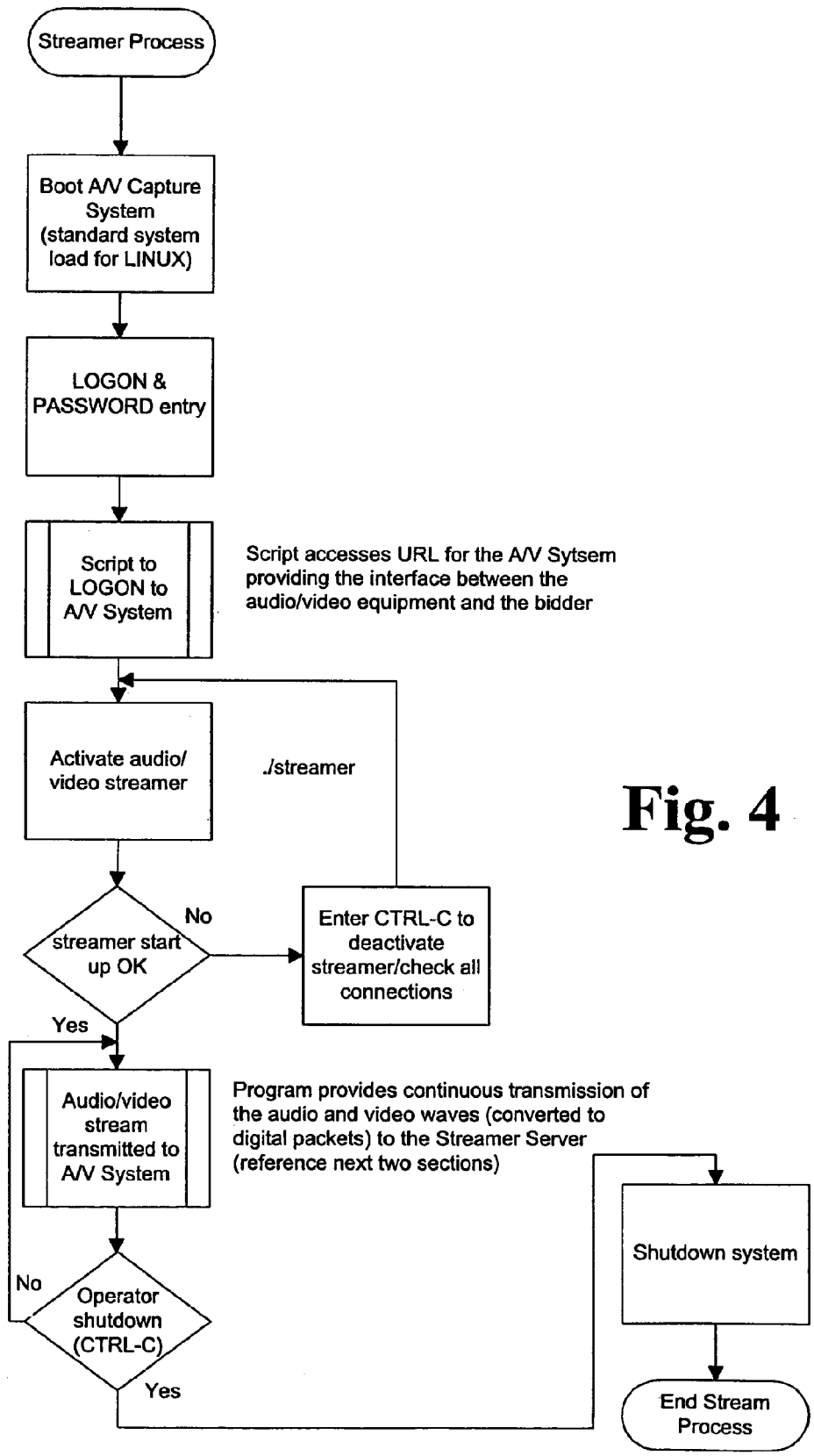
FIG. 4 is a schematic of the Audio/Video Capture System 102 of the present invention.
Figure 5:
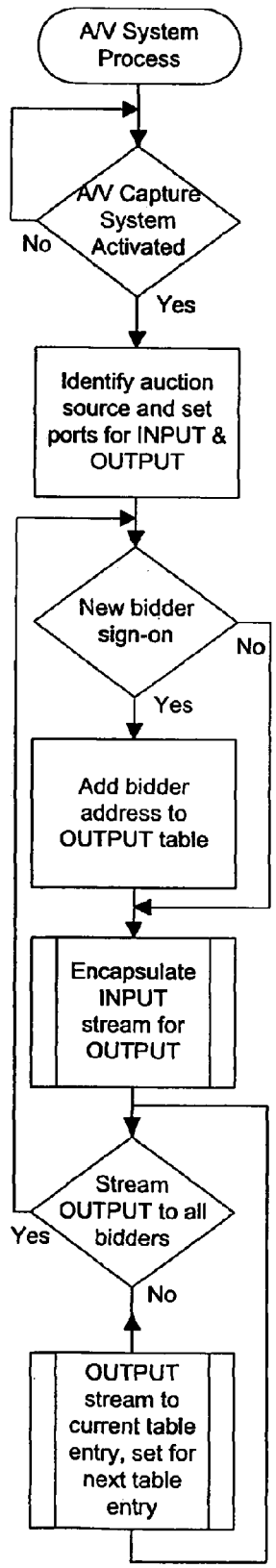
FIG. 5 is a schematic of the Audio/Video System 100 of the present invention.

FIG. 2 is a schematic of the dataflow within the exemplary environment illustrated in FIG. 1.

Aspects of the present invention can be implemented using a variety of hardware platforms, software languages and programming environments. Those skilled in the art will readily observe that implementing the present invention in various environments will naturally require the use of various technologies. However, the present invention is not limited to any particular division of hardware/software functionality, hardware components, software languages, or programming techniques. Thus, references within this description identifying design particulars are provided only for illustrative purposes and should not be construed to limit the present invention.

In addition, the exemplary environments identifying particular systems are provided for illustrative purposes. The various systems have been divided out into functional groupings. It should be understood that various functions could be performed on a single computer or on several computer systems operating in tandem. As an example, the Bid System 120, the A/V System 100 and the Catalog System 150 could simply be various software modules running on the same computer that includes a multi-tasking operating system and the Clerk System 130, the Marquee System 140 and the A/V Capture System 102 could also be operating on the same system at the auction site.

The various functional systems of the present invention are described more fully below. However, it should be understood that any particular embodiment of the present invention may not necessarily include each and every functional system described.

Software Description

The software description for the Audio/Video Streamer 102 is contained in the Audio/Video Subsystem Overview, infra.

General Configuration

In the preferred embodiment, the Marquee System 140, the Clerk System 130, and the Bidder Device 110 displays utilize a basic network technology as the basis for displaying information specific to their functions. Each system connects to a unique network address as part of the login process for the system. Once the login process is complete, the system is linked to that network address. At that point, a base display is active and, in some embodiments, can be generated at specific coordinates on the display. The base display contains the background frame with dynamic display areas blank. Advantageously, this reduces the size of the data packets required when an operator/system action is taken during the normal system operation. From this point forward, small data packets are sent to specific cursor addresses on the appropriate display. For example, when a floor bid is entered on the Clerk System 130;

The Marquee System 140 is updated with the specific bid amount and bidder #;

The Clerk System 130 is updated with new bid increments plus a log message; and The Bidder Device 110 is updated with new bid buttons plus last bid value.

The second factor that is related to reducing the update time required for display changes is the ability to "broadcast" the same data to all systems connected to a particular network address, primarily the Bidder Devices 110. Each system performing a particular function receives the same data at the same time from the Bid Server 120 perspective. The only delay in receipt of the information from the Bid System 120 is the inherent delay in the distance and method of the transmission over their respective communication links.

Throughout the bid processing, movement of the cursor "selectable bar/button/etc." causes the selected item to either change color (e.g., yellow to red) or change from its idle color to no color (i.e., the frame color).

The displays generated by the system can be changed either at compile time or within the code used to output the static portions of the display. For example, NEXT ITEM can be replaced with NEXT VEHICLE for a Clerk System 130 display associated with an automotive auction; REMOTE BID could be replaced with INTERNET for a specific interne auction; the $ in activity log messages and on bid buttons can be changed to £ for an auction in the United Kingdom. Thus, the use of static portions on dynamic displays advantageously allows for greater flexibility in the bidding system.

The Bid System 120

The Bid System 120 communicates with the Bidder Devices 110 over a communications network. To provide the instantaneous look and feel of operation, this network must be able to deliver information in a timely fashion. In a preferred embodiment of the present invention, the networking is implemented in UDP or RUDP (reliable UDP) although other technologies could also be utilized. For instance, a TCP network could be implemented; however, the UDP network is significantly more efficient in that the latencies in data delivery are improved over TCP. Other networking techniques could also be employed and as technology advances, new techniques may be preferred.

In a preferred embodiment of the present invention, the Bid System 120 uses CGI (common gateway interface) programs for relaying information from an SQL database to the user. The Bid System 120 structure is to accept queries, look up the appropriate information from the SQL database or its internal cache, and determine a response and send it to a group of bidders it has registered as being interested in that type of message. In this process, it may alter the state of the database.

Bidder Device 110

The Bidder Device 110 is used by a remote bidder to view the events at the live auction via the audio/video stream transmitted to each Bidder Device 110 from the A/V System 100 and to interact with the auction through the Bid System 120, Clerk System 130 and Marquee System 140. The bidder display of the Bidder Device 110 presents a sequential history of the bids as defined by the Clerk System 130. During the bidding for each item, the Bidder Device 110 allows the user to enter a bid for that item which is transmitted to the Bid System 120 controlling the auction. Recognition of the bid and whether or not it is to be transmitted to the Clerk System 130 and Marquee System 140 is communicated to the Bidder Device 110 and the Bid System 120 is then ready to process another bid from that remote user. The acceptance of the bid and the display returned to the user can be controlled by either the Bid System 120 or the Clerk System 130. The Marquee System 140 is independent of these actions and only receives "website updates" from the Bid System 120 based upon actions by the Clerk System 130 and the Bidder Devices 110.

In a preferred embodiment of the present invention, the display used by the Bidder Device 110 may be reset at three basic points in the process:

1. The base display is generated and made available to all bidders as each bidder logs onto the required network address. At this point, the Bidder Device 110 display may contain the audio/video stream from the A/V System 100 plus the base frame for the bid buttons.

2. When the clerk enters NEXT ITEM, the display is updated to contain the information for the item in a pre-set area of the display. This data area is not updated until the NEXT ITEM is selected for the bid process. If the bidder enters into the system in the middle of the bidding for a specific item, this area may not contain data until the NEXT ITEM is selected.

3. The base frame (containing bid buttons and the activity log) may be updated each time an action is taken by the Clerk System 130, the remote bidder, or any other bidder during the bidding sequence for a particular item.

The bidder display may also contain one or more "RELOAD" links on the display. These links allow the individual bidder to reload a particular area of the display.

In a preferred embodiment of the present invention, a Bidder Device 110 reconnects to the A/V System 100 that is broadcasting the audio/video stream when RELOAD near the video portion of the Bidder Device 110 display is selected.

In a preferred embodiment of the present invention, a Bidder Device 110 disconnects from the Bid System 120 and returns to the logon display when RELOAD near the bidding portion of the Bidder Device 110 display is selected.

Figure 8A:
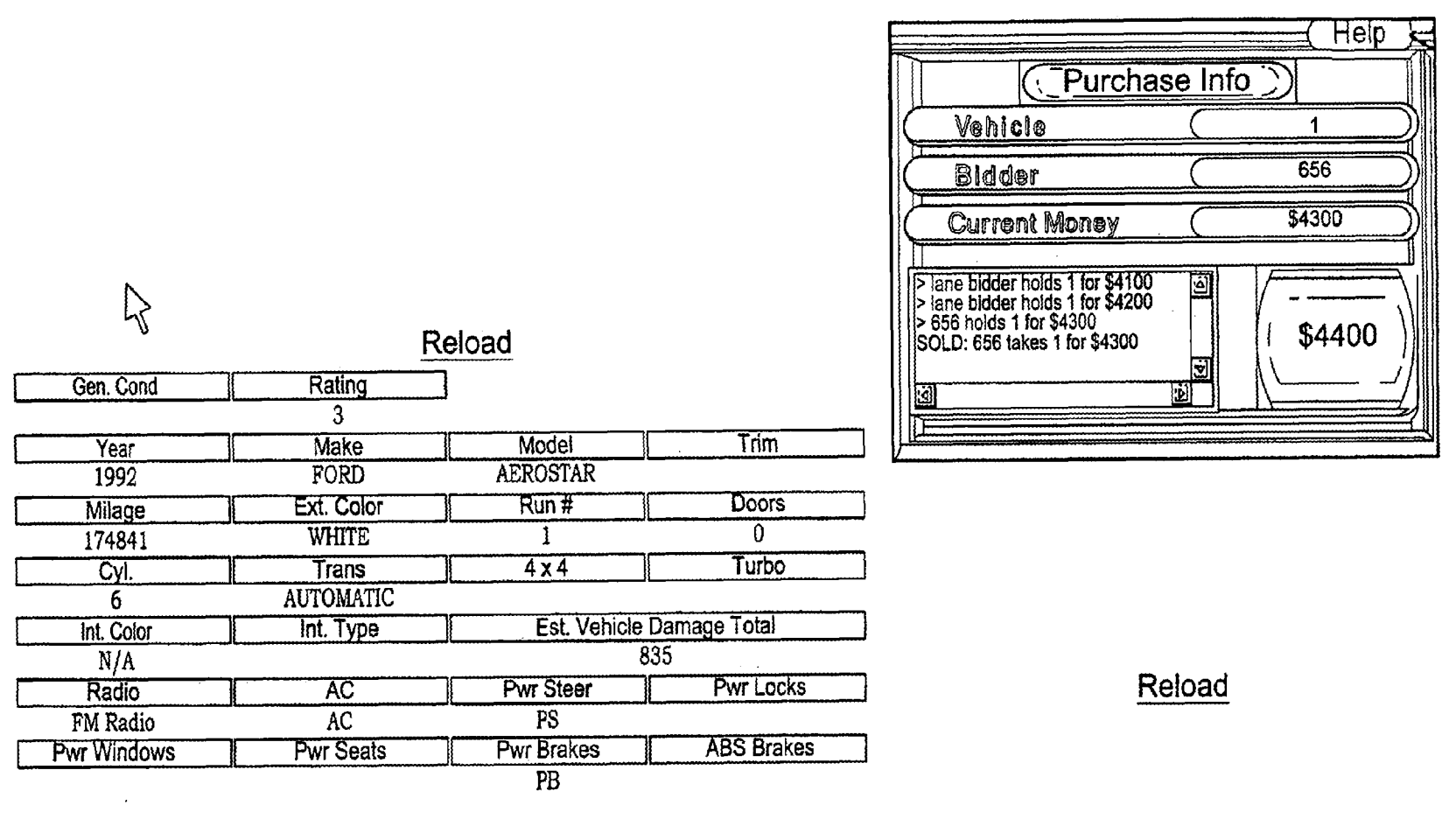
Figure 8B:
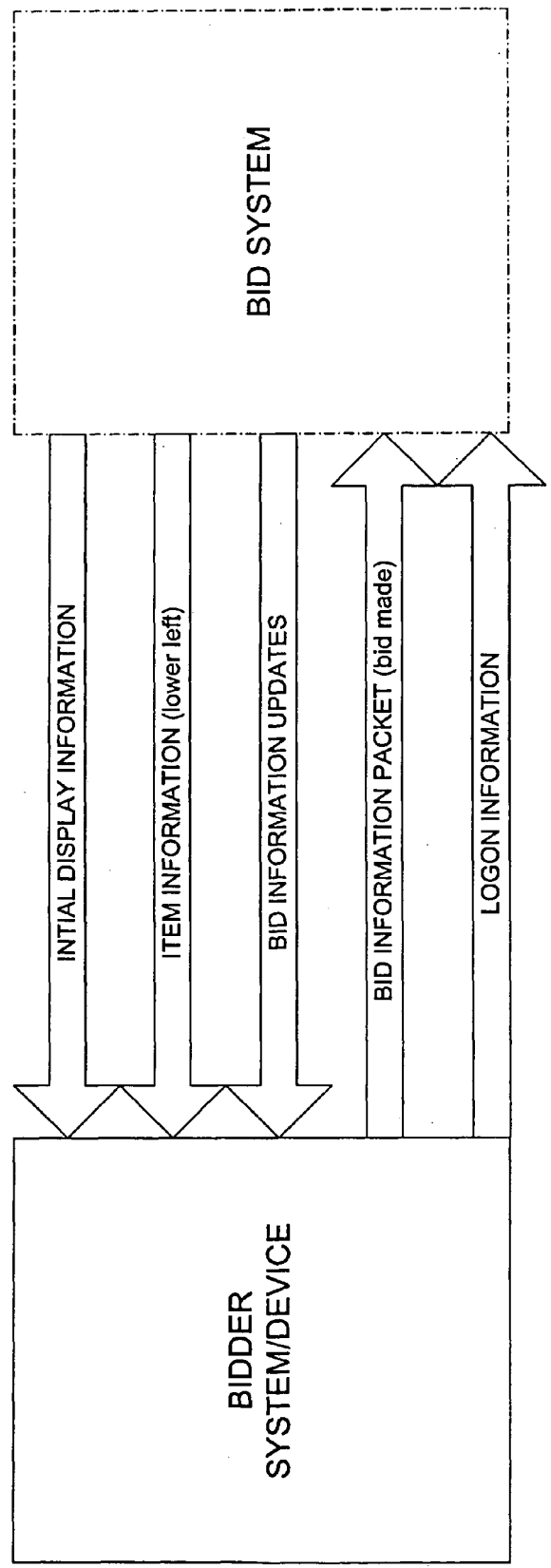
FIG. 8B is a block diagram illustrating the details of the interface between the Bidder Device 110 and the Bid System 120.
Figure 9A:
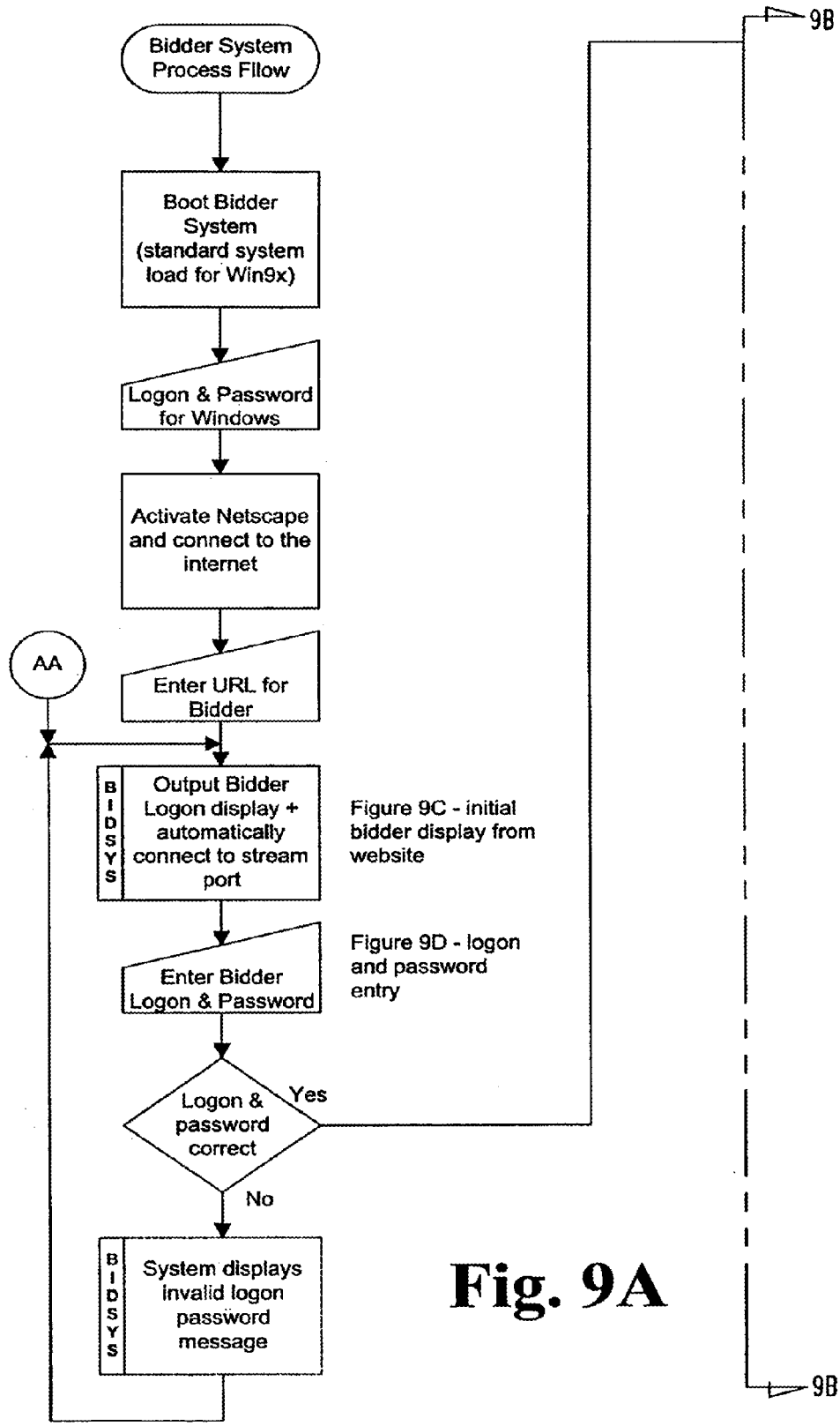
FIGS. 9A and 9B are flow diagrams illustrating the details of operation for the Bidder Device 110.
Figure 9B:
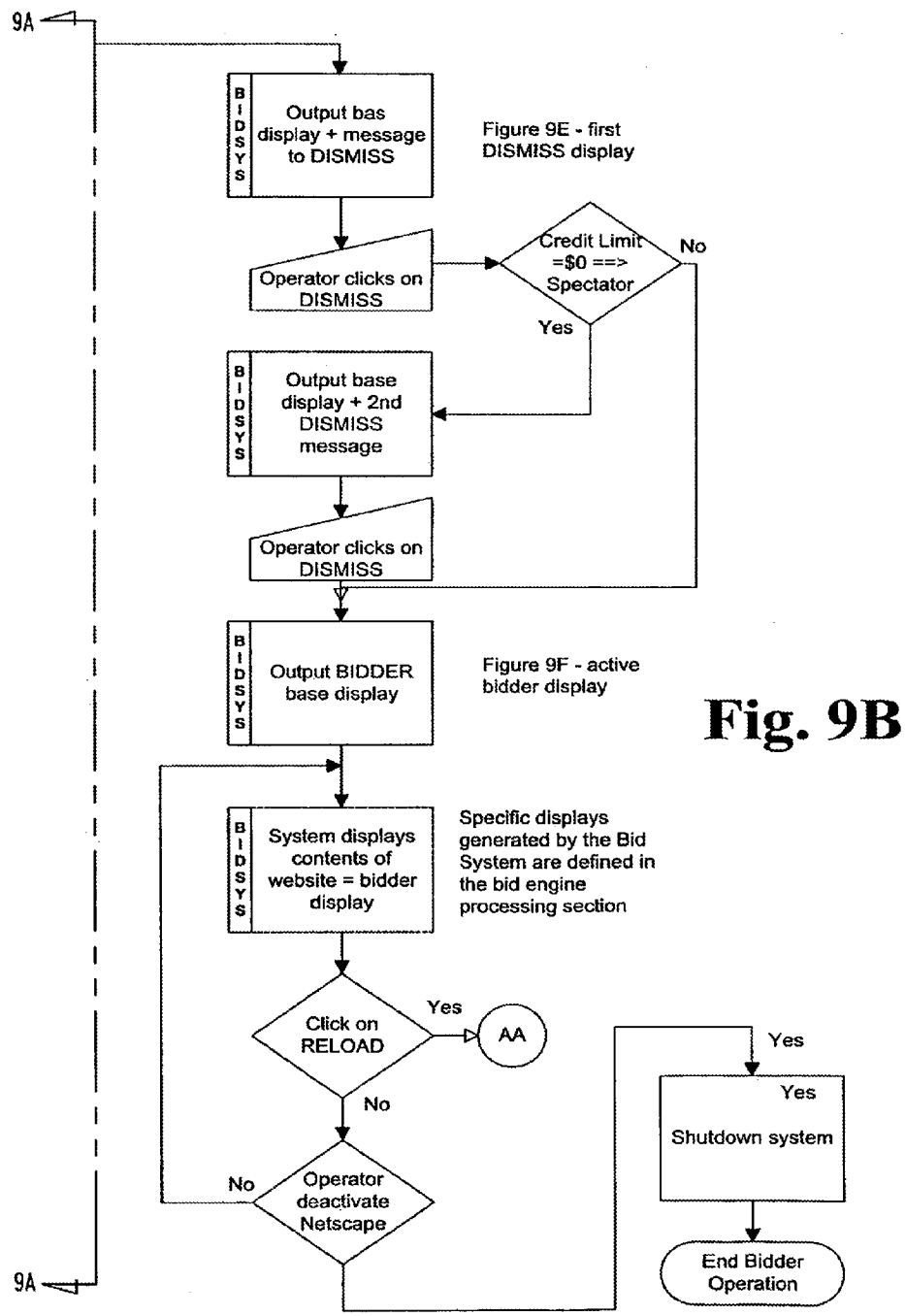

FIG. 8A illustrates an example of a display for a Bidding Device 110 where the Cherokee bid engine has been implemented. FIG. 8B is a block diagram illustrating the details of the interface between the Bidder Device 110 and the Bid System 120. FIG. 9 is a flow diagram illustrating the details of operation for the Bidder Device 110.

Catalog System 150

Prior to the start of each auction, it may be necessary to load catalog data and user data into the Bid System 120 specific to the scheduled auction. A subset of the catalog data may be utilized to generate the data that is displayed on the Bidder Device 110 display during the auction. The user data is used to identify the access each "bidder" has to the bid process (spectator, bidder with credit limit, Clerk System, Marquee System).

The pre-sales catalog data is preferably maintained as a separate data set for each auction. Depending on the format the data is stored in, various pre-processing functions may be required prior to delivering the catalog data to the Bid System 120. For instance, in one embodiment, pointers may need to be set to the beginning of a bidders log and bid log file. In addition, it may be necessary to set the bid engine to start at the first item in the database (a sequence number within the database can be used to establish the order in which items are processed by the bid engine).

In one embodiment, a process may run that extracts an inventory subset from the catalog data to be stored on or accessible to the Bid System 120. The inventory subset contains data for the Bidder Device 110 display and data for the Marquee System 140 related to each item to be auctioned.

This process extracts the inventory data from the inventory file provided to the Catalog System 150 and the condition report data from the damage data provided to the Catalog System 150. The extracted inventory data and damage data may be subsets of the total data provided for each item. The data extracted is dependent on the format defined by the auction.

The user file includes access information for each user scheduled to connect to the Bid System 120 during an individual auction. Table 2 identifies an exemplary format for the user file. The data fields in the user file can include:

Field1=user ID, this is the "logon" user name
Field2=password
Field3=user type; 1=bidder, 2=clerk, 4=marquee
Field4=credit limit for this auction
Field5=field set to $0; during the auction, this field is updated on the Bid System 120 to contain the total value of items purchased by each bidder.

The user file is loaded for specific auction environments. The information in the user file can be formatted into internal tables the bid engine utilizes during the live auction. Table 2 illustrates an example of such an internal table.

TABLE 2

| User File Format | | | | | |
|---|---|---|---|---|---|
| 5011748 | 84711053 | 1 | 900000 | 0 | user with $900,000 credit limit |
| 656 | 1101265 | 1 | 999999999 | 0 | user with unlimited credit limit |
| 52965 | 3573179 | 1 | 20000 | 0 | |
| 5033281 | 182305 | 1 | 500000 | 0 | |
| 5050186 | 6810505 | 1 | 200000 | 0 | |
| 5032832 | 2382305 | 1 | 50000 | 0 | |
| 5032025 | 5202305 | 1 | 500000 | 0 | |
| 5050658 | 8560505 | 1 | 25000 | 0 | |
| 5025609 | 9065205 | 1 | 100000 | 0 | |
| 5042804 | 4082405 | 1 | 20000 | 0 | |
| 5004057 | 7504005 | 1 | 200000 | 0 | |
| 5032640 | 99983126 | 1 | 250000 | 0 | |
| 5045095 | 5905405 | 1 | 250000 | 0 | |
| 5011587 | 7851105 | 1 | 30000 | 0 | |
| 5029894 | 89583277 | 1 | 30000 | 0 | |

TABLE 2-continued

| User File Format | | | | | |
|---|---|---|---|---|---|
| 10006 | 6006 | 1 | 0 | 0 | User with $0 credit limit = spectator |
| 10015 | 150015 | 1 | 0 | 0 | |
| 63046 | 64036 | 1 | 999999999 | 0 | |
| 5061648 | 8461605 | 1 | 999999999 | 0 | |
| 63056 | 65036 | 1 | 999999999 | 0 | |
| 5035425 | 55245305 | 1 | 75000 | 0 | |
| 5057863 | 3687505 | 1 | 999999999 | 0 | |
| 5058742 | 2478505 | 1 | 999999999 | 0 | |
| 5059001 | 9500051 | 1 | 999999999 | 0 | |
| Clerk | Servnet | 2 | 0 | 0 | Clerk access |
| Marquee | Servnet | 4 | 0 | 0 | Marquee acess |
| User1 | Iytdirdir | 1 | 0 | 0 | |
| User2 | Abcdef | 1 | 0 | 0 | |

The Marquee System 140

The Marquee System 140 is the visual link between the auctioneer/ringmen, the live gallery, and the remote bidder. The Marquee System 140 can employ audio and/or visual prompts to the auctioneer to indicate that a bid has been made by the remote bidder. In some embodiments, this system can be a display-only function that is controlled by the Bid System 120 based on inputs from the Bidder Device 110 (entry of a bid) or the Clerk System 130 (operator acceptance of a bid, Next Lot, etc.). The Marquee System 140 interfaces to the Bid System 120 so that messages (data packets) from the Bid System 120 are automatically broadcast to the Marquee System 140 for output to the Marquee System Display Device 108.

In the preferred embodiment, the Marquee System 140 operates to display:

the current run # (item) being sold;
the current bidder ID (ID from the user file for a remote bidder or "floor bidder" for any bidder at the auction); and
the amount (whether the bidder is remote or at the auction).

When a remote bid is received, the Marquee System 140 can flash the display and/or provide an audible prompt to indicate a remote bid has been made as well as identify the remote bidder ID and the bid amount. Based on the type of bid engine installed and the auctioneer's decision, this remote bid is either (a) accepted through an action by the Clerk System 130, rejected due to the auctioneer's decision to accept a bid from an onsite bidder or continues to be in a pending state because the auctioneer has not accepted a bid from an onsite bidder that is a higher value than the pending remote bid.

Figure 6:
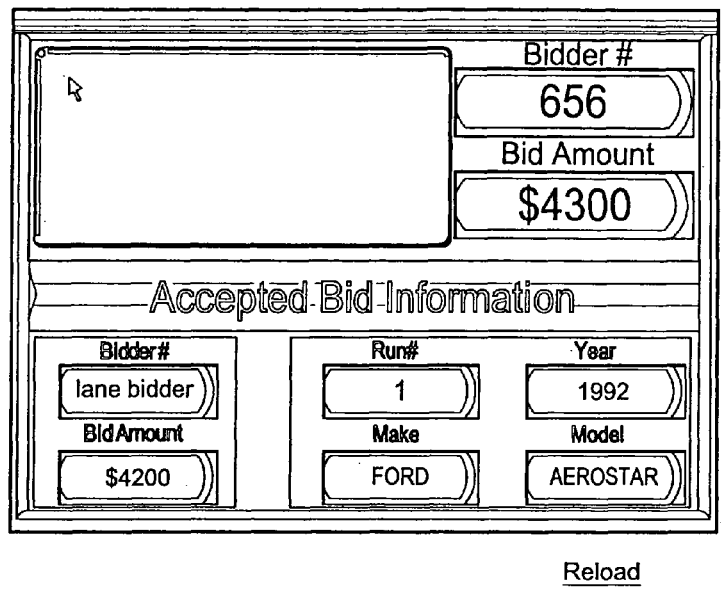
FIG. 6 is an illustration of a Marquee System 140 display from the Cherokee Bid Engine of the present invention.

FIG. 6 illustrates an example of a Marquee Display for the Cherokee Bid Engine.

Figure 6A:
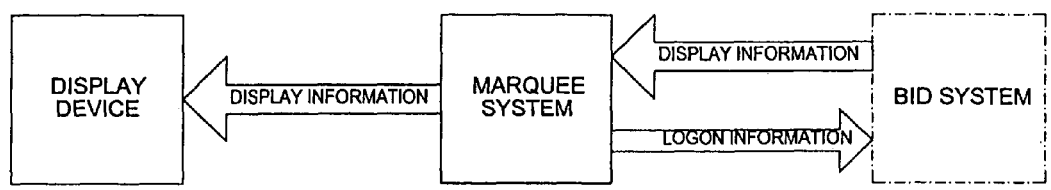
FIG. 6A is a block diagram illustrating the interface between the Marquee System Display Device 108, the Marquee System 140 and the Bid System 120 for the transfer of display information.

FIG. 6A is a block diagram illustrating the interface between the Marquee System Display Device 108, the Marquee System 140 and the Bid System 120 for the transfer of display information.

Figure 7B:
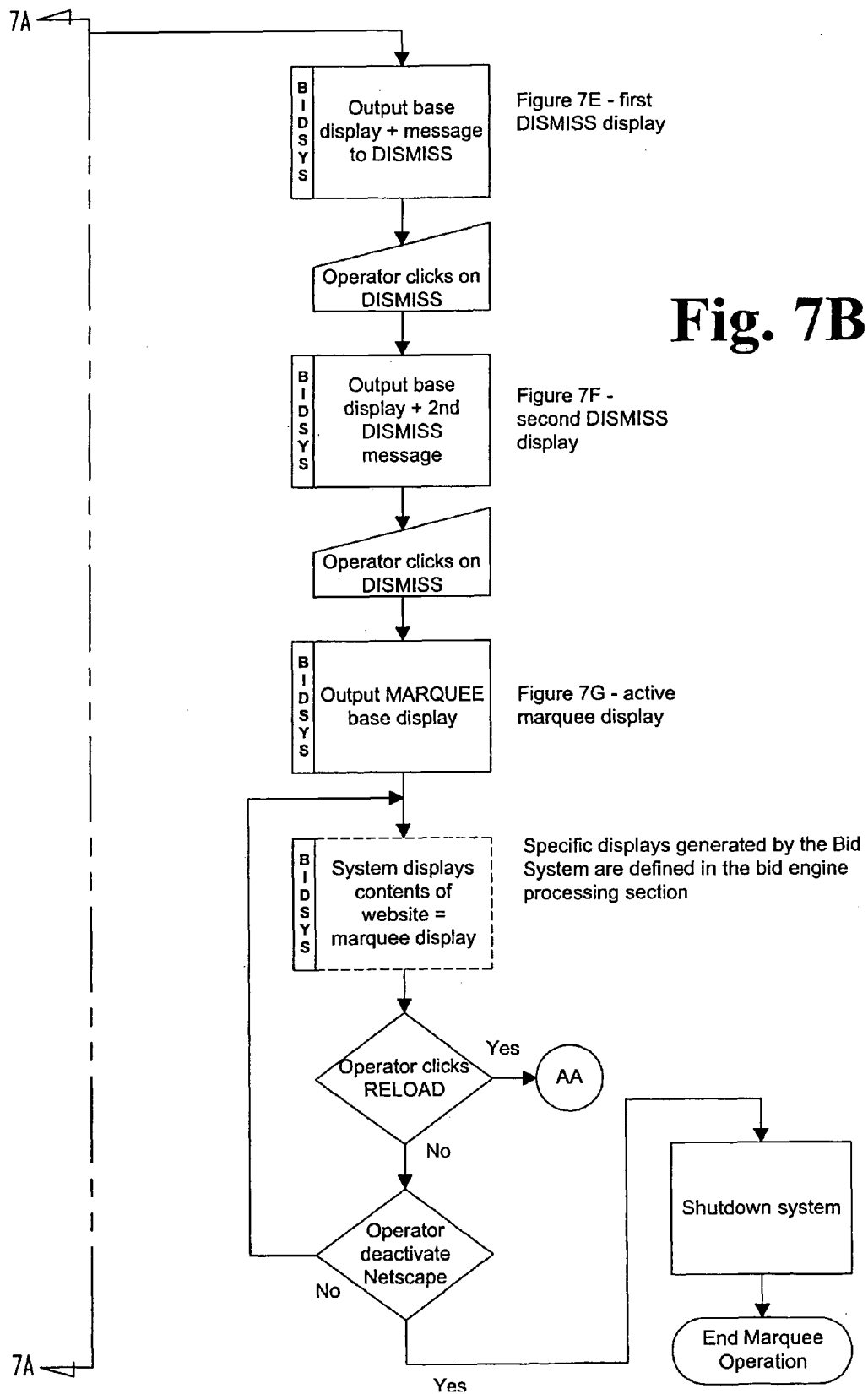

FIGS. 7A and 7B are flow diagrams illustrating details of the process flow for the Marquee System 140 in interfacing with the Bid System 120.

Upon starting the Marquee System 140, a boot process is performed 710. In some embodiments, the Marquee System 140 is accessed via a computer running a browser interface and entering a unique network address for the Marquee System 140. Once the boot process is complete, the Bid System 120 requires a login procedure to be performed 720. Once the login process is completed, the Bid System 120 interacts with the Marquee System 140 to display various items or images that indicate the status of the auction, entrance of bids, etc.

The Clerk System 130

The Clerk System 130 is used to represent the bidding activities from both the floor and remote bidders in conjunction with the controlling Bid System 120. Entries made via the Clerk System 130 result in display changes for all active bidders and the Marquee System 140. The action resulting from a particular entry is dependent on the "bid engine" being utilized by an individual auction.

Figure 10A:
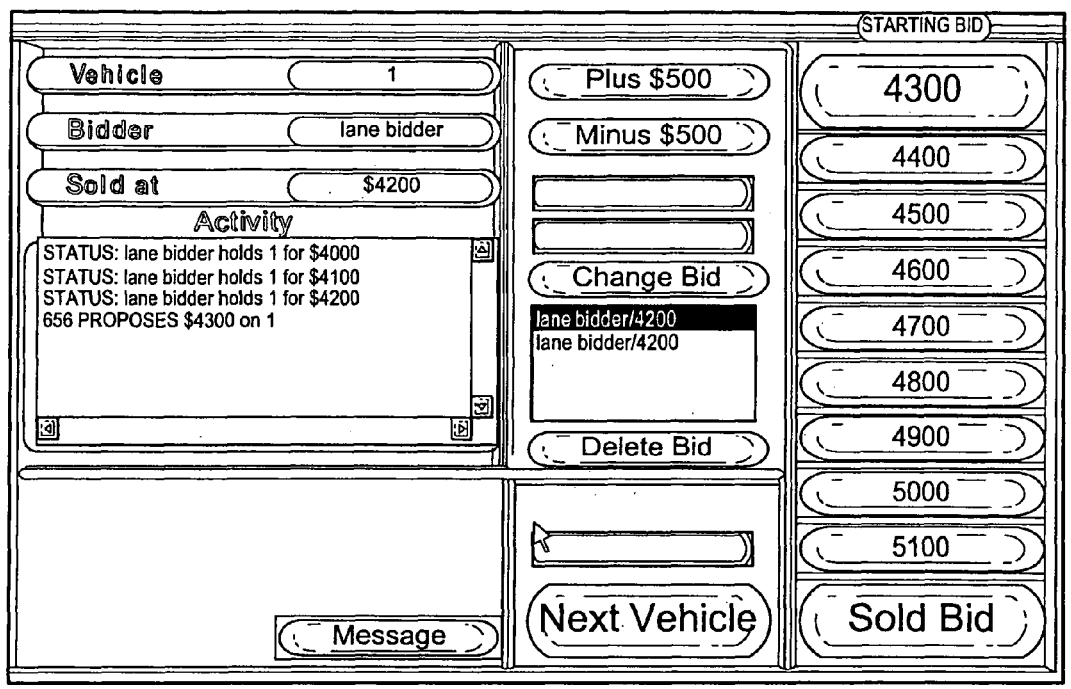
FIG. 10A illustrates an example of a Clerk System 130 display from the Cherokee Bid Engine.

FIG. 10A illustrates an example of a Clerk System 130 display from the Cherokee Bid Engine.

Figure 10B:
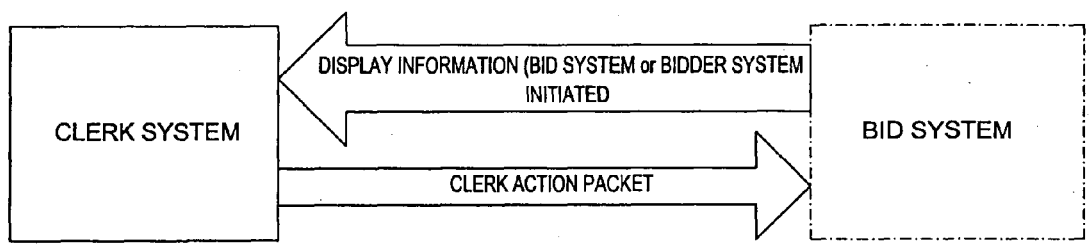
FIG. 10B is a block diagram illustrating the interface between the Clerk System 130 and the Bid System 120.

FIG. 10B is a block diagram illustrating the interface between the Clerk System 130 and the Bid System 120.

Figure 10C:
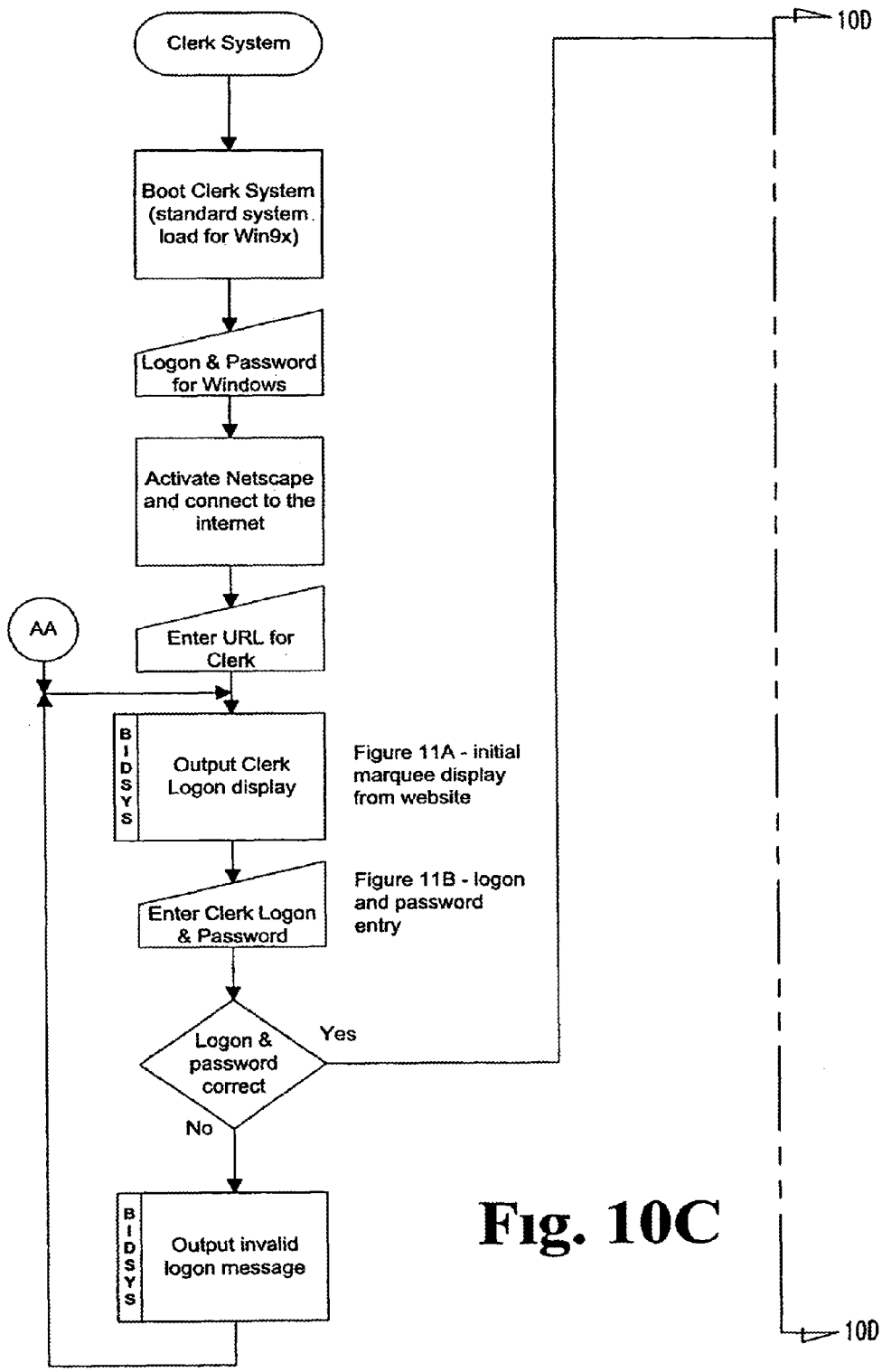
FIGS. 10C and 10D are flow diagrams illustrating the details of operation for the Clerk System 130.
Figure 10D:
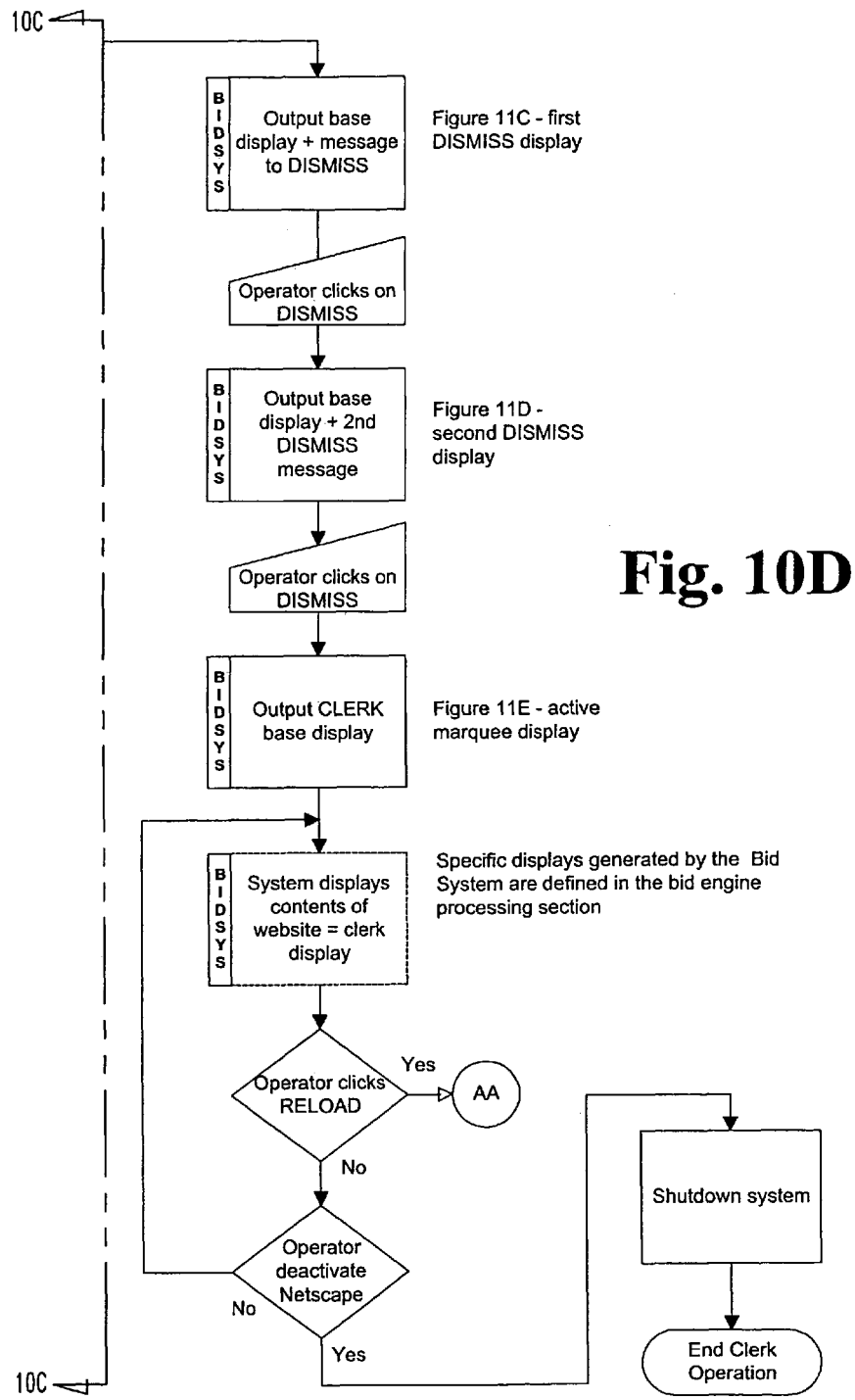

FIG. 10C is a flow diagram illustrating the details of operation for the Clerk System 130.

Bid Engine Processes

The bidding process involves the Clerk System 130, the Marquee System 140, and all bidders logged into the auction. The specific process utilized for an individual auction is based on the "Bid Engine" selected by the auction to control this process. The base operations of the Bid Engines are similar in how the data packets are sent to the systems and the content of the data. Differences are primarily in the area of how remote bids are requested/accepted; the bid value presented to the Bidder Devices 110 (i.e., one bid value that is the next higher sequential value versus multiple bid value options); and the ability to set policy, thereby changing bid increments based on the value of the last accepted bid (i.e., increment always by a fixed value versus incrementing by $25 up to $3000, $50 up to $4000, and then by $100 increments).

The data sent to the Marquee System 140 is basically the same for each of the Bid Engines. Log-in displays are performed in the same manner in all Bid Engines; the content of specific messages varies by Bid Engine. Display format differences are in the bidding portion on the Bidder Device 110 display and the display of the Clerk System 130.

Each of the Bid Engine processes is defined in the following sections. Once the Clerk System 130 is active (logged on) and the display broadcast, the process becomes event driven based on a Clerk System 130 or Bidder Device 110 action. The process flows identify the actions taken by the Bid System 120 in response to the initiation of these events.

Operation of the Cherokee Bid Engine

The following processes for the Cherokee Bid Engine are detailed in the respective figures as defined throughout this section. Once the Clerk System 130 has been initialized, the bid engine reacts to the actions of the Clerk System 130 or the Bidder Device 110.

Initiation of first item or next item (Clerk System 130 function)

Enter starting bid (Clerk System 130 function) including +/−$500 button use

Enter floor bid (Clerk System 130 function)

Enter/accept remote bid (Bidder Device 110/Clerk System 130 function)

Sold bid (Clerk System 130 function)

Request purchase info (Bidder Device 110 function)

Delete bid (Clerk System 130 function)

Message (Clerk System 130 function)

Figure 12:
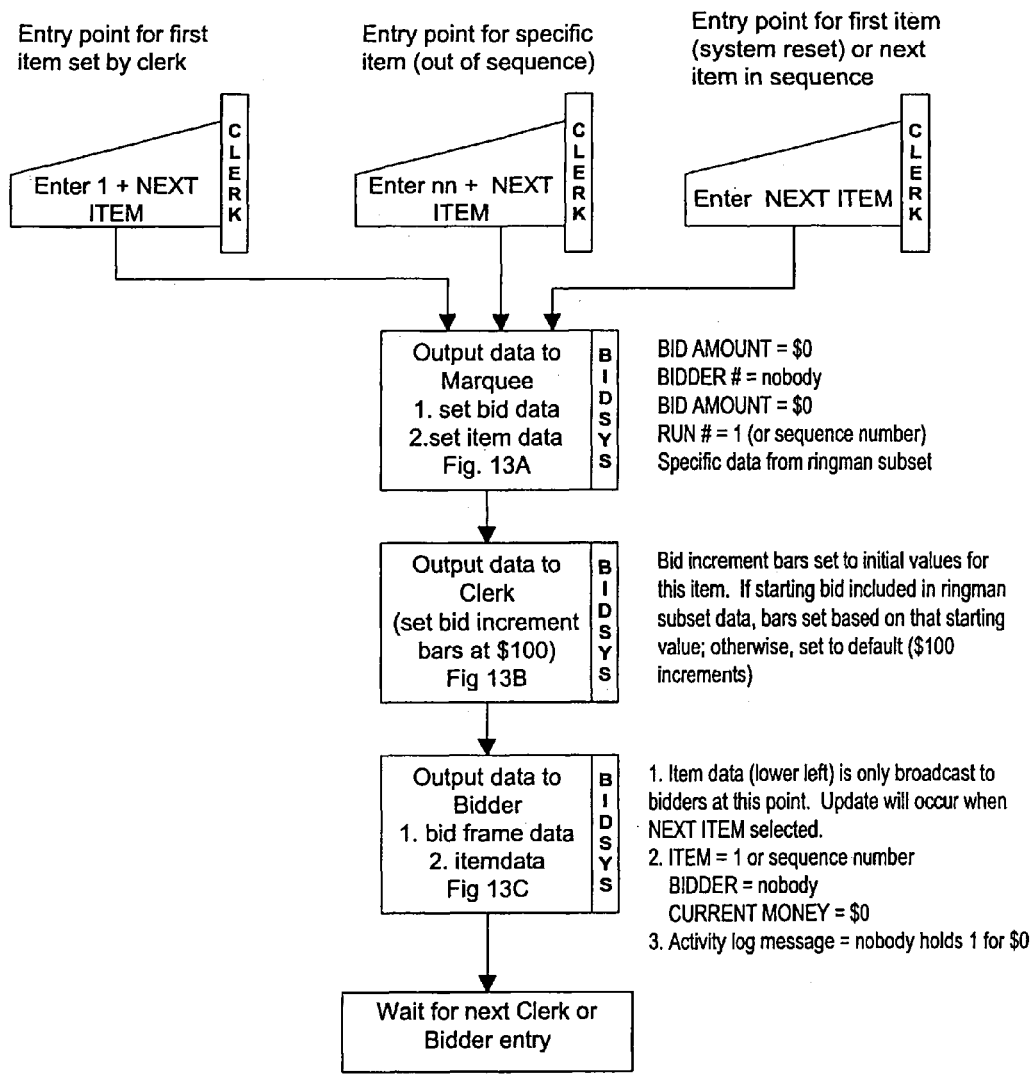
FIG. 12 is a schematic of the Bidding Process activation for an item to be sold at auction.
Figure 13A:
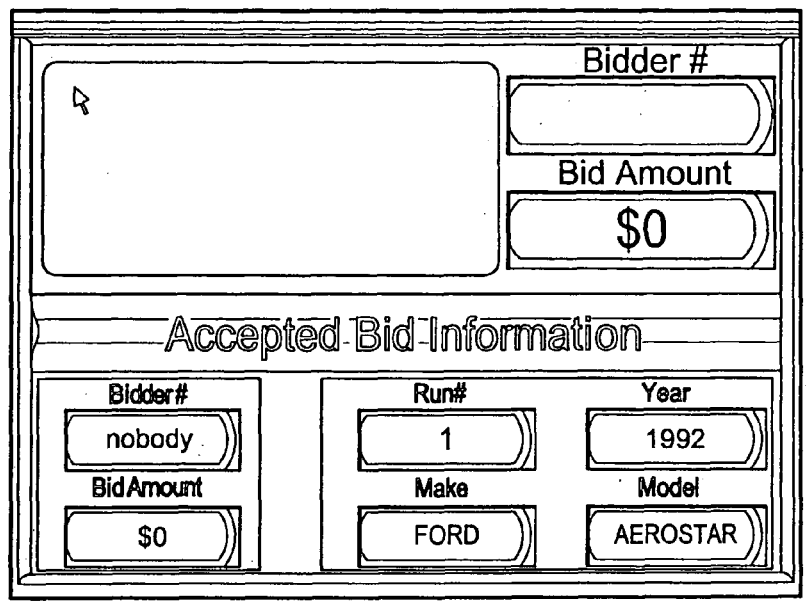
FIGS. 13A/13B/13C illustrate the Marquee System 140, Clerk System 130 and Bidder Device 110 displays after entry of Next Lot=1.
Figure 13B:
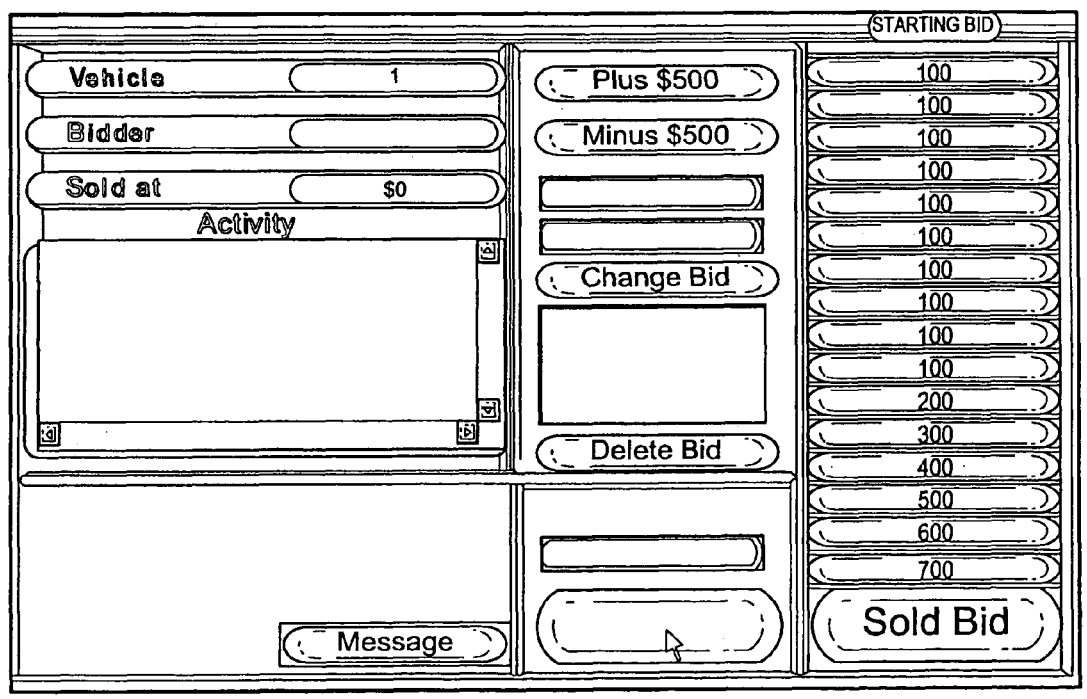
FIGS. 13D/13E/13F illustrate the Marquee System 140, Clerk System 130 and Bidder Device 110 displays after entry of a starting bid from an onsite bidder.
FIGS. 13G/13H illustrate the examples of the Marquee System 140 and Clerk System 130 displays when there is a pending remote bid.
FIG. 13I illustrates an example of a Bidder Device 110 display when there is an accepted remote bid.
FIGS. 13J/13K illustrate the Bidder Device 110 and Clerk System 130 displays after SOLD is selected.
Figure 13C:
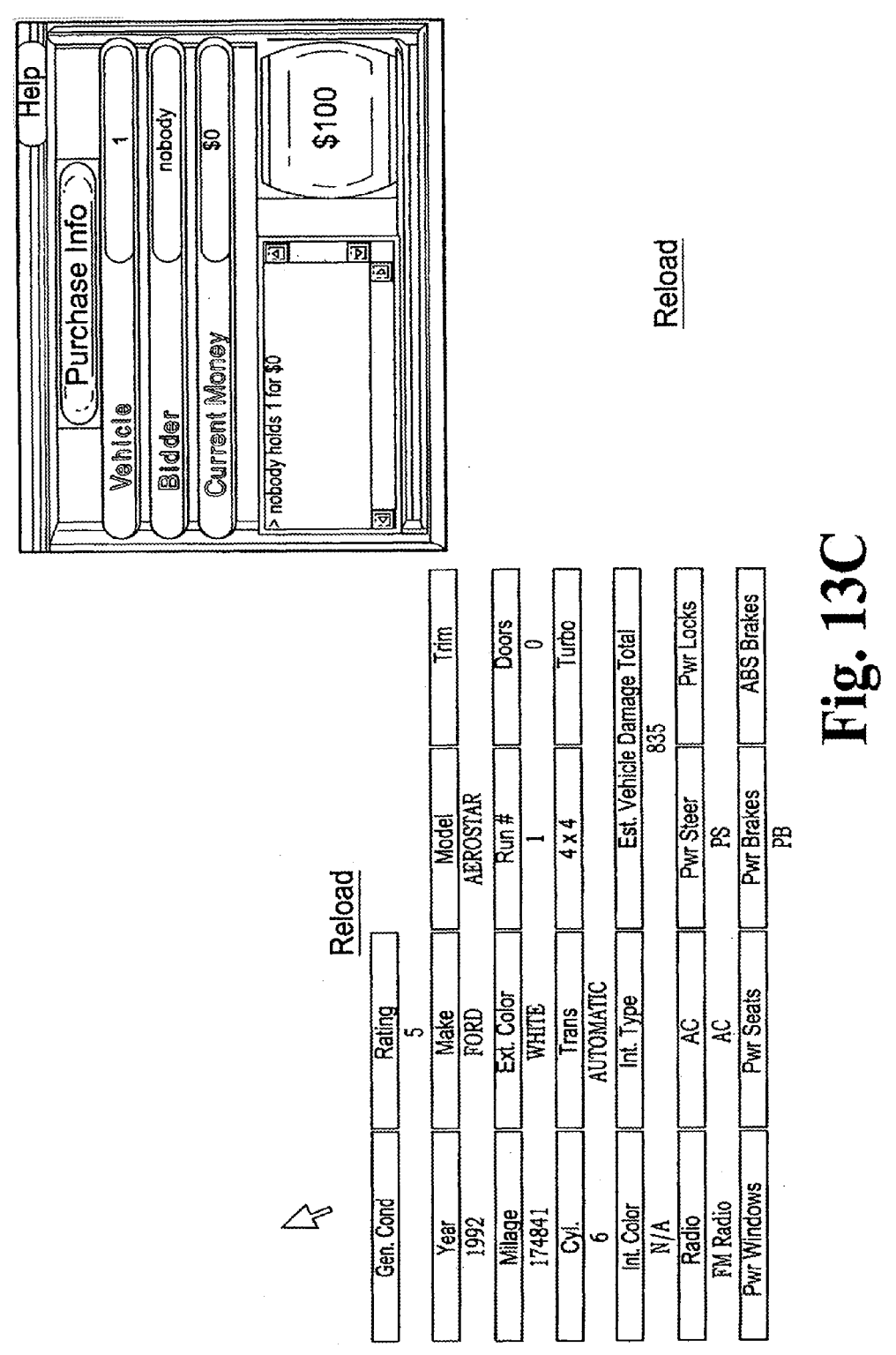
Figures 13D, 13E:
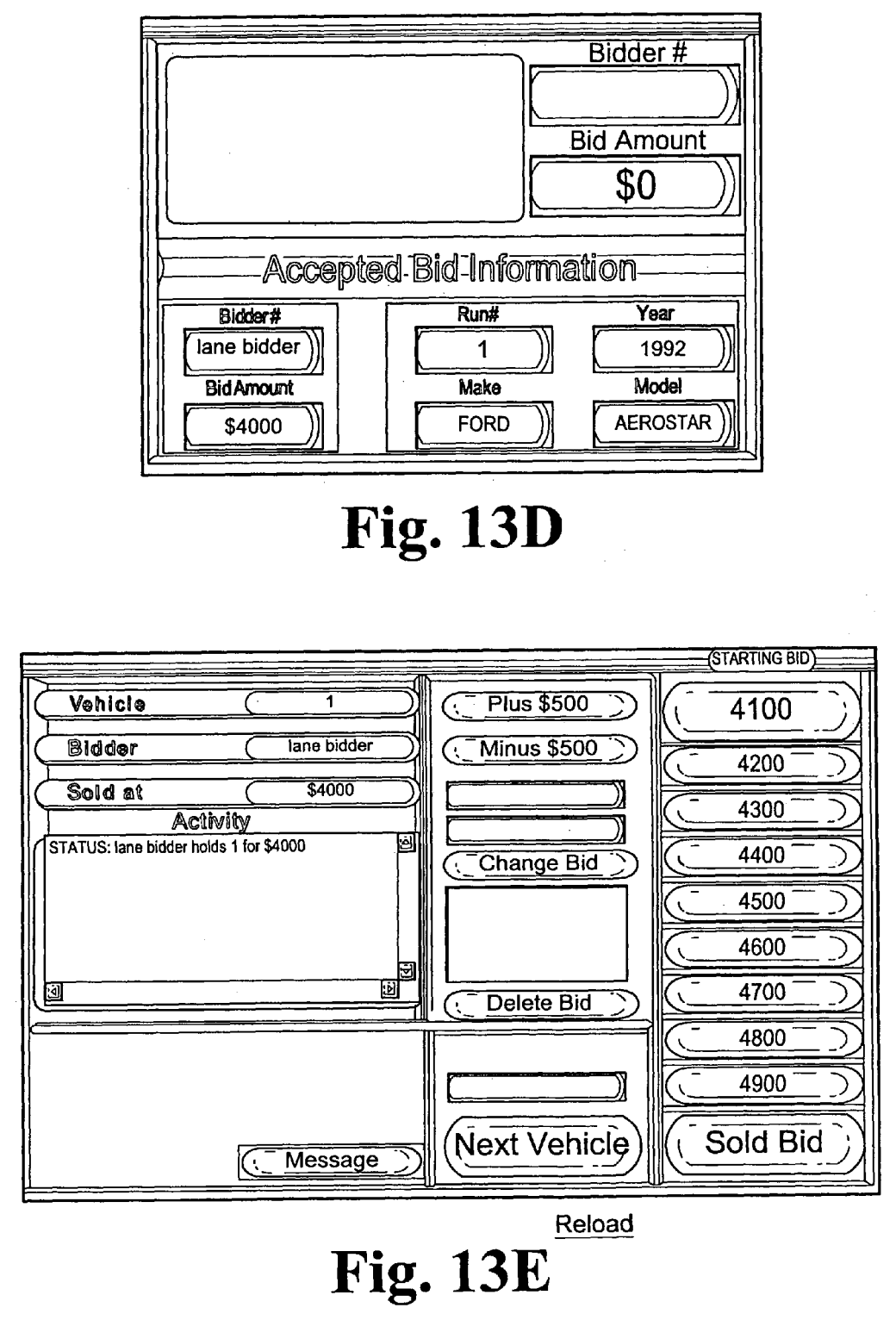
Figure 13F:
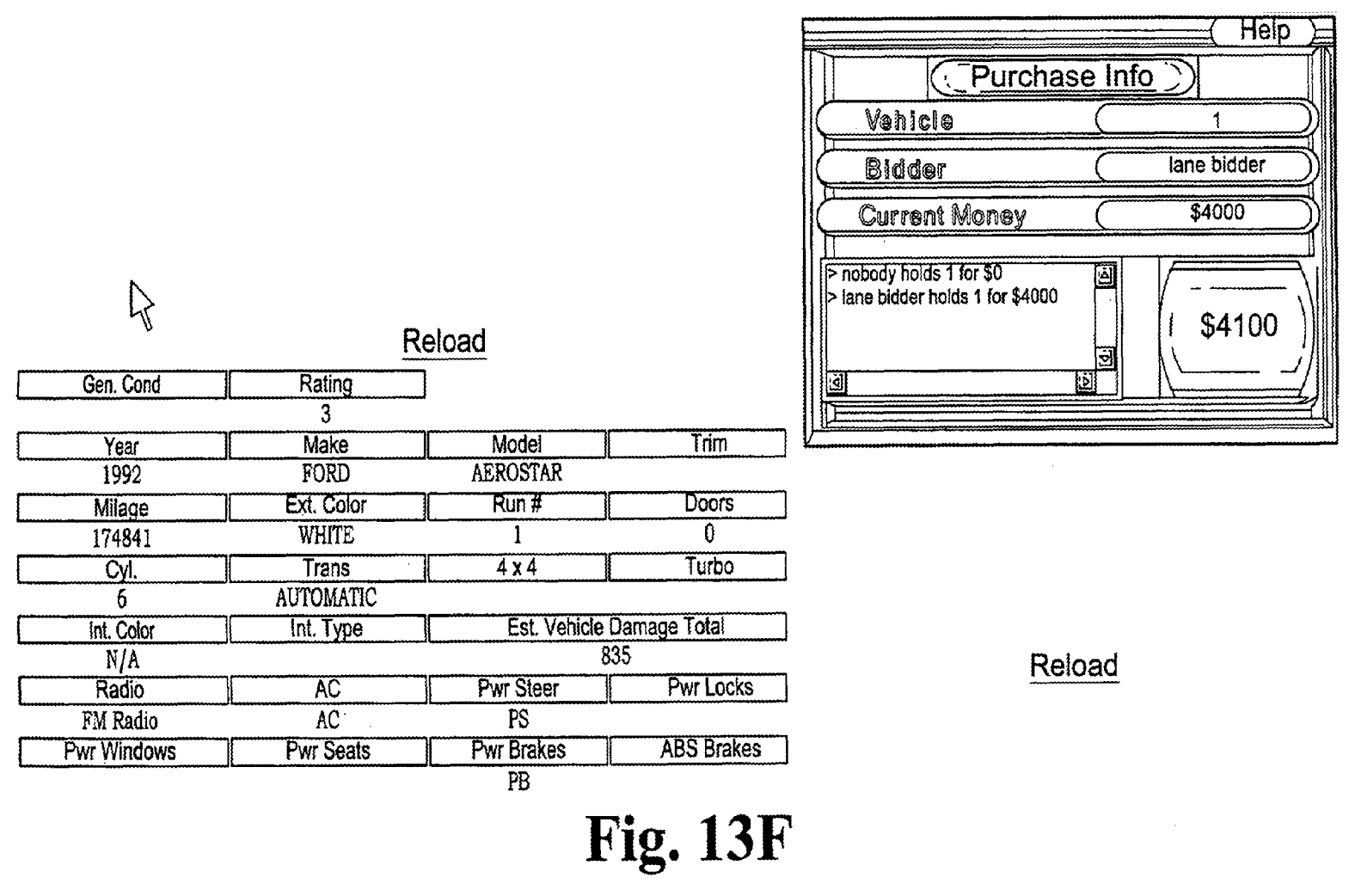
Figures 13G, 13H:
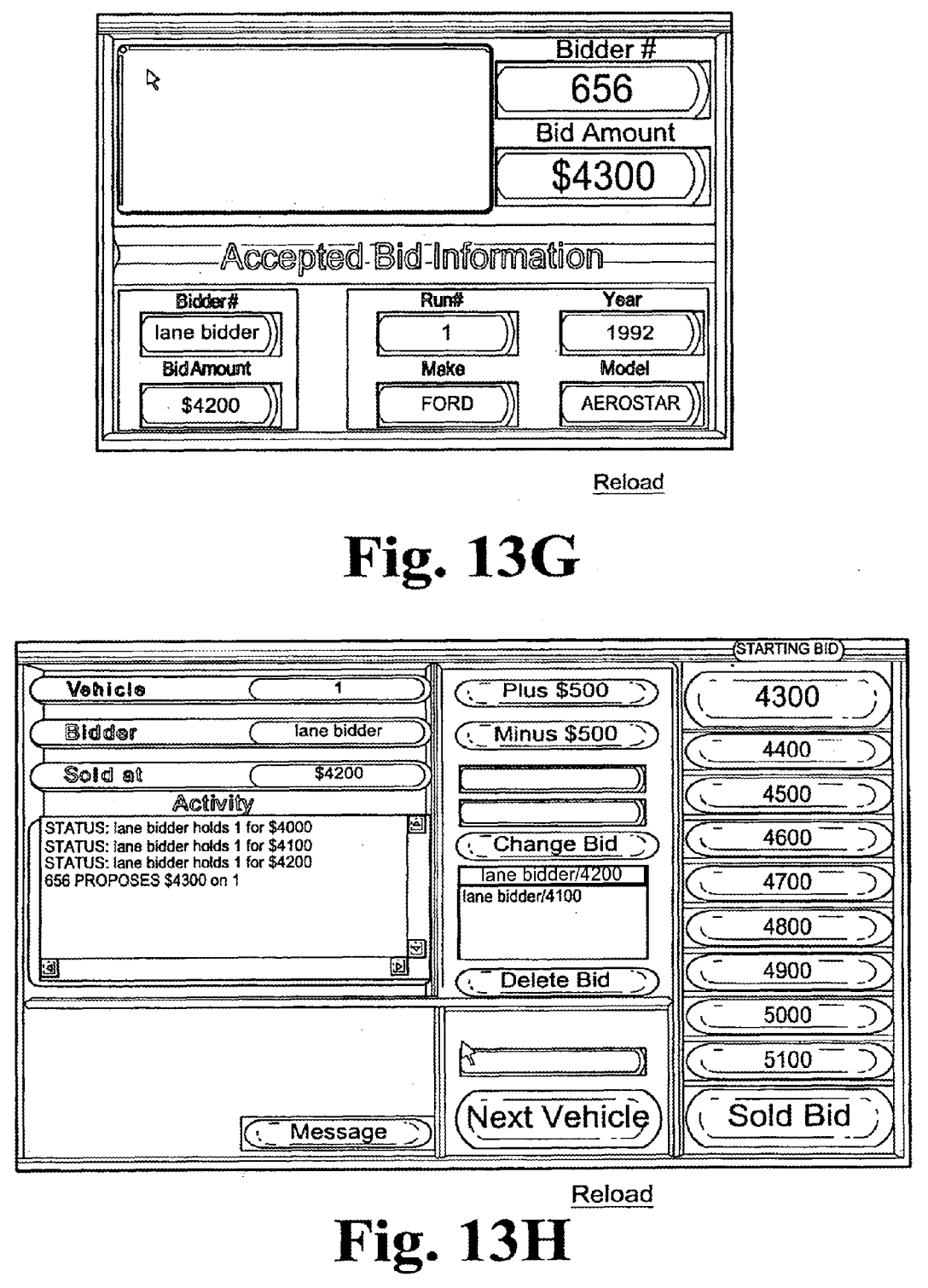
Figure 13I:
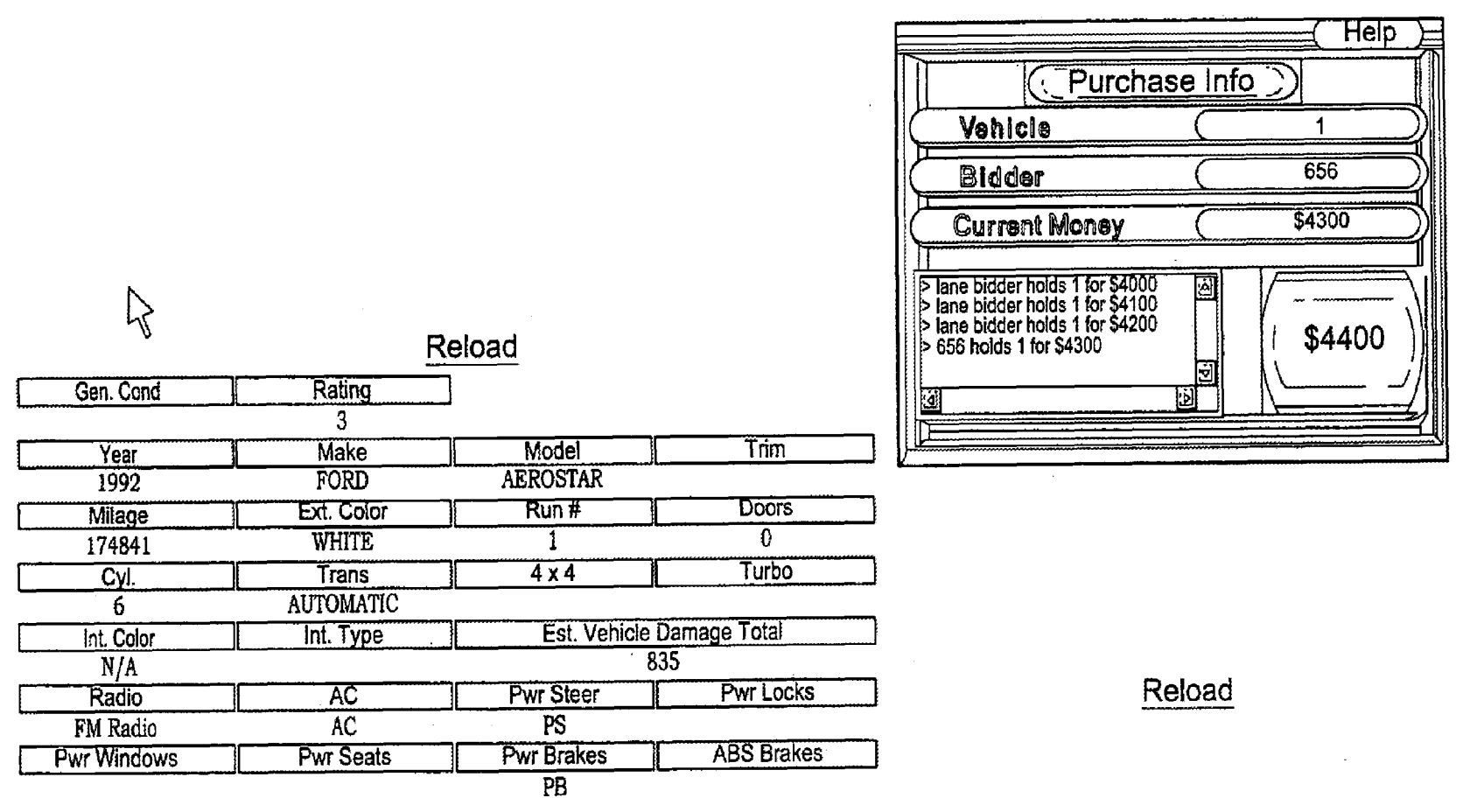
Figure 13K:
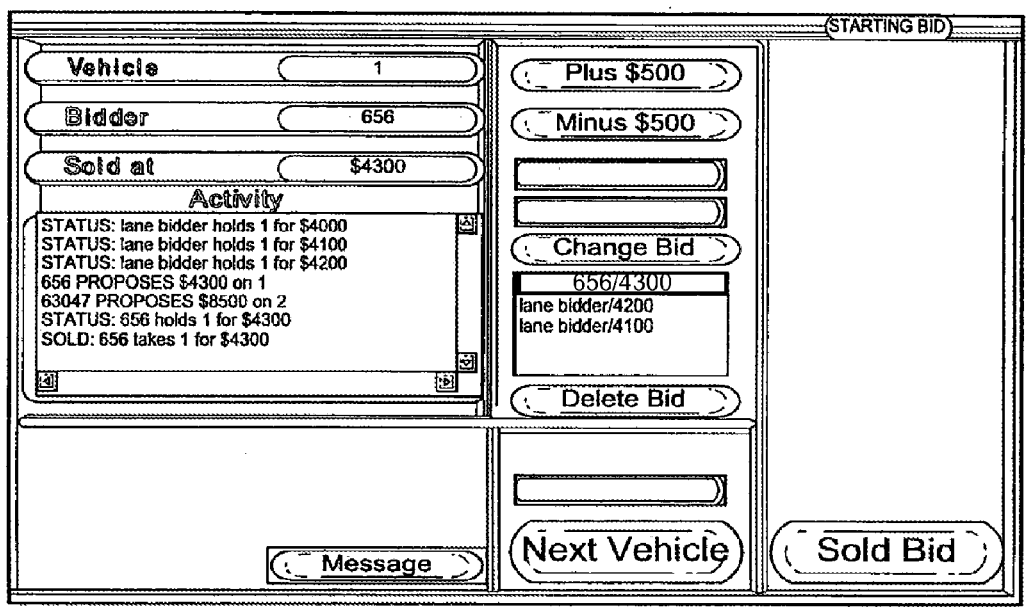

FIG. 12 illustrates the activation of the Bidding Process for an item. FIGS. 13A/13B/13C are examples of the Marquee System 140 display, Clerk System 130 display, and Bidder Device 110 display following the initiation of the first item in the sequence. The sequence of items is based on the use of the NEXT ITEM bar 1305 on the display.

The first item can be selected by entering 1 and then clicking on NEXT ITEM; or clicking on NEXT ITEM if no other prior activity has occurred since the system was activated (the system presets to item 1 of the inventory subset data created from the pre-sales catalog).

The next item is normally selected by clicking on NEXT ITEM. The next sequential entry defined in the inventory subset is selected. Any item can be taken out of sequence by entering the inventory subset number and then clicking on NEXT ITEM. Successive NEXT ITEM entries are then based on the last item selected.

In a preferred embodiment of the present invention, the NEXT ITEM entry is the point when the data is output to the Bidder Device 110 display and the display area(s) on the Marquee System 140 is/are updated for the next item in the bidding process. These areas are usually not changed until NEXT ITEM is entered.

The sequence of items is determined from the inventory information.

Figure 14:
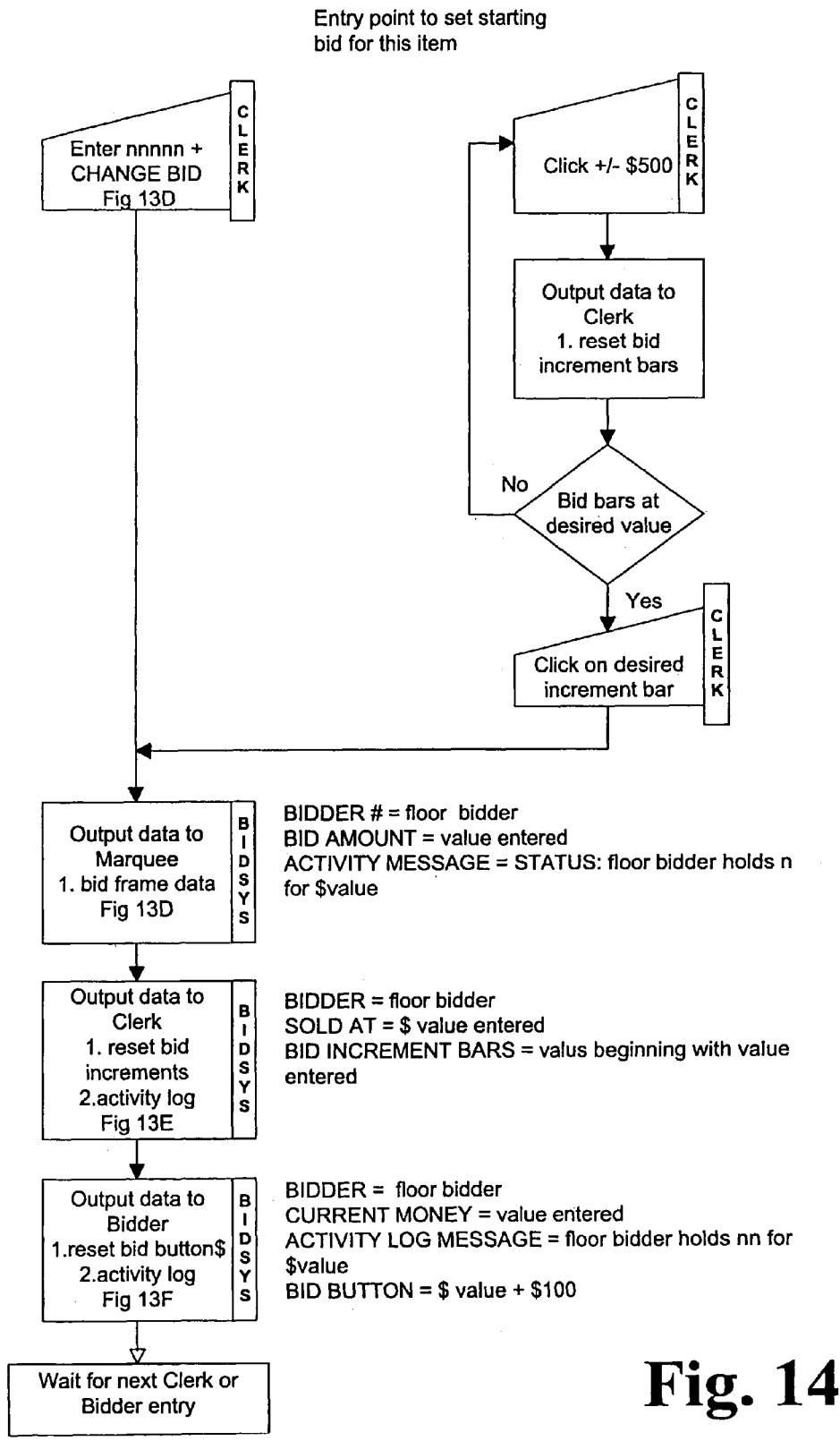
FIG. 14 is a schematic of the entry of a starting bid value.

ENTER STARTING BID FIG. 14 schematically illustrates the entry of a starting bid. The clerk initiates the bidding process for each item by entering a starting bid for that item. This typically can be accomplished by two methods:

(1) Enter a user name plus a value in the two areas above the CHANGE BID bar. Then click on CHANGE BID. This will signal the initiation that the bidding has begun by setting a starting value plus an entry in the activity log and setting the bid increment bars on both the Clerk System 130 display and the Bidder Device 110 display. The bid increment bars are preset for pre-defined increments for the Cherokee Bid Engine.

(2) Click on the +/−$500 bars (for auction events where $500 is not the preferred value, the +/− value can easily be changed) until the desired starting value appears on one of the bid increment bars on the right side of the Clerk System 130 display. Then click on the starting value bar. The system then generates the Clerk System 130 display and Bidder Device 110 display as done for the CHANGE BID entry.

From this point forward until the completion of bidding for a particular item (SOLD or NEXT ITEM), the CHANGE BID function can be utilized to enter a bid from a particular user or to jump the bid more than the amount shown on the last bid increment bar on the Clerk System 130 display. If a user ID is not entered, the system defaults to "floor bidder." The CHANGE BID process can also be utilized to override a remote bid with an equivalent floor bid (the default setting for the Cherokee Bid Engine automatically assigns the bid to a remote user if that remote user's pending bid is equal to the value identified by the selected bid increment bar).

The +/−$500 bars are only active before the first bid on any item has been accepted. After the initial (starting) bid is entered, these bars are inactive until SOLD or NEXT ITEM is entered on the Clerk System 130 display.

FIGS. 13D/13E/13F illustrate the Marquee System display 140, Clerk System 130 display and Bidder Device 110 display upon acceptance of a starting bid.

Figure 15:
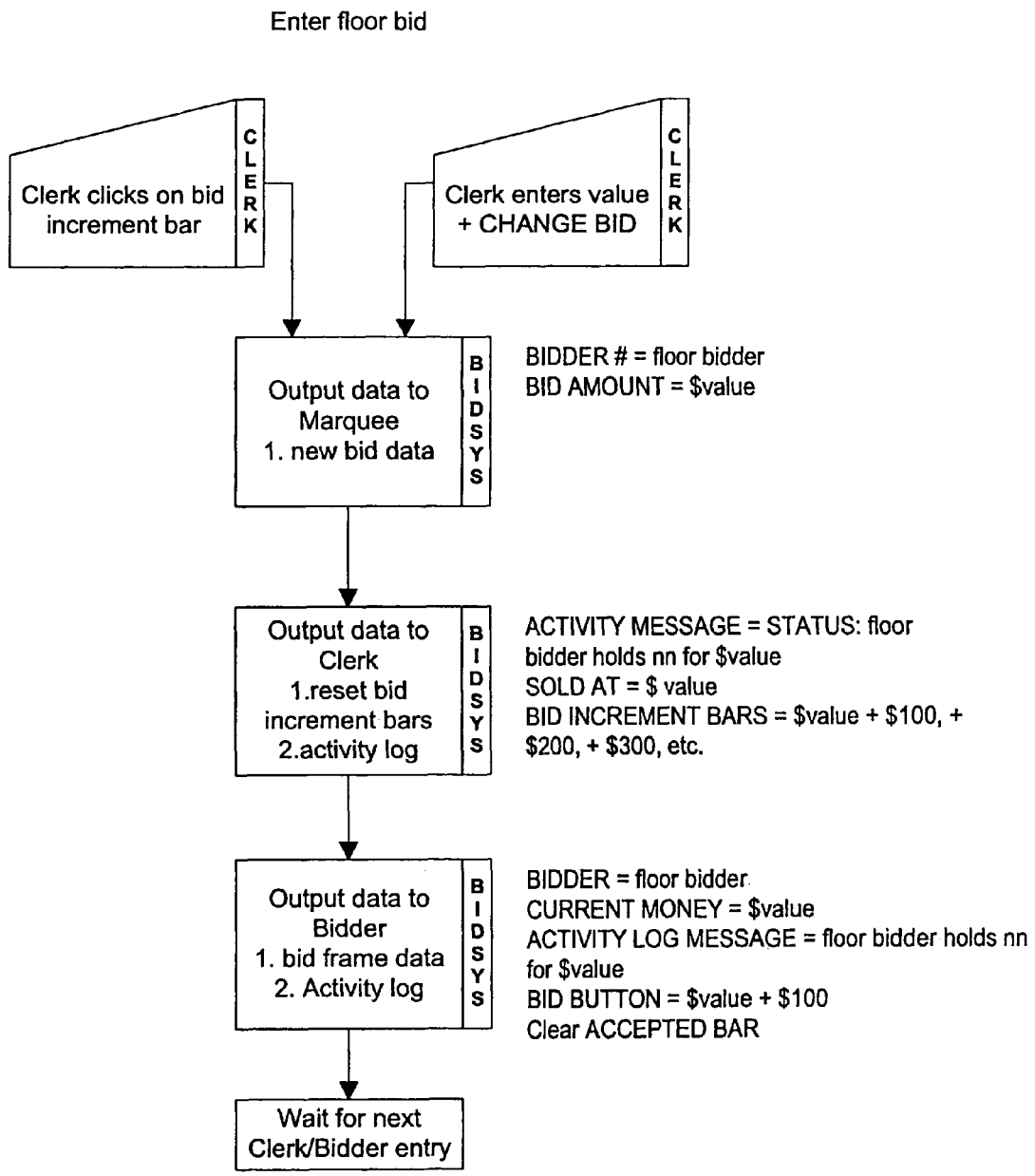
FIG. 15 is a schematic of the process for entry of a floor bid.

Enter Floor bid FIG. 15 schematically illustrates the entry of a floor bid. In a preferred embodiment of the present invention, one of two sequences have occurred on the Clerk System 130:

(1) The value of the floor bid on the increment bars has been selected and there is no bid from a remote bidder.

(2) The value has been entered in the data entry area near CHANGE BID and then CHANGE BID is selected.

In either case, the Marquee System 140, Clerk System 130 and Bidder Device 110 displays are updated to reflect the accepted bid value and the increment bars are reset for the preparation for next bid to be entered. The CHANGE BID sequence is typically used if the value of the bid to be accepted exceeds the highest value on the bid increment bars or a bid prior to a value being recognized by the auctioneer is transmitted from the Clerk System 130 to the Bid System 120 and the accepted bid value must be reset to a lower value.

Figure 16:
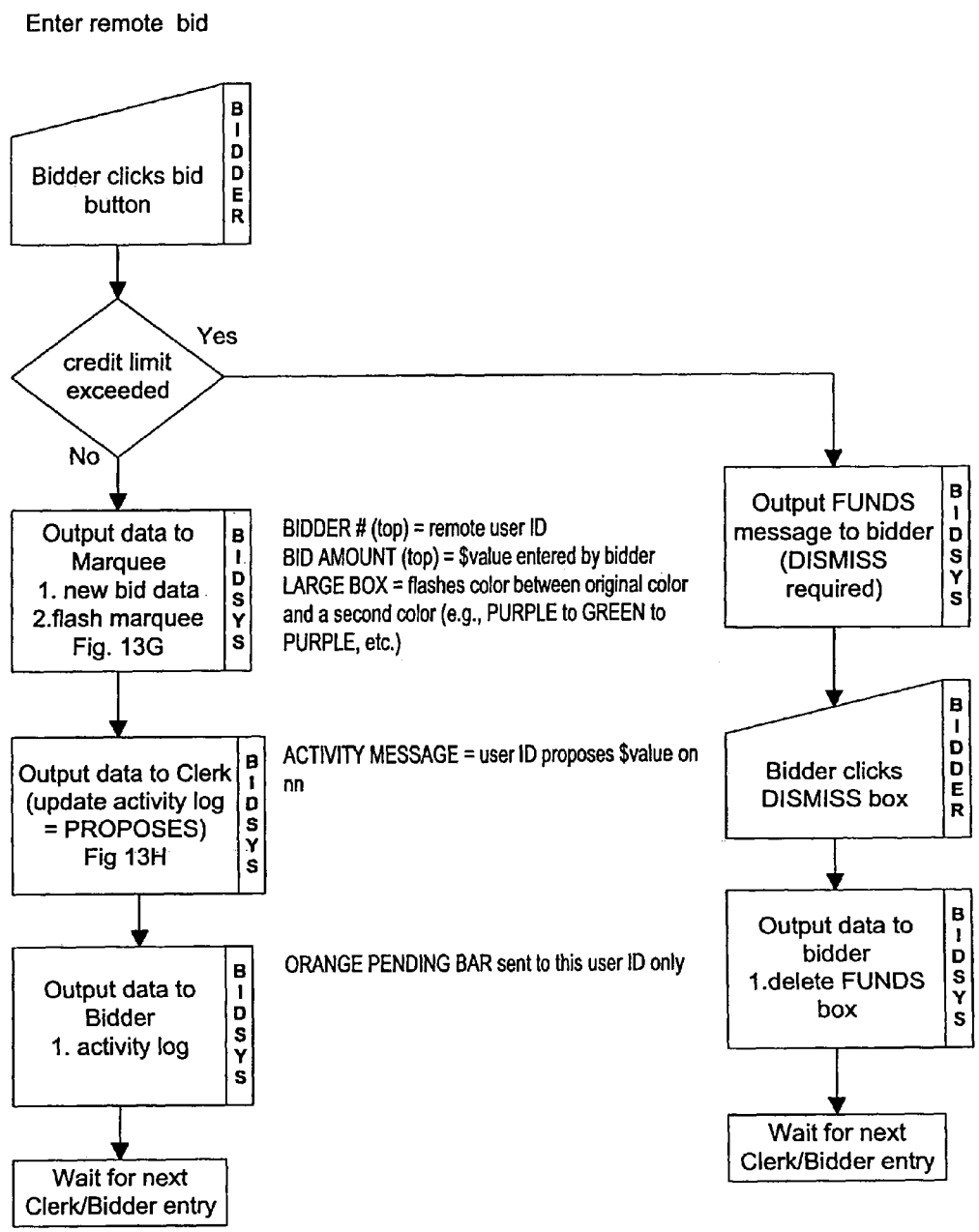
FIG. 16 is a schematic of the process for entry of a remote bid.

ENTER REMOTE BID FIG. 16 schematically illustrates the entry of a remote bid in a preferred embodiment of the present invention. To enter a bid from a remote bidder, the bidder typically selects the large value button that shows the next incremental bid value. The system validates the credit limit by adding dollars spent to this bid value. If the value exceeds the pre-defined credit limit, a FUND message box is displayed on the Bidder Device 110 display. The bidder then clicks on the DISMISS area of the message box and the system resets the display such that a new bid could be entered. This FUND message box is regenerated each time the bidder enters a bid that would exceed his/her credit limit. This message is also displayed if a spectator with a credit limit equal to $0 attempts to make a bid. If the bid is within a credit limit as defined above, the Bid System 120 updates the Clerk System 130 with the proposed remote bid and updates the activity log on the Clerk System 130 and Bidder Device 110 displays. If a Marquee System 140 is included in the installed configuration, the Marquee System 140 will show a visual alert (i.e., flash) and may also sound an audible alert (i.e., beep) signifying a remote bid has been proposed.

If two or more remote bidders enter the same bid value at the same time, the system takes the first bid received. Other remote bidders who have entered the same bid value have the display reset with the OUTBID message.

FIGS. 13G/13H illustrate Marquee System 140 and Clerk System 130 displays when there is a pending remote bid.

Figure 17:
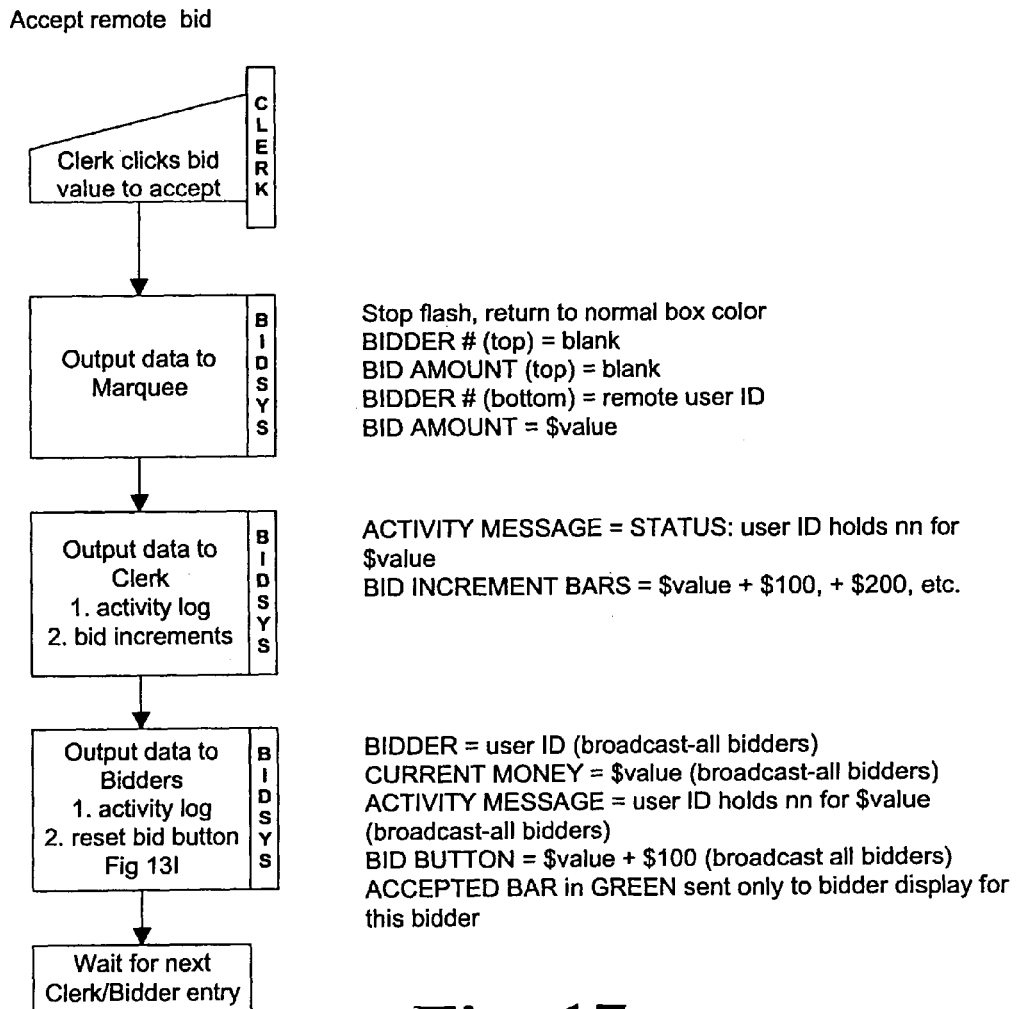
FIG. 17 is a schematic of the process for acceptance of a remote bid.

ACCEPT REMOTE BID FIG. 17 schematically illustrates the acceptance of a remote bid in a preferred embodiment of the present invention. To accept the remote bid, the increment bar on the Clerk System 130 Display containing that value is selected. An alternative method is to enter the remote user ID and the value and then select CHANGE BID. For either sequence, the Marquee System 140, Clerk System 130, and Bidder Devices 110 are reset to identify the accepted bid. If a Marquee System 140 is included in the auction's configuration, the Marquee System Display 108 will stop flashing/beeping.

FIG. 13I is an illustration of an accepted remote bid on the Bidder Device 110 display.

Figure 18:
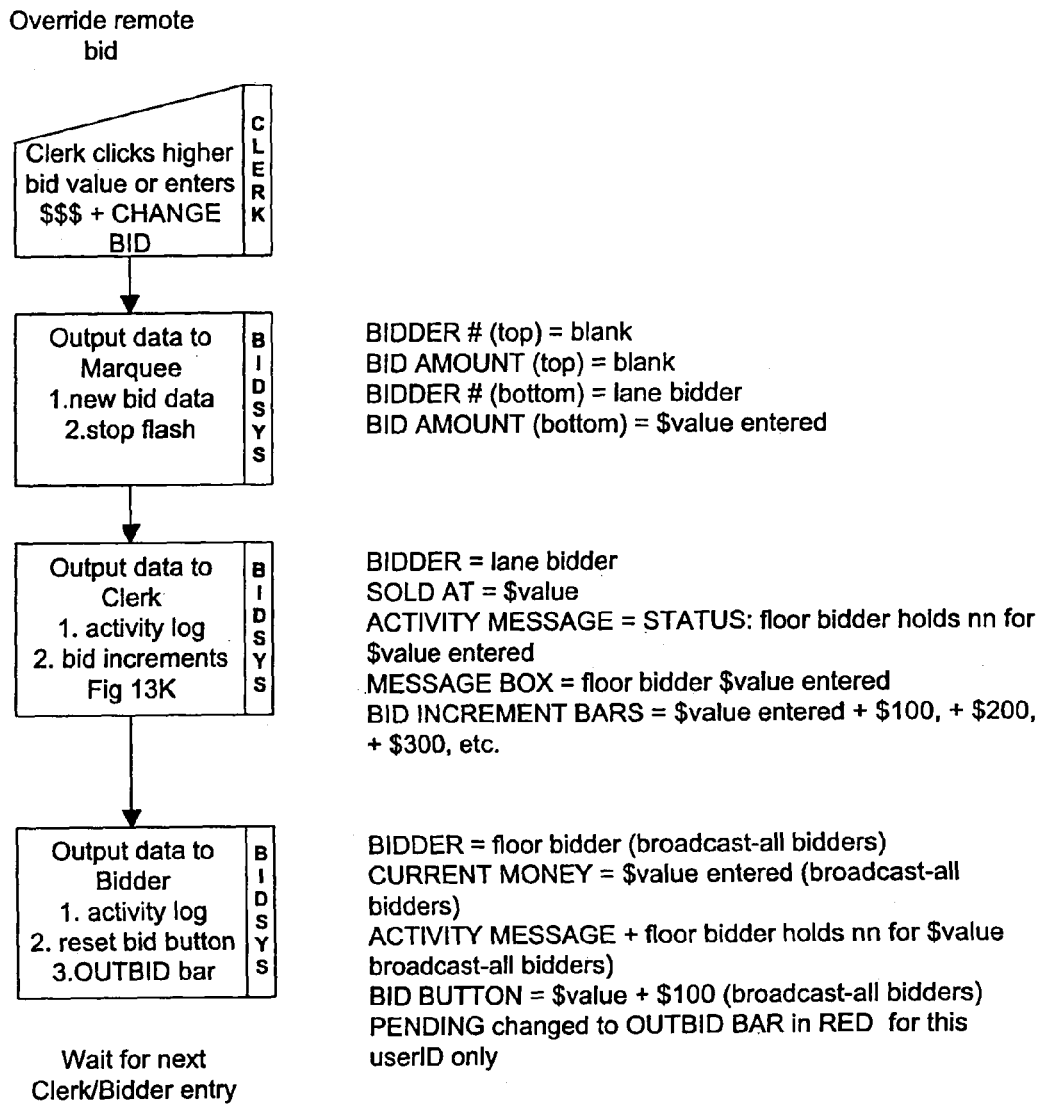
FIG. 18 is a schematic of the process to override a remote bid.

OVERRIDE REMOTE BID FIG. 18 schematically illustrates the override of a remote bid in a preferred embodiment of the present invention. If the same bid is received from both the floor and the remote bidder, the remote bid can be accepted (as defined above) or the floor bid can be accepted (by entering the value and clicking on CHANGE BID—the system defaults to "floor bidder" if no bidder ID is entered for the CHANGE BID function). The Bidder Device 110 display contains an OUTBID message if the floor bid was accepted. If a Marquee System 140 is included in the auctions' configuration, the Marquee System Display Device 108 will stop flashing/beeping.

Figure 19:
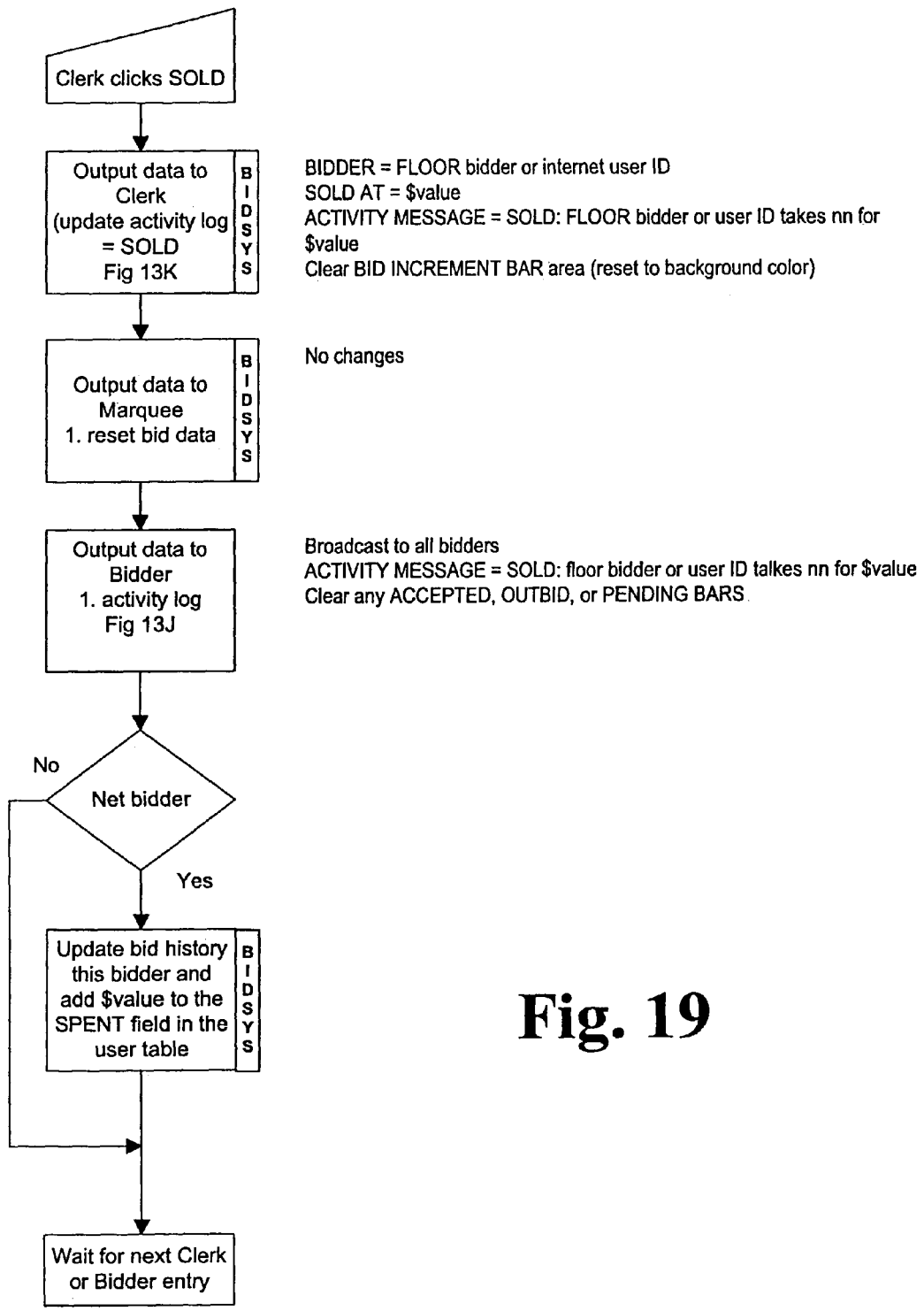
FIG. 19 is a schematic of the process for a sold bid.

SOLD BID FIG. 19 schematically illustrates the process for a sold bid in a preferred embodiment of the present invention. To sell an item to either a floor or remote bidder, the final bid must have been accepted as previously discussed. The SOLD button is then selected to complete the sale for that item. The activity log and the Marquee System Display Device 108 (if the Marquee System 140 is included in the configuration) identify the value, the remote bidder name or the indication of a "floor bidder"—all specifically relating to the sold item.

If the item was sold to a remote bidder, the system updates the user tables as follows:

The SPENT column for that user is updated to reflect the sum of any of his/her prior sales plus this sale such that subsequent credit limit checks are based on the current dollars spent by this remote user.

The table is updated to reflect the information for the item just purchased by the remote bidder (listing of each item purchased, value, and time). This data is then available to the remote user at any time during the auction by clicking on PURCHASE INFO on the Bidder Device 110 display.

FIGS. 13J/K illustrate the Bidder Device 110/Clerk System 130 displays when the item is SOLD.

Figure 20:
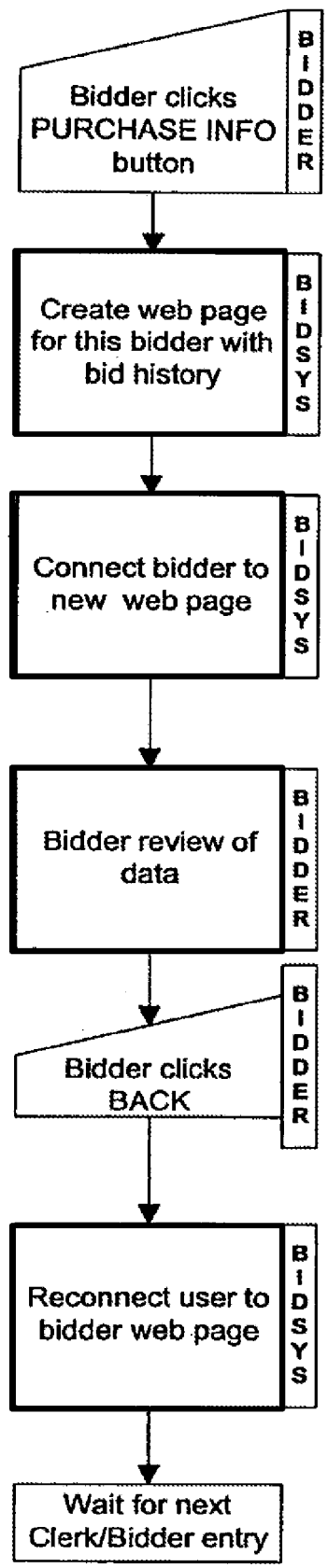
FIG. 20 is a schematic of the process for a remote user to request purchase information from the Cherokee Bid Engine.

PURCHASE INFORMATION (REMOTE BIDDER) In a preferred embodiment of the present invention, FIG. 20 schematically illustrates the remote bidder's process for requesting purchase information in the Cherokee Bid Engine. When a remote bidder clicks on the PURCHASE INFO button on the Bidder Device 110 display, the system links that bidder only to a new page that contains the purchase history for that remote bidder for the specific auction currently being attended. An example of a portential format of the page is shown below. To return to the Bidder Device 110 display, the user clicks on BACK or the X in the upper right corner of the page.

| username | 656 |
| password | abcdefg |
| purchase total | 18400 |

| catalog number | amount | time |
| --- | --- | --- |
| 15 | 6500 | 09:26 |
| 27 | 11900 | 10:12 |

Figure 21:
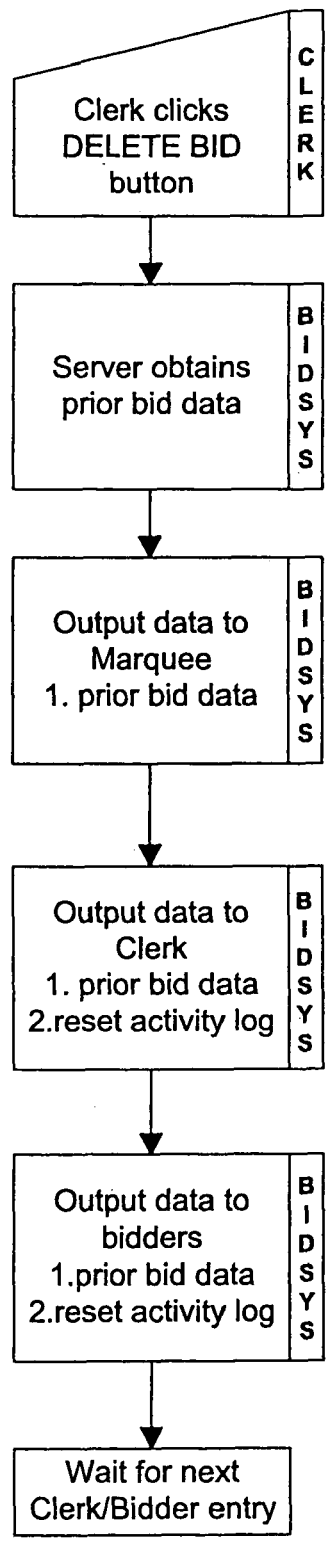
FIG. 21 is a schematic of the process for deleting a bid.

DELETE BID FIG. 21 schematically illustrates the process for deleting bids in a preferred embodiment of the present invention. A bid is deleted by clicking on DELETE BID on the Clerk System 130 display. The system deletes all data for that bid from the activity logs on the Clerk System 130 display and Bidder Device 110 display, resets the Marquee System 140 to the last accepted bid data, and resets the bid increment bars on the Clerk System 130 display and Bidder Device 110 display based on the last accepted bid prior to the bid being deleted.

Message Function

Figure 22:
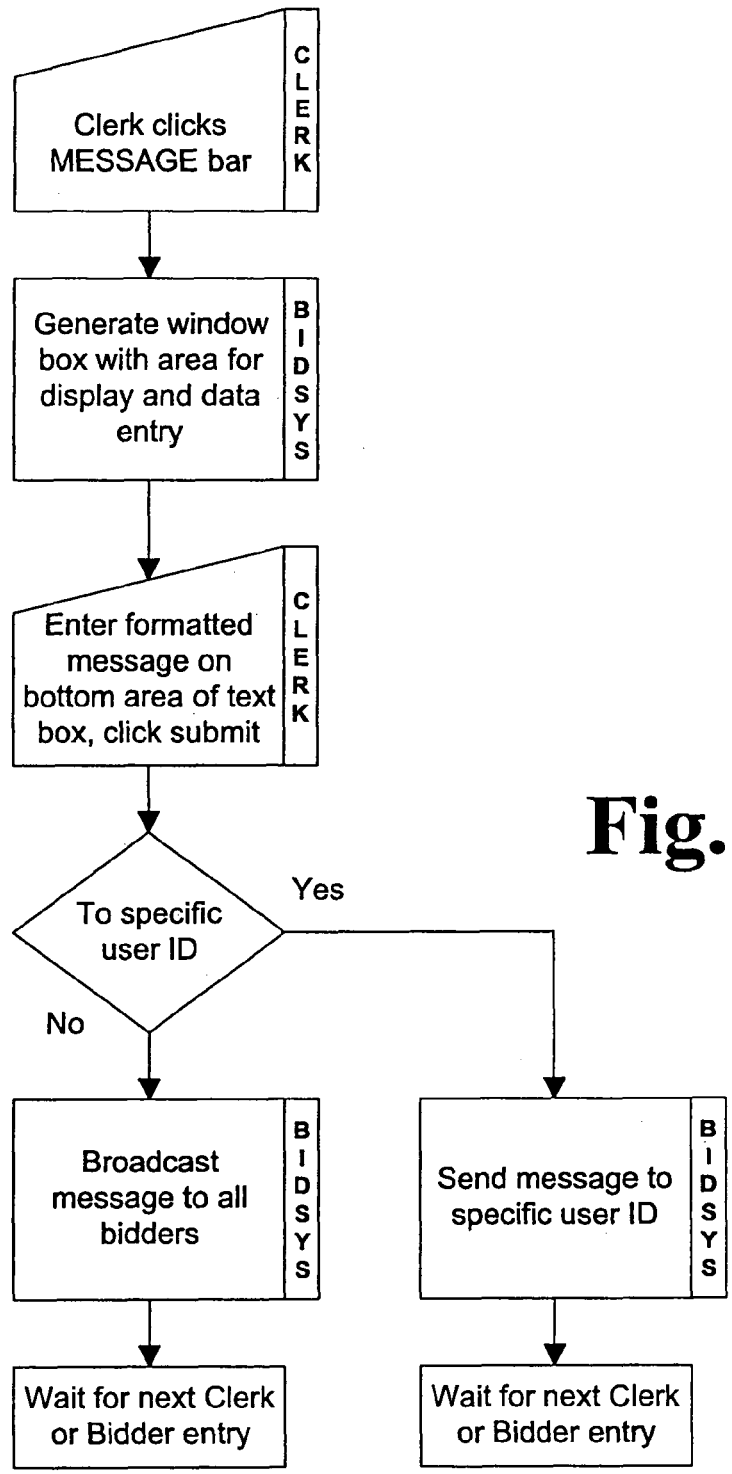
FIG. 22 is a schematic of the process for the auctioneer to send a message.
Figure 22A:
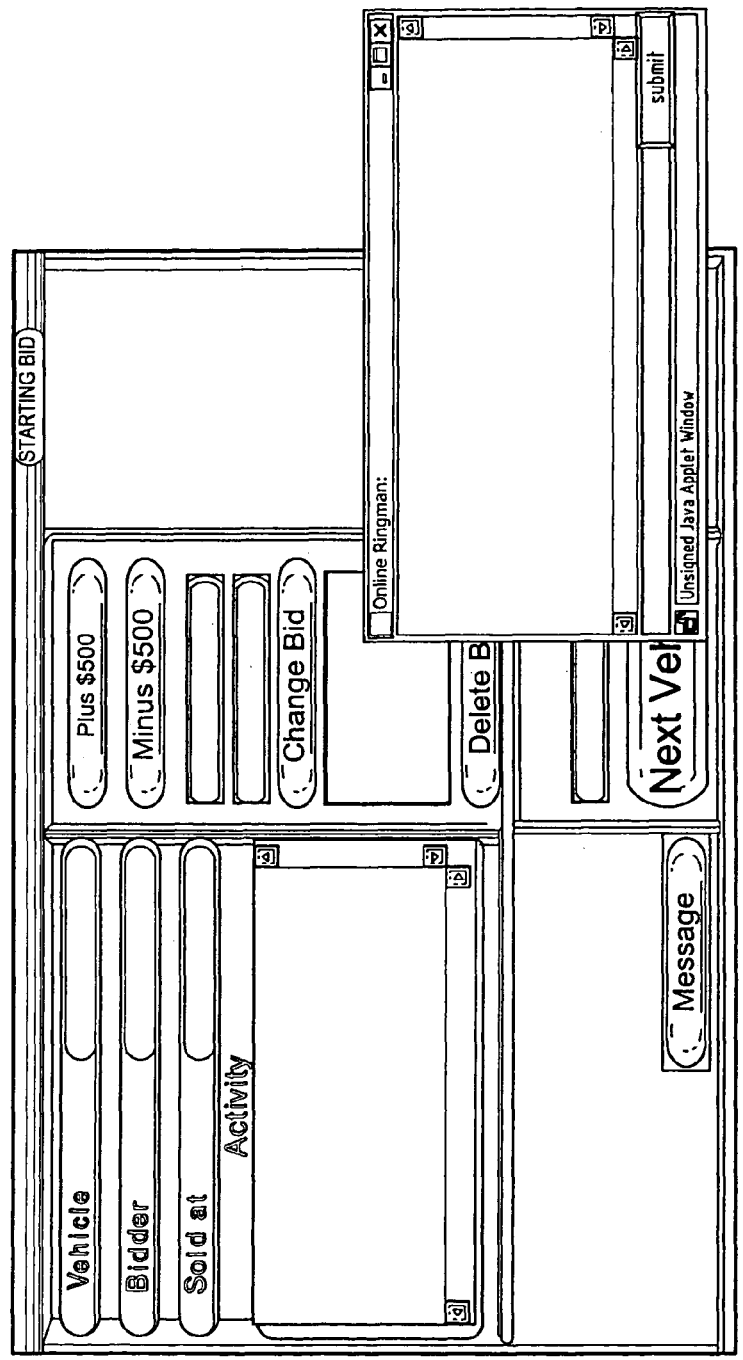
FIG. 22A illustrates an example of a Message Screen.

The message function is used to send a message to either a single remote bidder or to broadcast to all remote bidders. The message format defines the type of message to be processed. FIG. 22A illustrates an example of a message screen. FIG. 22 schematically illustrates the typical message process.

Operation of the Mohawk Bid Engine

The following processes for the Mohawk Bid Engine are detailed in the respective figures as defined throughout this section. Once the Clerk System 130 has been initialized, the Mohawk Bid Engine reacts to Clerk System 130 or Bidder Device 110 actions. For example, in one embodiment the following operations can be performed:

Initiation of first item or next item (Clerk System 130 function)**

Enter starting bid (Clerk System 130 function) including +/−$500 button use**

Enter starting bid from Remote Bidder

Enter floor bid (Clerk System 130 function)**

Enter/accept remote bid (Bidder Device 110/Clerk System 130 function)**

Sold bid (Clerk System 130 function)**

Request purchase info (Bidder Device 110 function)**

Delete bid (Clerk System 130 function)**

Message (Clerk System 130 function)**

** these items function similarly to the Cherokee Bid Engine

The Mohawk Bid Engine also includes multiple bid value buttons.

Figure 23B:
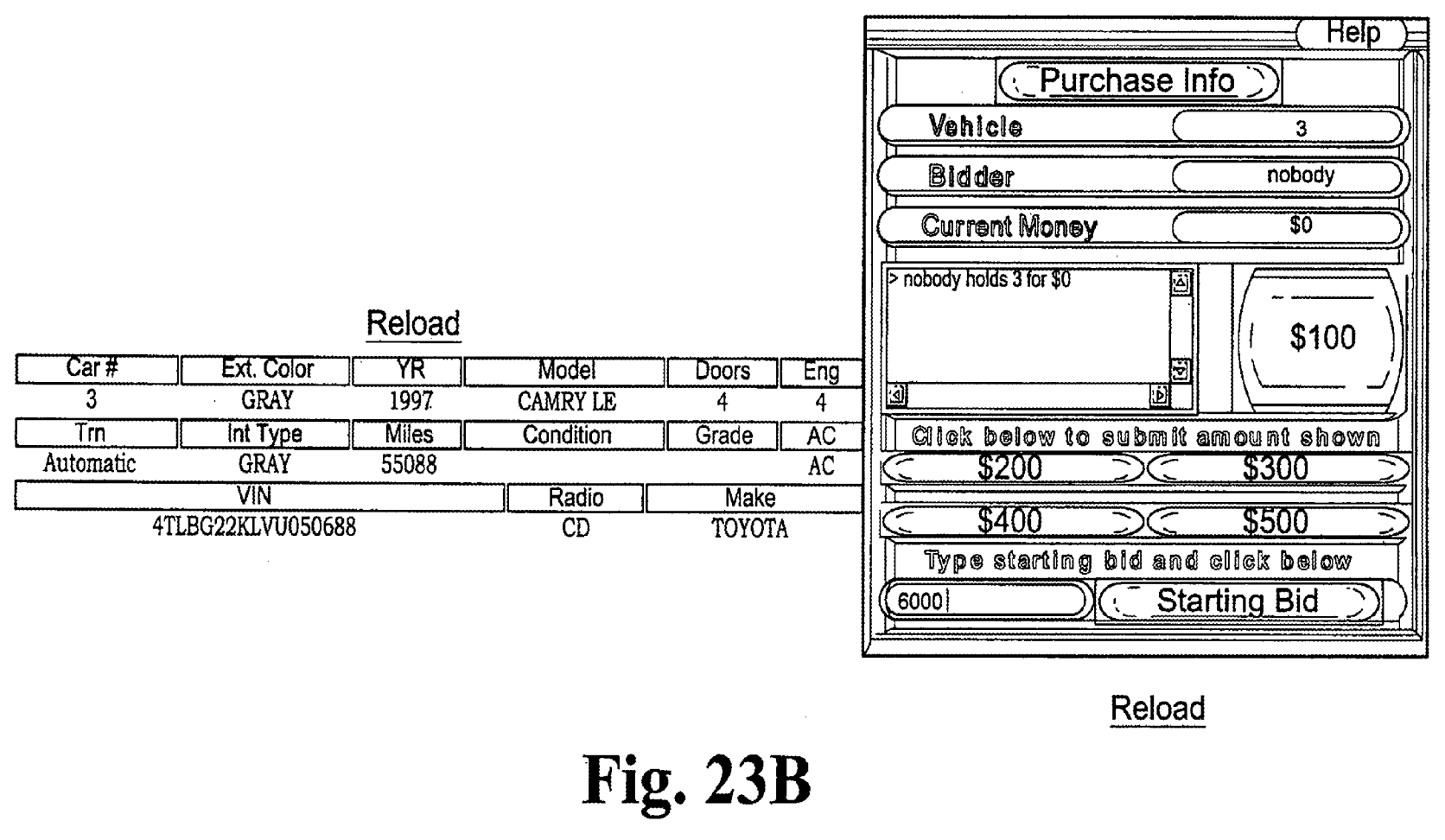
Figure 23C:
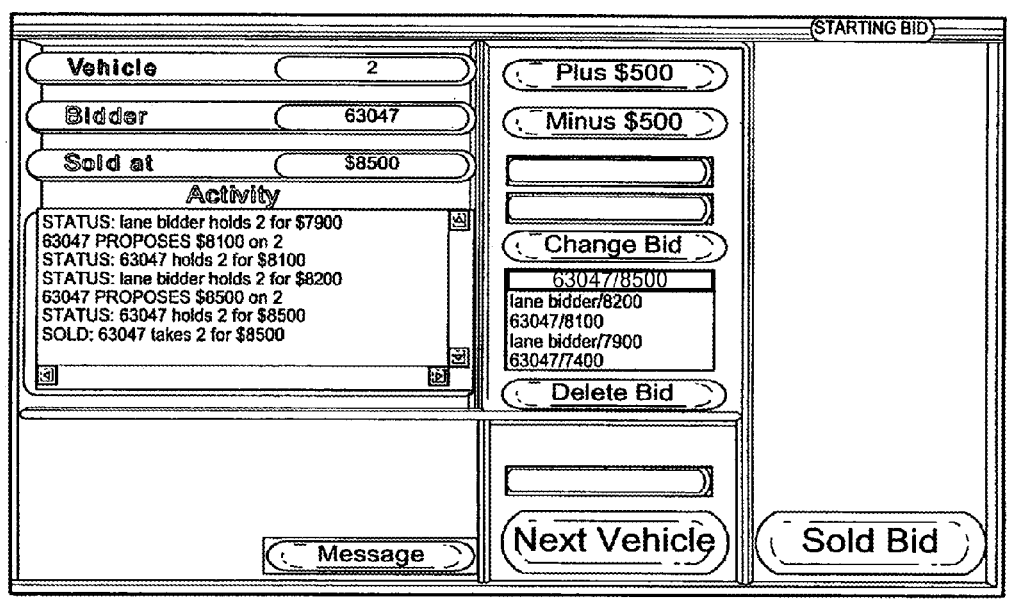

FIGS. 23A/23B illustrate exemplary Bidder Device 110 displays and FIG. 23C an exemplary Clerk System 130 display from the Mohawk Bid Engine.

Additional Bid Buttons on Bidder Device 110 Displays

The Mohawk Bid Engine has multiple bid bars on the Bidder Device 110 display. In a configuration with five bid bars, the main bar is for the next higher increment (default) from the last accepted bid while the remaining four bars are for values two times, three times, four times and five times the default increment. The remote bidder clicks on the value desired to enter a bid in the same manner as previously described for the Cherokee Bid Engine. The Bid System 120 recognizes which bar has been selected and updates the Marquee System 140, Clerk System 130, and Bidder Device 110 displays accordingly. Acceptance of the bid is handled much the same way as the Cherokee Bid Engine with the primary exceptions being as follows:

1) If two or more remote bidders submit bids of different values, the first bid received is submitted to the auctioneer. If the other remote bid(s) is/are of higher value then the previously received pending bid, it/they are queued for presentation to the auctioneer following the auctioneer's action on the previously received pending bid.
2) If a remote bidder submits a bid of value greater than the minimum increment and the auctioneer accepts a bid from an onsite bidder of lesser value, than the remote bid remains pending until the auctioneer accepts it, accepts another bid of higher value or sells the item.

Entry of a Starting Bid from the Bidder Device 110

To enter a starting bid from the Bidder Device 110, the bidder enters a value and clicks on STARTING BID. The Clerk System 130 then (a) accepts the starting bid by entering the value and selecting CHANGE BID or (b) overrides the remote starting bid by entering a different value plus selecting CHANGE BID. Once the bidding has been initiated for a specific item, the bidder's starting value entry bar may be deactivated until NEXT ITEM is selected on the Clerk System 130. The process is the same as that used to enter, accept, or override a remote bid as previously defined for the Cherokee Bid Engine.

Operation of the Iroquois Bid Engine

The following processes for the Iroquois Bid Engine, in a preferred embodiment of the present invention, are detailed in the respective figures as defined throughout this section. Once the Clerk System 130 has been initialized, the bid engine reacts to the Clerk System 130 or Bidder Device 110 actions.

Initiation of first item or next item (Clerk System 130 function)**

Enter starting bid (Clerk System 130 function) including +/−$500 button use**

Set Policy (Clerk System 130 function)

Enter starting bid from Remote Bidder**

Enter floor bid (Clerk System 130 function)**

Enter/accept remote bid (Bidder Device 110/Clerk System 130 function)

Sold Bid (Clerk System 130 function)**

Request purchase info (Bidder Device 110 function)**

Delete Bid (Clerk System 130 function)**

Message (Clerk System 130 function)**

** these items function similarly to the Cherokee or Mohawk Bid Engines.

The Iroquois Bid Engine provides the following additional capabilities in addition to those of the Mohawk Bid Engine:

A specific button (REMOTE BID) must be selected to accept a remote bid; selecting the bid value button accepts that same value from a floor bidder; and SET POLICY—allows the auction to identify what bid increments are to be used based on the bid value (e.g., up to $2,000, use $25 increments; for the next $2,000, use $50 increments; above that level, use $100 increments).

This affects the process used by the Bid System 120 to redisplay the Clerk System 130 and Bidder Device 110 bid bar values as each bid is accepted.

Figure 24A:
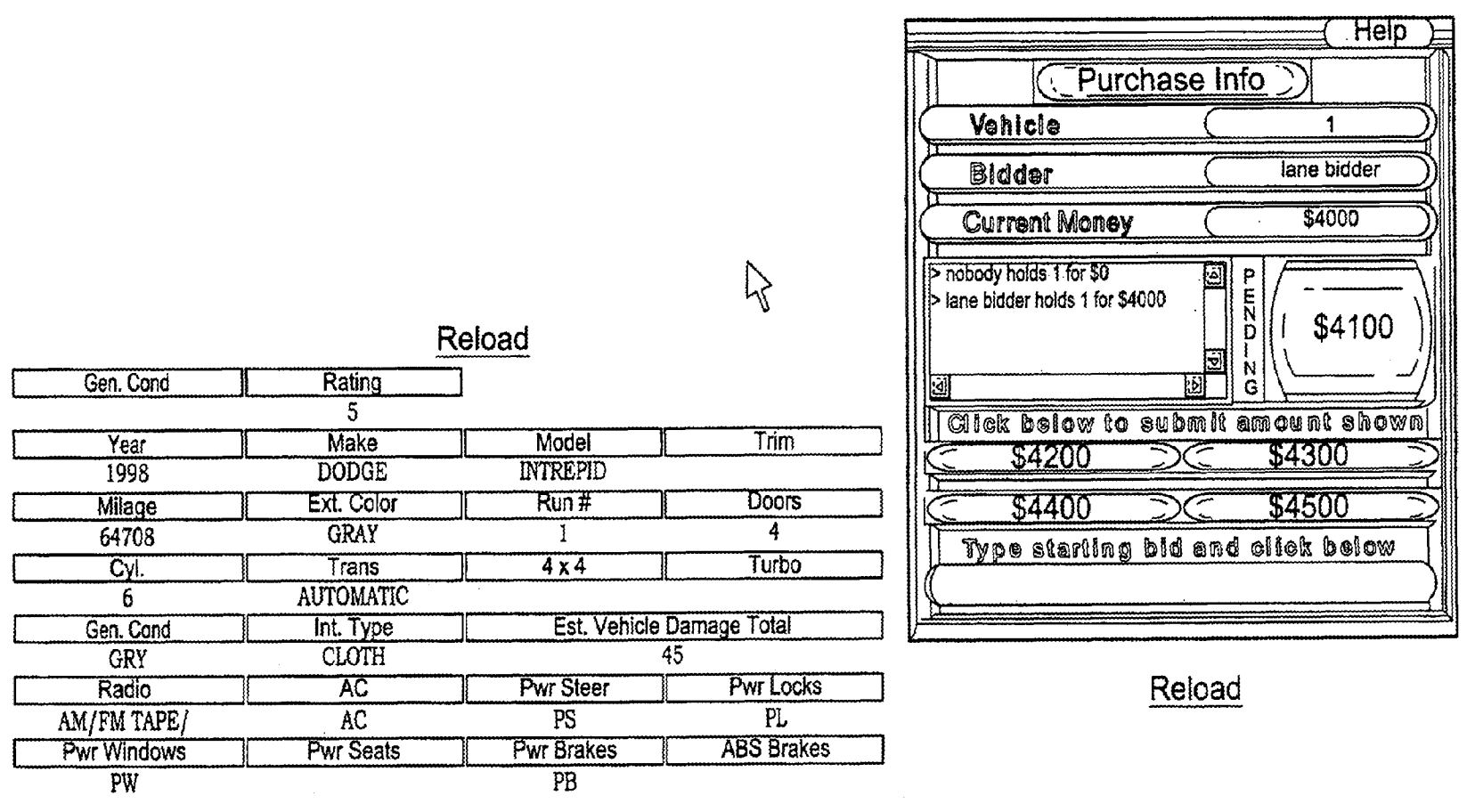
Figure 24B:
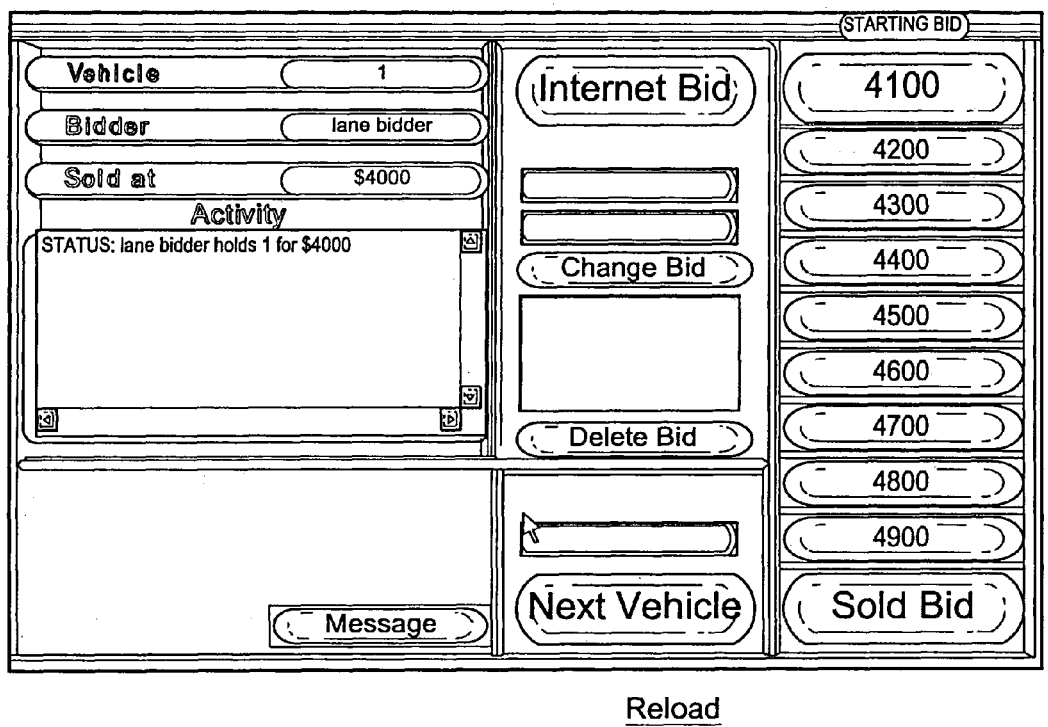
FIGS. 24A/24B illustrate examples of a Bidder Device 110 display and a Clerk System 130 display from the Iroquois Bid Engine of the present invention.

FIGS. 24A/24B are examples of a Bidder Device 110 display and a Clerk System 130 display from the Iroquois Bid Engine.

Acceptance of a Remote Bid

Acceptance of a remote bid is accomplished by selecting the REMOTE BID bar on the Clerk System 130 display. The resulting process is the same as defined for the Cherokee Bid Engine for an accepted remote bid. If the value bar equivalent to the remote bid on the Clerk System 130 display is selected, the bid is assigned to the "floor". For this condition, the process is the same as the override process described for the Cherokee Bid Engine.

Set Policy Function

The SET POLICY function is used to define the bid increments to be used on the bid increment bars on the Clerk System 130 and Bidder Device 110 displays for each item to be auctioned. In a preferred embodiment of the present invention, the Clerk System 130 cannot set starting bids or accept bids until the SET POLICY function has been completed.

The SET POLICY bar on the Clerk System 130 display is selected to activate the set policy box on the Clerk System display. As many increment definitions as necessary are established by entering values in the two lines initially displayed plus ADDing as many lines as necessary to complete the definition. Once all increments are defined, the SET POLICY is selected in the message box to activate these values/increments in the bid processing. The Bid System 120 compares the value of the last accepted bid against these table values and generates the appropriate INCREMENT BID BARS for both the Clerk System 130 and Bidder Device 110 displays. This is done each time a bid is accepted from the floor or from a remote bidder. The process of updating Marquee System Device 108, Clerk System 130 and Bidder Device 110 displays is the same as the Cherokee Bid Engine with the calculations performed by the Bid System 120 prior to the values being sent to the displays.

Operation of the Apache Bid Engine

Figure 25A:
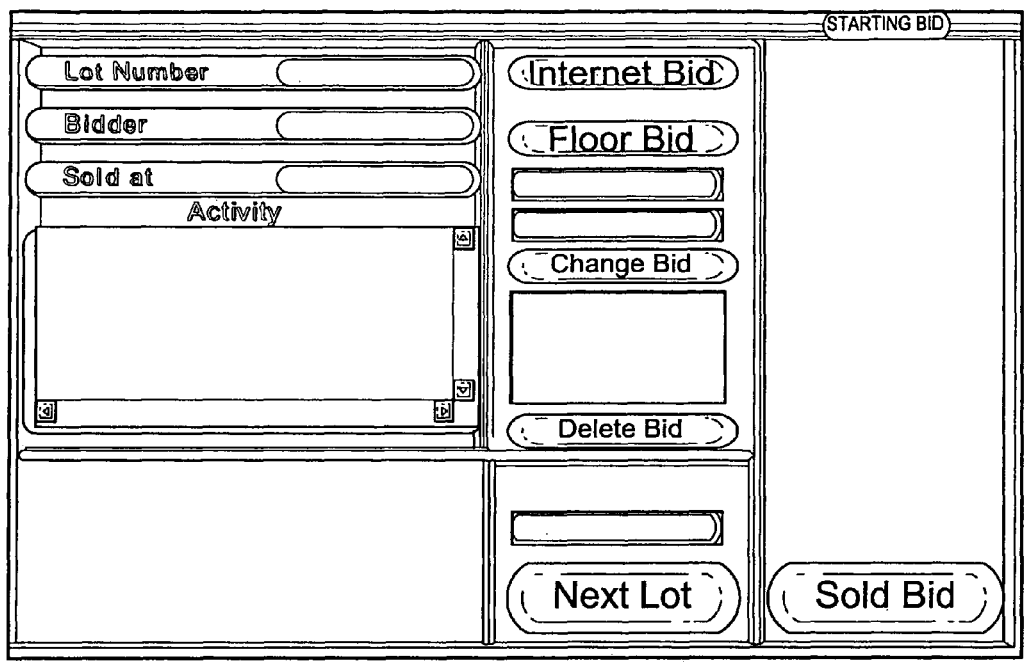
FIGS. 25A/25B/25C illustrate examples of Clerk System 130, Marquee System 140, and Bidder Device 110 displays from the Apache Bid Engine of the present invention.
Figure 25B:
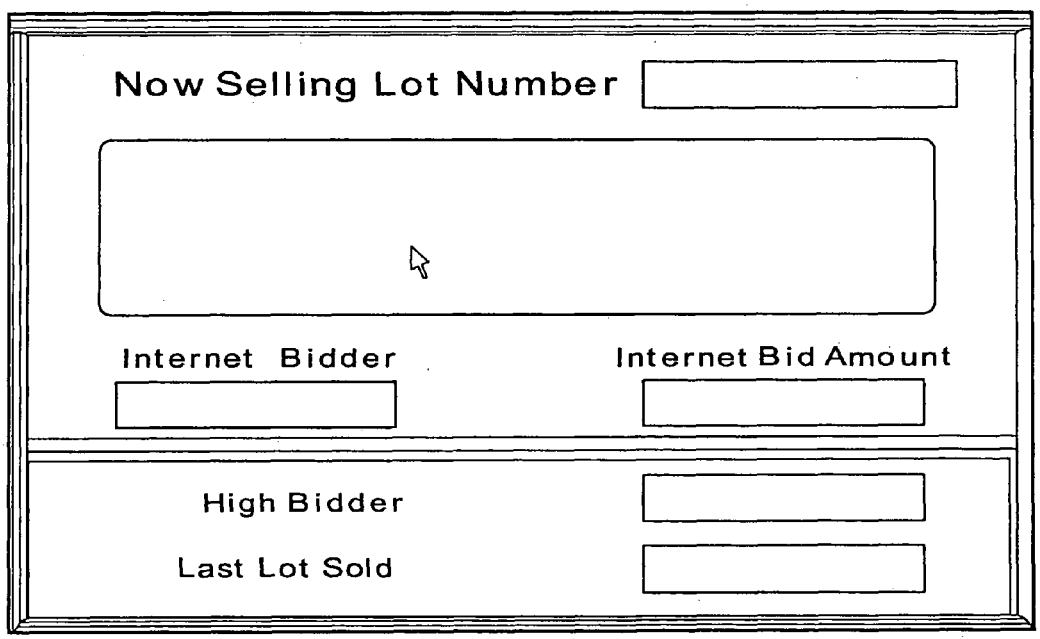

The fourth Bid Engine utilized is Apache. In this Bid Engine, bids are "ASKed" for and then accepted. A number of the processes are equivalent to those previously described with minor variations. The format of the Marquee System 140 and Bidder Device 110 displays is different from those referenced in prior sections. FIGS. 25A/25B/25C are sample Clerk System 130, Marquee System 140, and Bidder Device 110 displays from the Apache Bid Engine.

Marquee Display Updates

Under the Apache Bid Engine operation, the Marquee System 140 display is updated in accordance with the aforementioned bid engines as well as the following:

HIGH BIDDER and LAST LOT SOLD are updated each time the clerk clicks on the SOLD button. The HIGH BIDDER contains either FLOOR or the remote user ID.

The processes to update the Marquee System 140 are the same as those defined for the previous Bid Engines. The difference is the specific data elements and placement on the Display that varies among bid engines.

Clerk Display Updates

Under the Apache Bid Engine operation, the Clerk System 130 is functionally the same as that defined for previous Bid Engines. The primary difference is that the Bid System 120 ASKS for a bid when one of the BID INCREMENT BARS on the Clerk System 130 display is selected. A bid for that value—once accepted by the auctioneer—is then entered by selecting either the FLOOR BID or REMOTE BID button on the Clerk System 130 display. As with the Cherokee, Mohawk and Iroquois bidding engines, variations of instructions can allow for streamlined operations by automating bid acceptance when a higher increment is selected. Actions taken/display updates for the clerk function occur as follows:

LOT NUMBER—updated when NEXT LOT is clicked for the next sequential entry in the inventory subset.

BIDDER—updated when a bid is accepted.

SOLD AT—updated when the SOLD button is selected.

ACTIVITY MESSAGES—updated each time a Clerk System 130, Bidder Device 110 or Bid System 120 action is processed.

CHANGE BID—allows for a value not shown on the Bid Increment Bars to be entered, a starting bid to be entered and a previous bid to be modified.

DELETE BID—deletes the last bid and resets to the bid prior to the last bid.

NEXT LOT—same as the NEXT ITEM function.

REMOTE BID—may be selected to accept a bid from a remote bidder.

FLOOR BID—may be selected to accept a bid from the live gallery.

SOLD—may be selected after the last bid has been accepted and the auctioneer identifies the item as sold to that bidder. When the SOLD button is selected, a window is displayed on the Clerk System 130 display for the purpose of entering the bidder number to whom the item was sold. This data is then placed in the activity messages and sent to the Marquee System Display Device 108 and the Bidder Device 110 display. The processes for these functions are the same as the Iroquois Bid Engine with the following differences:

The FLOOR BID button may be used to accept a bid instead of clicking on the BID INCREMENT BAR for that value.

The BID INCREMENT BARS are used to broadcast a request for a bid rather than accept a floor or remote bid.

Figure 26:
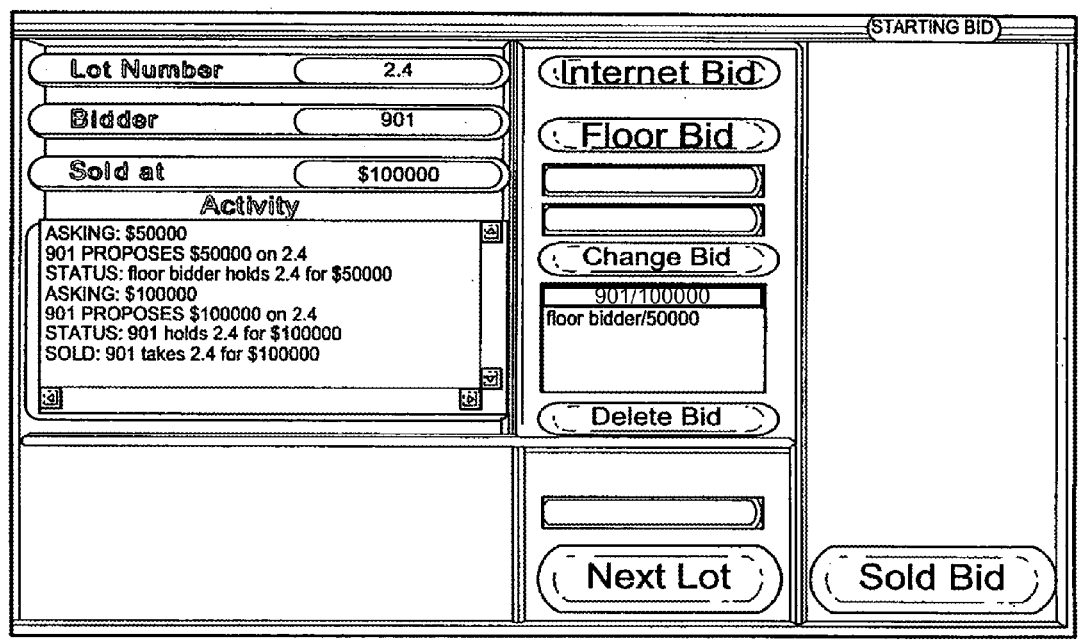
FIG. 26 illustrates an example of a Clerk System 130 display from the Apache Bid Engine.

FIG. 26 illustrates an example of a Clerk System 130 display from the Apache Bid Engine.

Bidder Device 110 Display Updates

Under the Apache Bid Engine operation, updates to the Bidder Device 110 display and functions activated by the bidder include:

LOT #—updated each time NEXT LOT is selected.

BIDDER/CURRENT BID—updated each time the Bid System 120 broadcasts that either a FLOOR or REMOTE BID has been accepted.

BID HISTORY—updated each time the Bid System 120 broadcasts an action taken on a Bidder Device 110 or Clerk System 130.

BID STATUS—indicates status of the remote bid from that same remote bidder.

PENDING—bid has been selected by the bidder

ACCEPTED—bid was accepted by the auctioneer

OUTBID—the FLOOR or another remote bid was accepted for this value.

PREVIOUS LOT #/WINNING BIDDER/WINNING BID AMOUNT—updated each time the SOLD button on the Clerk System 130 is selected.

BID VALUE—updated each time the Bid System 120 broadcasts a new ASKS value. The bidder clicks on this button to enter a bid. The button is cleared each time the SOLD button on the Clerk System 130 is selected and remains clear until the NEXT LOT first ASKing price is broadcast by the Bid System 120.

HELP—activates a new page with hints/FAQs for the bidder. Bidder returns to the normal Bidder Device 110 display by clicking the X in the upper right corner of that page.

Figure 27:
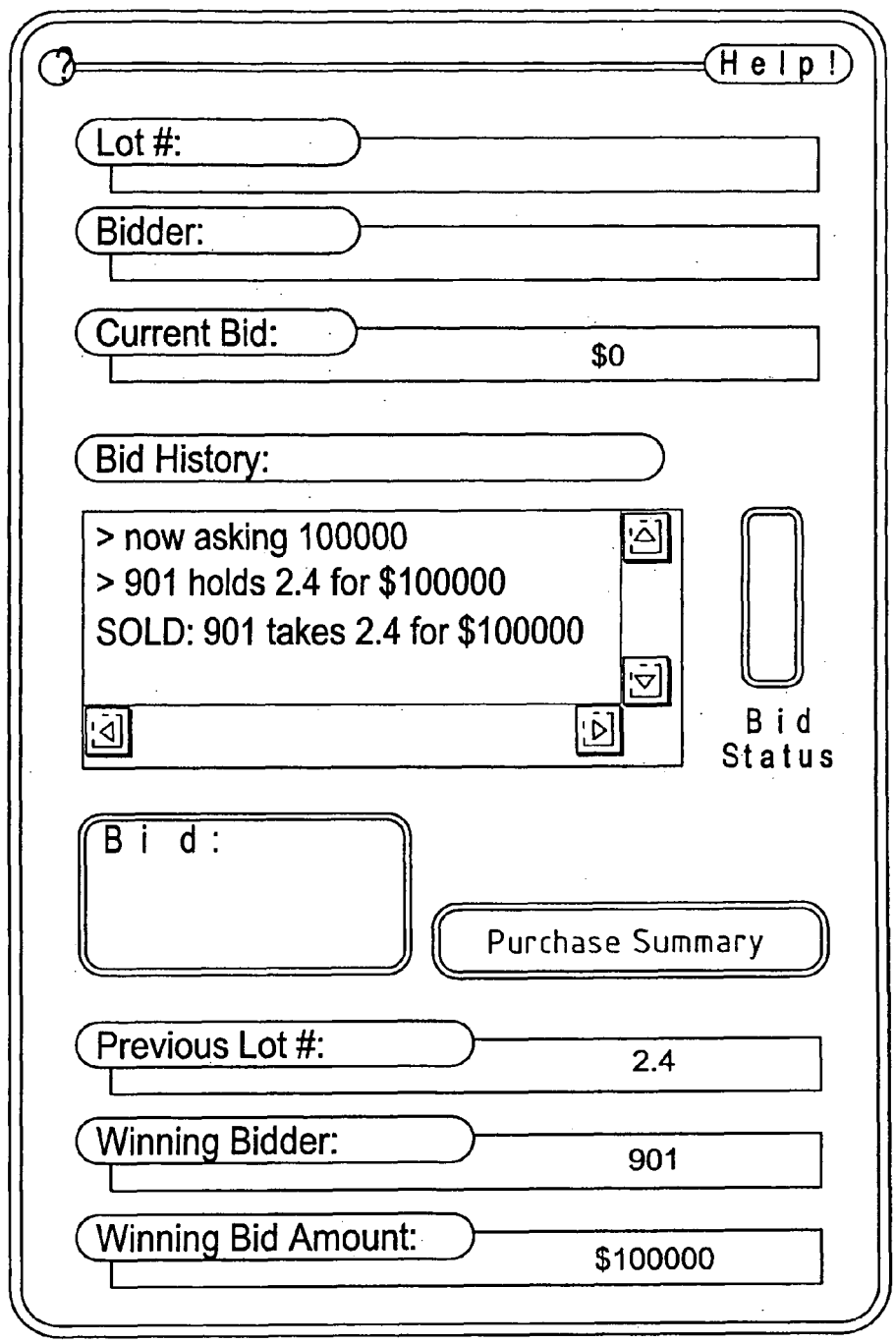
FIG. 27 illustrates an example of an updated Bidder Device 110 display from the Apache Bid Engine.

FIG. 27 illustrates an example of an updated Bidder Device 110 display.

All inventory subset data for the Bidder Device 110 display is generated at one time for presentation and placed on the Bidder Device 110 display. This area may be scrollable and contains information for each lot being sold. The data is broadcast to the bidder when the logon sequence is completed.

Data Mining

Upon completion of the auction, the bidders attendance log and the bid log are available for post processing from the Bid System 120 directly or through a predefined network address. The data is collected during the auction by the Bid System 120 as the events take place.

The bidders attendance log can be downloaded directly from the Bid System 120. The bid log can be obtained by accessing the required network address for that auction. In one embodiment, a script can be executed to extract the data from the Bid System 120 and place it at the assigned location.

More specifically, the Bid System 120 maintains a log of bidders who connect to each auction. The log entries are maintained in a table with an entry being made each time a Bidder Device 110, the Clerk System 130, or the Marquee System 140 is initiated through the login process. Data can be extracted from this table and placed on the display. To be initiated, this extraction process may require a unique logon/password combination to be entered on the Bid System 120. The analysis of this data identifies the user logon ID and the period for which the user was connected to the remote bidding system.

The access to the bid log can be provided via a special location specifically set up to extract the data from the Bid System 120.

In an exemplary embodiment when the location is accessed, the script initiated from the site performs a database query to the Bid System 120. The Bid System 120 extracts the log entries from internal tables and places them in sequential time order on the display. Automated analysis provides remote bidder information, including but not limited to bids made per user ID, number of items purchased by user ID, time of sale, amount of sale, average value of items sold to remote versus floor bidders, and total statistics for the auction. The analysis can be defined specifically for each auction from the unique data items available.

Audio/Video System

The audio/video system of the present invention ("A/V Subsystem") is a Client/Server audio and video transport system. It provides a streaming audio and video feed from a customer site to client workstations that may be located anywhere on a global network. Clients receive the A/V feeds using standard browser software and sound cards. The system may be used for standalone applications, or may be incorporated into interactive database applications as a functional subset. The A/V Capture System 102 is used to (a) convert the signal from a video source to a digital stream, which can then be transmitted to the A/V System 100 on a continuous basis; and (b) convert the signal from the sound source to a digital stream, which can then be transmitted to the A/V System 100 on a continuous basis. The A/V System 100 broadcasts the received feed or feeds to the clients or Bidder Devices 110 with minimal delay.

There are two overarching design elements that firmly define and delineate the unique nature of the A/V System 100: connectionless and non-buffered performance. Mass-market audio/video streaming applications are oriented towards delivery of content under the assumption that buffered delay is acceptable in order to ensure very high quality (CD-quality audio, picture-quality video) at the client end of the application. While appropriate for consumer and high-end business delivery (high bandwith or broadband), this approach misses a potentially large audience that will trade a degree of final output quality for a more real-time performance experience (for example, to receive the "live" look and feel of an auction). These mass-market solutions are typically connection-oriented in their network delivery techniques.

The A/V System 100 uses connectionless, non-buffered designs that, in spite of the implications of the terminology, deliver FM-quality (voice) audio and still video streams to remote clients while at the same time ensuring an interactive response turnaround from the client application that allows the auctioneer to communicate with remote bidders without delaying or affecting the process or flow of the auction (typical delays are approximately one second or less). A bonus of this approach is that it functions quite well using the lowest common denominator of internet access transport at this time—the V.90 analog modem connection. As end-user connection technology migrates to schemes with speeds higher than 56 Kbps (asynchronous)—for instance, to ADSL or cable modem technology—the performance inherent in the A/V Subsystem design will already be guaranteed.

The A/V Subsystem provides its audio, video and integration services by using existing transport and display services in a completely unique manner. A standard audio encoding/decoding scheme is extended to ensure the reliable transmission of an FM-quality stream. A still video standard—JPEG—is sampled and streamed to simulate a live video feed while eliminating the overhead and bandwidth requirements that typically accompany such a configuration. And the final client-side presentation is integrated into the Bidder Device 110 display, removing the need for multiple or custom standalone audio/video applications on the Bidder Device 110.

When considering the development of a system that can deliver an audio and video feed from an A/V Capture System 102 to multiple Bidder Device 110 locations, with minimal delay, there is one critical architectural decision that must be investigated—that of selecting the core network topology. This decision not only drives the final system architecture, it also determines the audience and market scope that may be addressed by the final system. The core network topology is, in short, the choice of a transport backbone over which captured audio and video streams will be processed and delivered to remote client applications. There are many choices for such a backbone, including:

Private Broadcast/Multicast [Terrestrial or Satellite] Networks

Proprietary [Branded] Internet Broadcast Channels and Software

Custom Standards-Based Internet Software

Of these topology choices, the first, like broadcast or cable television, would result in a system suited to content delivery on a large scale, but from a practical standpoint unaffordable to deliver content. The second, while less restrictive than the first, typically is optimized for one-way content transport. Because the A/V Subsystem needs to interact with other interactive database and web solutions, custom development of the A/V Subsystem using Open Systems Standards was logical. The A/V Subsystem is designed under the assumption that the majority of remote clients being served by an installation are connecting to the Internet using V.90 (56K) modems or less. It is further assumed that, on average, a V.90 connection will receive roughly 40 Kbps of reliable bandwidth over time during a session. Using these assumptions, general design parameters may be defined for the audio and video streams that will be sent to Bidder Devices 110 by the A/V System 100.

Audio

The audio stream must be structured such that it can maintain a voice-quality feed under conditions that may include limited bandwidth (i.e. less than 56 Mbps sustained). In order to minimize development and hence, customer costs, the audio encoder and server can run in an Open Systems server environment, and the client application should require minimal development using off-the-shelf browser technology.

The preferred audio encoder/decoder utilizes the GSM 06.10 codec library. The streaming audio produced by this library utilizes 13.3 Kbps of bandwidth and delivers an 8 KHz voice-quality audio signal to the Bidder Device 110.

Video

Requirements for the video stream are the same as those outlined above for audio, with one subtle difference. While the preferred long-range architecture of the A/V Subsystem does not preclude the inclusion of non-lossy or full-motion video technology, initial design requirements are such that video need not be completely full-motion. A rate of one frame per three seconds has been set as a reasonable benchmark for the current release of the A/V Subsystem. It is expected, however, that with the emergence and subsequent adaptation of higher bandwidth technology and devices (e.g. cable modems, DSL, etc.), the A/V Subsystem will be able to advantageously utilize the increased bandwidth and provide a video signal with a frame rate that approaches non-lossy or full motion video.

The A/V Capture System 102 utilizes JPEG for video software, and the streamer portion of the server is designed to give priority, should it be required, to the audio feed. The combination of the audio and video stream to any given Bidder Device 110 will, under normal network conditions, fit into the 40 Kbps average ceiling estimated for V.90 connections.

The A/V Subsystem is composed of hardware and software elements configured in a client/server architecture. The A/V Subsystem consists of an Encoding Server—the A/V Capture System 102 (typically deployed at the site of audio/video capture) and a Master Server or Reflector—the A/V System 100. The A/V Capture System 102 sends an audio and video stream to the A/V System 100, which in turn oversees distribution of multiple streams to the remote clients. The client side or Bidder Device 110 is typically configured to run with standard commercial browsers. In one embodiment, the client can be deployed specifically for the Netscape™ 4.X browser release, but the architecture does not preclude compiling for Microsoft Internet Explorer™ or other browsers.

Figure 28:
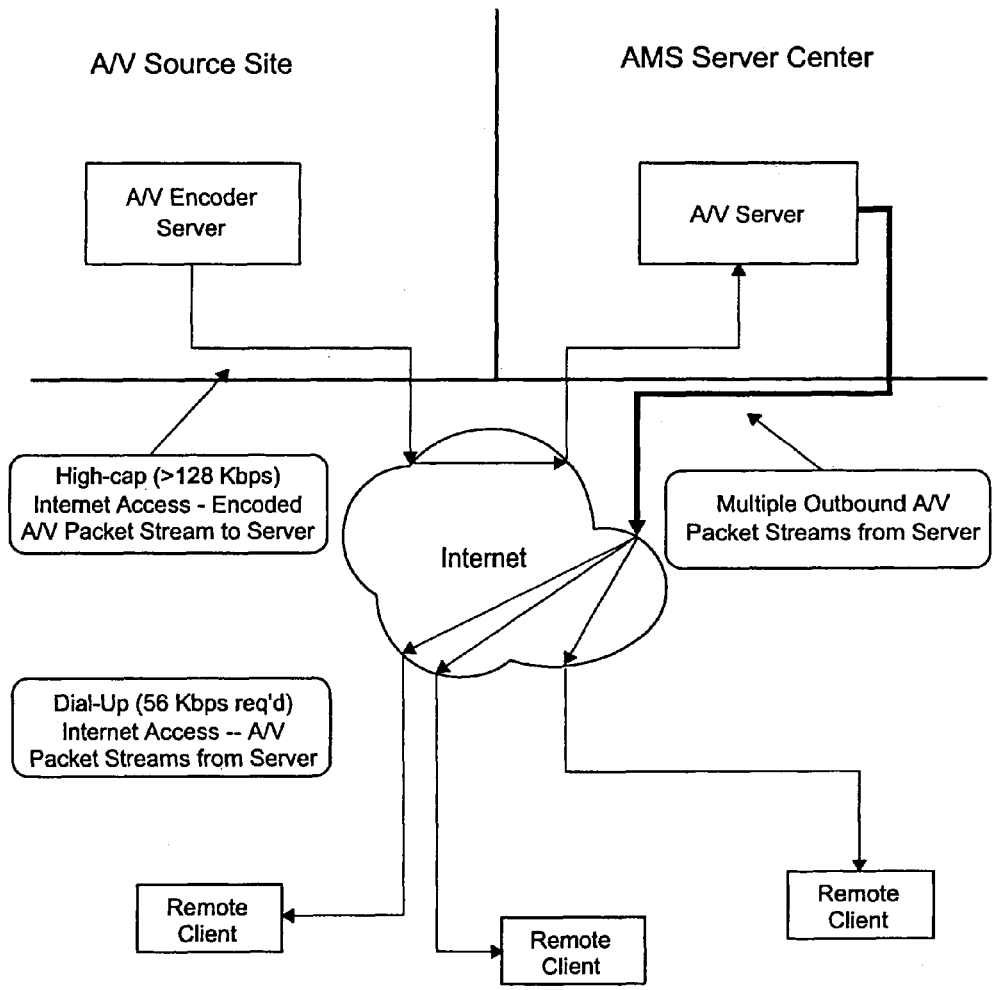
FIG. 28 is a schematic of the Audio/Video Subsystem of the present invention.
Figure 29:
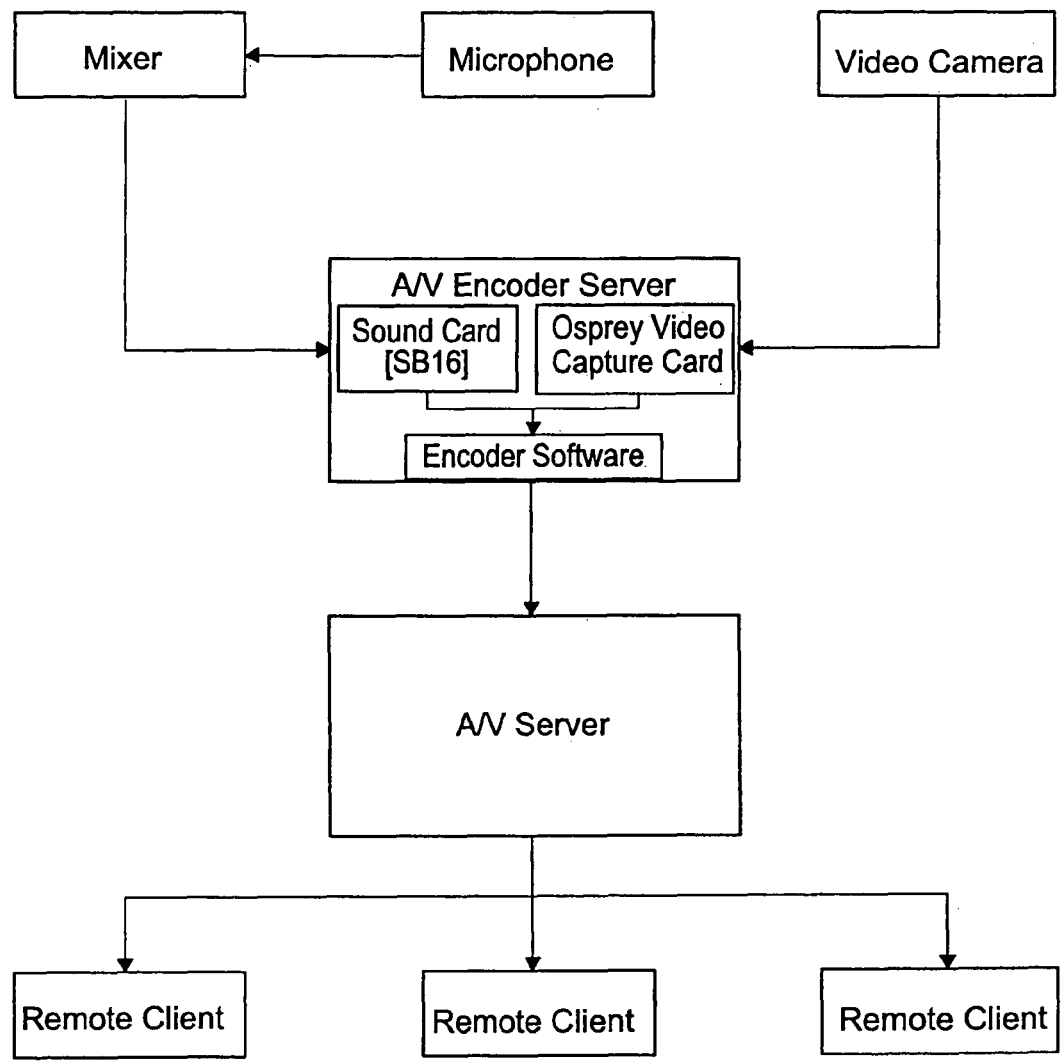
FIG. 29 is a schematic of the process flow of the Audio/Video Subsystem of the present invention.

FIGS. 28 and 29 present general views of the layout and operation of the A/V Subsystem.

Encoding Server—Functional

The A/V Capture System 102 opens up two connections to the A/V System 100—one for a video stream and one for an audio stream. The video is compressed into a full JPEG image and is sent at a steady rate, determined at server connection. The audio is compressed using standard encoding/decoding algorithms and is sent at a steady rate, also determined at the A/V System 100 connection.

The A/V Capture System 102 at initiation of the streamer can accept several parameters that invoke the following features:

Dual Modems—for dual modem configurations, it is desirable to select one modem for audio and the other for video. Doing so will require proper setup of the routing tables.

Save To A File—The A/V Capture System 102 will encode the captured audio and video; however, rather than send it to the A/V System 100, the resulting captured audio and video will be saved to a file.

Play From A File—The A/V Capture System 102 will use encoded source material and stream it to the A/V System 100 rather than receive the input from the Video Source 104.

Frequency—This parameter will change the frequency in which the A/V Capture System 102 captures or encodes a frame.

Quality—This parameter will change the quality of the encoded video.

A/V System 100—Functional

The A/V System 100 accepts streams from A/V Capture System 102 and sends them to Bidder Devices 110. It supports multiple streams. Each stream may be protected by a password to prevent unauthorized encoders from using the server. In a preferred embodiment of the present invention, a stream is ready to send to clients when both the audio and video channels have been established. Ideally (given perfect network conditions), packets are sent using the audio packets as the pulse (~200 ms) and followed by a set video frame size. Audio and video are delivered to clients in a single channel to ensure more priority for the audio and to lessen the amount of buffering required for the audio. In a preferred embodiment, audio is not considered critical (lost packets allowed) on both encoding and the client end. This is by design as the entire A/V Subsystem is constructed for integration with interactive database applications (live auctions are a primary example). Under network congestion or error conditions, the integrated application must receive higher network priority.

In a preferred embodiment of the present invention, video on the encoding end is not considered critical. However, video on the client end is considered critical (any missing parts will be re-requested until all parts are available; note that images that seem to be incomplete are due to the encoder, not the client). Remote bidder clients will receive the most recent complete frame available on the server at the time of request. Currently, connections to streams do not have access controls to limit which connection can view which stream.

Client—Functional

The preferred Bidder Device 100 client is a Netscape plug-in using Win32 code. It opens up a connection to the A/V System 100 and decodes the packets it receives into audio and video. The audio is played through the default Operating System audio playback device. The video is displayed in the browser. The client will try to maintain a constant three audio frames for playback (~700 ms). If it has fewer, it will play the audio a bit slower; if it has more, it will disconnect from the A/V System 100, or it will play the audio a bit faster to catch up.

Other A/V products are designed for very specific market applications, and the underlying architecture tends to be reflected in the final design, customer implementation costs, and (often) branding requirements. These design categories include one-to-one transport, group collaboration transport, and one-to-many transport. Products like IP-Phone packages and online meeting tools exemplify the first two categories. These products tend to not be designed to scale well beyond point-to-point or small group usage. Most are, as well, audio-centric in their design. The third category is oriented towards broadcast or multicast to larger audience size, but products to date either tend to focus on delivery of prerecorded content or, where live delivery is concerned, involve extremely high-cost server and bandwidth configurations.

If an audio/video system is engineered to deliver audio at CD-quality levels and video at good approximations of broadcast-quality (or at least moderate video-conferencing quality), it will be engineered with codec and transport mechanisms that are "highly reliable" and tend to use some form of carefully designed buffering for incoming streams to the client application. The term "highly reliable", however, should not be taken to infer that a design using "less reliable" delivery mechanisms or "lossy" codec schemes is, as a result, a less robust design. The A/V Subsystem was initially designed to deliver the "look and feel" of a live auction to a remote audience, and the codec and transport design decisions reflect the unique requirements of this market.

In a live auction, there is an inherent degree of "noise" as a part of the process itself; product is rolled through the auction at a rate no slower than one item every three minutes, and bidders have had time prior to the actual sale to investigate and inspect the items. During the live sale process, a bidder is highly likely to focus on the progress of a particular bid by mentally parsing the increasing bid numbers from the rapid pace of the auctioneer's chatter. Under such conditions, the "audio and video stream quality" become secondary considerations. When moving such an experience to a remote environment, the A/V Subsystem engineering design is allowed to reflect these same conditions, hence the fact that A/V System 100 delivers audio and video streams, but not in such a manner that they would interfere with the ability of the remote bidder client to see the bid progress (in this case, via a database update sent to the browser from the Bid System) and act accordingly (by entering a remote bid, for instance).

The encoding/decoding algorithm codec is lossy. It will not reproduce CD-quality audio but, given the design and market requirements, does not need to for the A/V Subsystem to function properly. The quality and frequency settings of the JPEG encoder, and the transmission/retry mechanisms built into the A/V Capture System 102, do not reproduce a broadcast-quality video signal but, once again, do not need to do so. In consideration of marketplace drivers and requirements for integration with larger system designs, the codec and transport design of the A/V Subsystem represents a unique solution.

A follow-on to the fundamental idea of codec and transport selection is the overall design of stream prioritization within the A/V Subsystem. Working with an estimated average bandwidth of 40 Kbps, the A/V Capture System 102 software itself is written so that packets from the encoder's GSM stream will receive consistent priority and handling unless video is available for processing. On the client side, the Bidder Device 110 is programmed to follow these same rules, except it is also configured to look for packets from a separate Bid System 120 (under the assumption that A/V Transport is installed as a turnkey live auction solution); if it sees these packets, it is to give them priority over both audio and video streams.

The invention claimed is:

1. A system that integrates a remote audience over a data network with an onsite audience existing within a traditional-style, live auction site, for auctioning an item, the system comprising:
    a processor for processing auction bids received from one or more remote clients and onsite bidders for the item being auctioned and delivery bid status information to the one or more remote;

an audio system located on the data network, the audio system configured to:
capture live audio data from the live auction site;
stream the live audio over the data network in an unbuffered manner and in real-time while maintaining a delay of approximately one second or less directed towards one or more remote clients by reducing the audio quality as necessary; and
reduce the stream of the live audio if it interferes with the delivery of bid status information;
a remote client interface over which the system is configured to:
receive auction bids from the one or more remote clients for the item being auctioned; and
deliver the streaming live audio contemporaneously with the bid status information to the one or more remote clients.

2. A method for integrating a remote audience over a data network with an onsite audience existing within a traditional-style, live auction site, for auctioning an item, the method comprising:
capturing live audio data from the live auction site;
streaming the live audio data over the data network in real-time to one or more remote bidding devices while maintaining a delay of approximately one second or less by reducing audio quality as necessary;
receiving auction bids from the one or more remote clients for the item being auctioned;
processing auction bids received from the one or more remote clients and onsite auction bidders for the item being auctioned; and
streaming the live audio to the one or more remote clients contemporaneously with transmitting the status information regarding the processing of auction bids and reducing the streaming if such streaming interferes with the delivery of the auction bids.

3. A system that integrates a remote audience with an onsite audience for a live auction, the system comprising:
at least one IP network;
a remote client interface communicatively coupled to the at least one IP network;
an audio system located on at the least one IP network that is configured to capture and stream live audio from a live auction site out of the remote client interface to one or more remote clients over the at least one IP network while maintaining a delay of approximately one second or less by reducing the audio quality as necessary;
the bidding device located on the at least one IP network configured to receive the live audio from the audio system, receive information pertaining to an item being auctioned at the live auction site and to transmit a remote bid for the item being auctioned;
a processing system configured to:
process auction bids received from one or more onsite bidders and one or more remote clients for the item being auctioned;
transmit to the one or more remote clients over the remote client interface information pertaining to the item being auctioned;
receive auction bids from the one or more remote clients through the remote client interface for the item being auctioned; and
stream the live audio contemporaneously with the transmission of information regarding the onsite bids and remote bids to the one or more remote clients over the remote client interface and reducing as such streaming interferes with the delivery of the onsite bids and remote bids.

4. The system of claim 3, further comprising:
a video system that is configured to:
capture real-time video from the live auction site; and
stream the real-time video from the live auction site to the one or more remote clients.

5. A system that integrates a remote audience with an onsite audience for a live auction, the system operating over at least one IP network and comprising:
a remote client interface communicatively coupled to the at least one IP network;
a video system communicatively coupled to the at least one IP network that is configured to stream live video from a live auction site to one or more remote clients in real-time;
a processing system communicatively coupled to the remote client interface and configured to:
process auction bids from one or more onsite bidders and remote clients for the item being auctioned;
transmit to the one or more remote clients, for display on the one or more remote clients, information regarding the item being auctioned;
receive auction bids from the one or more remote clients for the item being auctioned; and
streaming the live video contemporaneously with the transmission of the information regarding the processing of the onsite bids and remote bids to the one or more remote clients and reducing the quality of the live video as such streaming interferes with the transmission of information regarding the processing of the onsite bids and remote bids.

6. A method for integrating a remote audience with an onsite audience at a live auction over an IP data network, comprising the steps of:
capturing live audio at a live auction;
streaming the captured live audio to one or more remote clients over the IP data network while maintaining a delay of approximately one second or less by reducing the audio quality and allowing packets to be dropped as necessary, enabling the auctioneer to communicate to the one or more remote clients;
transmitting to the one or more remote clients information regarding the item being auctioned;
receiving auction bids from the one or more remote clients for the item being auctioned;
processing auction bids from the one or more onsite bidders and remote clients for the item being auctioned;
accepting an auction bid, the accepted auction bid being selected from a plurality of onsite bids and remote bids; and
streaming the live audio contemporaneously with transmitting information regarding the processing of the onsite bids and remote bids to at least one remote client and reducing such streaming as such streaming interferes with the transmitting of said information.

7. The method of claim 6 further comprising the steps of:
capturing live video at the live auction;
streaming the captured live video to the one or more remote clients over the IP data network, thereby enabling remote bidders utilizing a remote client to view real-time video from the live auction site contemporaneously with the reception of information regarding the item being auctioned at the live auction site, information regarding processing of onsite bids and remote bids, and the streaming live audio.

8. A method for integrating a remote audience with an onsite audience at a live auction in which an auctioneer is actively participating in the auction event, the method comprising the steps of:

capturing live video and live audio at a live auction;

streaming the captured live video and live audio to one or more remote clients over an IP data network in real-time while maintaining a delay of approximately one second or less by reducing audio quality as necessary;

transmitting to the one or more remote clients information regarding the item being auctioned;

receiving auction bids from the one or more remote clients and onsite bidders for the item being auctioned;

processing bids from the one or more onsite bidders and remote clients for the item being auctioned at the live auction site;

accepting a bid selected from a plurality of bids received from the onsite bidders and the one or more remote clients; and streaming live video and live audio contemporaneously to the transmitting of information regarding the processing of the plurality of bids to at least one remote bidding device and reducing such streaming as it interferes with the transmitting of said information.

\* \* \* \* \*